US011494155B2

(12) United States Patent
Lee et al.

(10) Patent No.: US 11,494,155 B2
(45) Date of Patent: *Nov. 8, 2022

(54) SYSTEM, METHOD AND COMPUTER PROGRAM PRODUCT FOR GENERATING REMOTE VIEWS IN A VIRTUAL MOBILE DEVICE PLATFORM USING EFFICIENT COLOR SPACE CONVERSION AND FRAME ENCODING

(71) Applicant: Intelligent Waves LLC, Reston, VA (US)

(72) Inventors: Robert David Lee, Austin, TX (US); Hemal Yogesh Gandhi, Surat (IN); Akshay P. Joshi, Surat (IN)

(73) Assignee: HYPORI LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/008,489

(22) Filed: Aug. 31, 2020

(65) Prior Publication Data
US 2020/0401363 A1 Dec. 24, 2020

Related U.S. Application Data

(63) Continuation of application No. 16/451,767, filed on Jun. 25, 2019, now Pat. No. 10,768,886, which is a
(Continued)

(51) Int. Cl.
*H04N 19/103* (2014.01)
*H04N 19/14* (2014.01)
(Continued)

(52) U.S. Cl.
CPC .......... *G06F 3/1454* (2013.01); *G06F 9/452* (2018.02); *G06F 9/45558* (2013.01);
(Continued)

(58) Field of Classification Search
CPC .... G06F 3/1454; G06F 9/452; G06F 9/45558; H04N 19/103; H04N 19/14;
(Continued)

(56) References Cited

U.S. PATENT DOCUMENTS

| 7,532,808 B2* | 5/2009 | Lainema | H04N 19/139 |
| | | | 386/328 |
| 9,026,615 B1* | 5/2015 | Sirton | H04N 19/593 |
| | | | 709/217 |

(Continued)

OTHER PUBLICATIONS

Office Action dated Jun. 20, 2019, in corresponding U.S. Appl. No. 15/661,965 (31 pages).
(Continued)

*Primary Examiner* — Dominic D Saltarelli
(74) *Attorney, Agent, or Firm* — Pillsbury Winthrop Shaw Pittman LLP

(57) ABSTRACT

Embodiments disclosed herein provide systems, methods and computer readable media for generating remote views in a virtual mobile device platform. A virtual mobile device platform may be coupled to a physical mobile device over a network and generate frames of data for generating views on the physical device. These frames can be generated using an efficient display encoding pipeline on the virtual mobile device platform. Such efficiencies may include, for example, the synchronization of various processes or operations, the governing of various processing rates, the elimination of duplicative or redundant processing, the application of different encoding schemes, the efficient detection of duplicative or redundant data or the combination of certain operations.

13 Claims, 28 Drawing Sheets

Related U.S. Application Data continuation of application No. 15/661,977, filed on Jul. 24, 2017, now Pat. No. 10,387,099.

(60) Provisional application No. 62/367,867, filed on Jul. 28, 2016, provisional application No. 62/367,871, filed on Jul. 28, 2016, provisional application No. 62/367,876, filed on Jul. 28, 2016.

(51) Int. Cl.

| | | |
|---|---|---|
| *H04N 19/174* | (2014.01) | |
| *H04N 19/423* | (2014.01) | |
| *H04N 19/503* | (2014.01) | |
| *H04N 19/625* | (2014.01) | |
| *H04N 19/176* | (2014.01) | |
| *H04N 19/186* | (2014.01) | |
| *H04N 19/517* | (2014.01) | |
| *H04N 19/547* | (2014.01) | |
| *H04N 19/61* | (2014.01) | |
| *G06F 3/14* | (2006.01) | |
| *G06T 9/00* | (2006.01) | |
| *G06T 1/20* | (2006.01) | |
| *H04L 67/1097* | (2022.01) | |
| *G06F 9/455* | (2018.01) | |
| *G06F 21/53* | (2013.01) | |
| *G06F 9/451* | (2018.01) | |
| *H04L 67/565* | (2022.01) | |
| *H04W 88/02* | (2009.01) | |
| *H04N 19/137* | (2014.01) | |
| *H04N 19/172* | (2014.01) | |
| *G09G 5/12* | (2006.01) | |

(52) U.S. Cl.
CPC ............... *G06F 21/53* (2013.01); *G06T 1/20* (2013.01); *G06T 9/00* (2013.01); *H04L 67/1097* (2013.01); *H04L 67/565* (2022.05); *H04N 19/103* (2014.11); *H04N 19/14* (2014.11); *H04N 19/174* (2014.11); *H04N 19/176* (2014.11); *H04N 19/186* (2014.11); *H04N 19/423* (2014.11); *H04N 19/503* (2014.11); *H04N 19/517* (2014.11); *H04N 19/547* (2014.11); *H04N 19/61* (2014.11); *H04N 19/625* (2014.11); *G06F 2221/032* (2013.01); *G06F 2221/2149* (2013.01); *G09G 5/12* (2013.01); *G09G 2340/02* (2013.01); *G09G 2340/06* (2013.01); *G09G 2350/00* (2013.01); *G09G 2358/00* (2013.01); *G09G 2360/121* (2013.01); *G09G 2360/18* (2013.01); *G09G 2370/022* (2013.01); *G09G 2370/027* (2013.01); *H04N 19/137* (2014.11); *H04N 19/172* (2014.11); *H04W 88/02* (2013.01)

(58) Field of Classification Search
CPC .. H04N 19/174; H04N 19/176; H04N 19/186; H04N 19/423; H04N 19/503; H04N 19/517; H04N 19/547; H04N 19/61; H04N 19/625; G06T 1/20; G06T 9/00; H04L 67/1097; H04L 67/2823
USPC .................................................... 375/240.16
See application file for complete search history.

(56) References Cited

U.S. PATENT DOCUMENTS

| | | |
|---|---|---|
| 10,387,099 B2 | 8/2019 | Lee et al. |
| 10,503,458 B2 | 12/2019 | Lee et al. |
| 2002/0106198 A1* | 8/2002 | Suzuki ................ H04N 19/423 |
| | | 386/220 |
| 2005/0036549 A1 | 2/2005 | He et al. |
| 2007/0159425 A1 | 7/2007 | Knepper et al. |
| 2011/0074800 A1 | 3/2011 | Stevens et al. |
| 2011/0084971 A1 | 4/2011 | Kuo et al. |
| 2011/0164677 A1* | 7/2011 | Lu .......................... H04N 19/11 |
| | | 375/240.02 |
| 2012/0207208 A1 | 8/2012 | Wyatt et al. |
| 2013/0254330 A1 | 9/2013 | Maylander et al. |
| 2014/0122729 A1* | 5/2014 | Hon .................. H04N 1/00244 |
| | | 709/228 |
| 2014/0143297 A1 | 5/2014 | Ibarria |
| 2015/0063451 A1* | 3/2015 | Zhu ......................... H04L 65/70 |
| | | 375/240.09 |
| 2015/0181215 A1 | 6/2015 | Ozawa |
| 2016/0088300 A1* | 3/2016 | Frishman ............. H04N 19/174 |
| | | 375/240.03 |
| 2016/0212433 A1 | 7/2016 | Zhu et al. |
| 2016/0217111 A1* | 7/2016 | Kataoka ................. G06F 40/157 |
| 2016/0261865 A1* | 9/2016 | Li ......................... H04N 19/174 |
| 2018/0007556 A1 | 1/2018 | Lu et al. |
| 2018/0032303 A1 | 2/2018 | Lee et al. |
| 2018/0035125 A1 | 2/2018 | Lee et al. |
| 2018/0146192 A1* | 5/2018 | Tao ........................ H04N 19/91 |
| 2018/0152535 A1* | 5/2018 | Sade ...................... G16B 50/50 |
| 2018/0288406 A1* | 10/2018 | Kouno ................. H04N 19/176 |

OTHER PUBLICATIONS

Notice of Allowance dated Apr. 3, 2019, in corresponding U.S. Appl. No. 15/661,977 (7 pages).
Office Action dated Oct. 21, 2019, in corresponding U.S. Appl. No. 15/661,965 (30 pages).
Office Action dated May 3, 2019, in corresponding U.S. Appl. No. 15/661,971 (6 pages).
Notice of Allowance dated Aug. 23, 2019, in corresponding U.S. Appl. No. 15/661,971 (8 pages).
Notice of Allowance dated May 1, 2020, in corresponding U.S. Appl. No. 16/451,767 (7 pages).

* cited by examiner

SYSTEM, METHOD AND COMPUTER PROGRAM PRODUCT FOR GENERATING REMOTE VIEWS IN A VIRTUAL MOBILE DEVICE PLATFORM USING EFFICIENT COLOR SPACE CONVERSION AND FRAME ENCODING

RELATED APPLICATIONS

This application is a continuation of U.S. patent application Ser. No. 16/451,767, filed on Jun. 25, 2019, which is a continuation of U.S. patent application Ser. No. 15/661,977, filed on Jul. 27, 2017, which claims the benefit of priority under 35 U.S.C. 119 of the filing date of U.S. Patent Application Ser. No. 62/367,867, by inventors Lee et al., entitled "SYSTEM, METHOD AND COMPUTER PROGRAM PRODUCT FOR GENERATING REMOTE VIEWS IN A VIRTUAL MOBILE DEVICE PLATFORM USING EFFICIENT PROCESSING DURING DISPLAY ENCODING;" U.S. Patent Application Ser. No. 62/367,871, by inventors Lee et al., entitled "SYSTEM, METHOD AND COMPUTER PROGRAM PRODUCT FOR GENERATING REMOTE VIEWS IN A VIRTUAL MOBILE DEVICE PLATFORM USING EFFICIENT MACROBLOCK COMPARISON DURING DISPLAY ENCODING, INCLUDING EFFICIENT DETECTION OF UNCHANGED MACROBLOCKS;" and U.S. Patent Application Ser. No. 62/367,876 by inventors Lee et al., entitled "SYSTEM, METHOD AND COMPUTER PROGRAM PRODUCT FOR GENERATING REMOTE VIEWS IN A VIRTUAL MOBILE DEVICE PLATFORM USING EFFICIENT COLOR SPACE CONVERSION AND FRAME ENCODING," all filed on Jul. 28, 2016, and expressly incorporated by reference for all purposes.

TECHNICAL FIELD

This disclosure relates generally to a virtual mobile device platform for mobile devices. In particular, embodiments disclosed herein relate to a systems, methods, and computer readable media for generating remote views in a virtual mobile device platform. More particularly, embodiments disclosed herein relate to systems, methods and computer readable media for display encoding pipelines used for generating remote views in a virtual mobile device platform. Even more specifically, embodiments disclosed relate to efficient color space conversion and encoding of frames based on data unchanged between frames.

BACKGROUND OF THE INVENTION

Today's mobile devices such as smart phones and tablets face unique security issues, some of which go hand in hand with mobility. Enterprises, military, and intelligence agencies (collectively referred to herein as "organizations") are all grappling with their users' use of mobile devices as many users are carrying out both business as well as personal activities on their mobile devices. This can be problematic even if a Bring Your Own Device ("BYOD") device policy is in place.

BYOD can raise serious security issues when a user's personal device is used to access both non-sensitive and sensitive (and sometimes risky) networks and/or services. For example, if an employee uses his personal smartphone to access a company network and then loses that phone, untrusted parties could retrieve any unsecured data on the phone. Another type of security breach occurs when an employee leaves a company, she does not have to give the company back her personal device, so company-owned applications and other data may still be present on her personal device. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Because of Internet-based risks, some very risk-averse organizations issue devices specifically for Internet use (this is termed "Inverse-BYOD"), providing unfiltered access to the Internet and reserving filtered, sensitive network data for use within a secured, private network. However, this means that a user likely has to carry multiple devices (including one for his personal use) and organizations do not have a sure way of preventing the user from using his personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior, useful in ensuring a level of secrecy for classified information. For instance, a high assurance operating system may permit only certain certified applications to access a particular portion of a memory on a device where sensitive information is stored. However, this does not prevent the physical device itself to become suspect—how it was built, who has handled it from manufacturing through use, how it is used by the user, etc. Moreover, the device could be physically accessed or otherwise compromised in many ways. For instance, information stored or cached on a mobile device could be accessed while its owner is away (e.g., left on the table at a restaurant or on their desk at work, stolen, or lost) or the user may have downloaded an infected application or could be sent an infected document via email or instant messaging, or accessed an infected service.

Because a mobile device lives in a hostile world, securing the physical device itself (e.g., via Tempest hardware, encrypted storage, biometrics, etc.) is not enough and can be very expensive to do a thorough job. Even so, infiltration from any portion of the stack—from the chips to the software that is installed to the data the device receives—still leaves the device vulnerable to attacks from well-funded, motivated, adversaries. Attempts to provide the level of separation needed within the actual device face many challenges, and at best are likely to become a very expensive niche proposition in the overall commercial mobility ecosystem.

In view of unique challenges in incorporating mobile devices such as smart phones and tablets into secure computing environments, there is room for innovations and improvements.

SUMMARY OF THE INVENTION

To address those desires, amongst others, embodiments as disclosed herein may be used to provide a system, method, and computer program product for generating remote views in a virtual mobile device platform. In some embodiments, events from a physical mobile device are sent to a virtual device. The virtual device creates one or more views based on the received events. Graphical attributes of one or more of the created views are captured and sent to the physical mobile device. Remote views are constructed and displayed on the physical mobile device based on the attributes received from the virtual device. For views where graphical attributes are not captured, compressed video of the respective views can be sent to the physical mobile device. Embodiments disclosed herein can provide many advantages. For example, in some embodiments, generating remote views using graphical attributes improves the responsiveness of remote applications, as well as reduces video bandwidth consumption.

However, the generation of these remote views is not without its challenges. In particular, as the events are sent from a physical mobile device to the virtual mobile device platform over a network and remote views are generated at the virtual mobile device platform and sent to the physical mobile device to be rendered over the network, embodiments may be particularly sensitive to latency that may be introduced at various points during the reception and processing of events, the generation of the remote views, or the transmission of these remote views to the physical mobile device. Though embodiments as disclosed are aimed, at least in part, at providing a greater level of security for the physical mobile device, it is desirable that the greater level of security imposes little or no burden with respect to the usability of functionality of the physical mobile devices by the user.

In fact, it would be ideal if the operation of the user's physical mobile device in a virtual mobile device platform was undetectable to the user. On a physical device in a user's hand, there is essentially zero latency between when the user generates events and when a locally installed application receives them. Similarly, there's essentially zero latency between when a locally installed application produces new visual content and the display offers it to the user. While such a goal may not achievable in all instances or circumstances, embodiments as disclosed herein may address these goals, among others, by reducing latency or use of computational resources involved in the generation of remote views on the virtual mobile device platform and the transmission of these remote views to the physical mobile device.

In one embodiment, an efficient display encoding pipeline may be implemented at the virtual mobile device platform to process display frames generated by a guest operating system (OS) executing on a virtual device executing on a virtual machine in the virtual mobile device platform. The display encoding pipeline may include a pre-processor operating in a display thread of the virtual machine and a display encoder. The display system of the guest OS may generate a display frame including pixel data in an RGB color space. This pixel data may be grouped or organized into a set of macroblocks. The pre-processor may perform a number of tasks on the display frame generated by the display system of the guest OS including converting the frame to a YUV color space. The display encoder of the display pipeline may encode the converted frame to send the encoded frame to the physical mobile device where it may be presented the physical mobile device.

To achieve efficiencies, within this display pipeline a number of optimizations may be implemented according to certain embodiments. For example, in one embodiment, the frame generation of the display system of the guest OS may be synchronized with the output of the display encoder by using the output of an encoded frame by the display encoder of the pipeline to unblock the display system of the guest OS by signaling the display system's capability to cause the display system of the guest OS generate another frame.

Similarly, in one embodiment, the display thread of the virtual machine in which a pre-processing component of the display encoding pipeline is being executed may be synchronized with the output of the display system of the guest OS such that the display thread of the virtual machine platform only performs processing when triggered by the output of a display frame by the display system of the guest OS.

To further synchronize the components of the display encoding pipeline of the virtual mobile device platform, in some embodiments a frame rate governor may also be utilized to reduce the processing caused by, for example, applications that repeatedly generate duplicative frames. For example, a governor that can detect and compare frames from an application and throttle the frame processing for the application if one or more duplicative frames are generated within a particular time frame. The throttling can be graduated or staged depending on, for example, the number of duplicative frames or the time period.

Moreover, in some embodiments, the type of data in each macroblock of a frame may be detected. Different encoding schemes may be applied to different macroblocks based on the different types of data detected. In this manner, the data can be more efficiently encoded, both from a compression standpoint (e.g., better compression may be achieved) but additionally, from a computational resources standpoint (e.g., fewer computational resources may be required to perform such encoding).

These types of efficiencies may also be achieved in certain embodiments by employing efficient color space conversion and encoding of the display frame. In particular, in certain embodiments macroblocks of a display frame that are unchanged or have not moved (referred to as Zero Motion Vector or ZMV macroblocks) with respect to a previous frame may be detected.

Based on the detection of these ZMV macroblocks, color space conversion and encoding may not be performed. Instead, a previously encoded version of this macroblock may be utilized, obviating the need to (re) perform color space conversion or encoding of those macroblock. Accordingly, the computing resources that would be required to perform such (re) converting or encoding may be avoided.

While almost any method desired may be utilized to detect such ZMV macroblocks, in one embodiment, the detection of these ZMV macroblocks may also be performed in an efficient manner by efficiently making memory comparisons of macroblock data between current frame data and previous frame data using a particular set of instructions to effect a line by line comparison. By comparing and conditionally copying in this manner, what would be a separate compare and a separate copy step is essentially transformed into a conjoined compare and copy step.

Accordingly, embodiments as disclosed herein may achieve a number of efficiencies including reduction in the amount of computational resources consumer (e.g., use of CPU cycles or memory) and better compression (e.g., smaller size or higher quality data for the same relative size) which may, in turn, result in reduced latency or lower bandwidth usage. Such efficiencies may be especially useful in the implementation of display encoding pipelines in virtual mobile device platforms.

Specifically, in one embodiment, a system for a virtual mobile device platform with efficient frame processing, can include a virtual mobile device platform coupled to a physical mobile device over a network where the virtual mobile device platform includes a processor executing instructions on a non-transitory computer readable medium for implementing a virtual machine. The virtual machine may execute a virtual mobile device associated with a physical mobile device communicating with the virtual mobile device platform over the network, the virtual mobile device including a guest operating system (OS) and one or more applications executing on the guest OS. The guest OS generates a frame of display data from an application executing on the guest OS. The virtual mobile device may include a video encoder including an input/output (I/O) thread for generating a converted frame by performing color space conversion on the frame of display data generated by the guest OS and a display encoder for generating an encoded frame by encoding the converted frame generated by the I/O thread. The I/O thread includes a zero motion vector (ZMV) detector to identify, for each macroblock of the frame, whether the macroblock is a ZMV macroblock by comparing the frame to a previous frame. Color space conversion can be performed based on the identification of the macroblock. The identification of whether each macroblock is a ZMV macroblock may be, for example, stored in metadata associated with the frame. The encoded frame is sent to the physical mobile device by the virtual mobile device platform.

In particular, according to certain embodiments, color space conversion may be performed only on macroblocks of the frame not identified as ZMV macroblocks.

In some embodiments, the converted frame may be encoded based on the identification of macroblocks of the frame, and the encoding of the converted frame comprises only encoding macroblocks of the converted frame not identified as ZMV macroblocks.

In one embodiment, a system for a virtual mobile device platform with efficient frame processing, can include a virtual mobile device platform coupled to a physical mobile device over a network where the virtual mobile device platform includes a processor executing instructions on a non-transitory computer readable medium for implementing a virtual machine. The virtual machine may execute a virtual mobile device associated with a physical mobile device communicating with the virtual mobile device platform over the network, the virtual mobile device including a guest operating system (OS) and one or more applications executing on the guest OS. The guest OS generates a frame of display data from an application executing on the guest OS. The virtual mobile device may include a video encoder including an input/output (I/O) thread for generating a converted frame by performing color space conversion on the frame of display data generated by the guest OS and a display encoder for generating an encoded frame by encoding the converted frame generated by the I/O thread. The I/O thread includes a content type detector to identify, for each macroblock of the frame, whether the macroblock is a high-frequency macroblock or a low-frequency macroblock, and each macroblock is encoded by the display encoder based on the identification of the macroblock. The identification of each macroblock may be, for example, stored in metadata associated with the frame. The encoded frame is sent to the physical mobile device by the virtual mobile device platform.

According to a particular embodiment, the display encoder includes a high-frequency encoder and a standard encoder, and encoding the converted frame comprises encoding macroblocks of the converted frame identified as high-frequency macroblocks with the high-frequency encoder and encoding macroblocks of the converted frame identified as low-frequency macroblocks with the standard encoder. The high-frequency encoder may be, for example, a zip encoder and the low-frequency encoder may be a H.264 encoder.

In an embodiment, the identification of a macroblock as a high-frequency macroblock or a low-frequency macroblock comprises determining a spectral difference between an upper half of the macroblock and a lower half of the macroblock and identifying the macroblock as a high-frequency macroblock or a low-frequency macroblock based on the spectral difference. The determination of the spectral difference may include performing a zig-zag scan to determine a Discrete Cosine Transform (DCT) coefficient array representing a spectral energy of the macroblock.

In certain embodiments, determining the spectral difference comprises determining a low frequency energy from the DCT coefficient array based on low frequency coefficients of the DCT coefficient array and a high frequency energy based on high frequency coefficients of the DCT coefficient array, and comparing the low frequency energy with the high frequency energy to determine the spectral difference.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION OF THE INVENTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As described above, a mobile device lives in a hostile world and, as such, securing the device itself may not be enough and/or possible. There is a desire to separate a physical device from applications that run on the device. Embodiments disclosed herein can remove the applications and services, even much of the device's operating environment from the hostile environment. Instead, these functions are provided on protected hardware and software in a data center where they can be managed, monitored, repaired, and deployed under the care of information technology (IT) experts and administrators.

Figure 1:
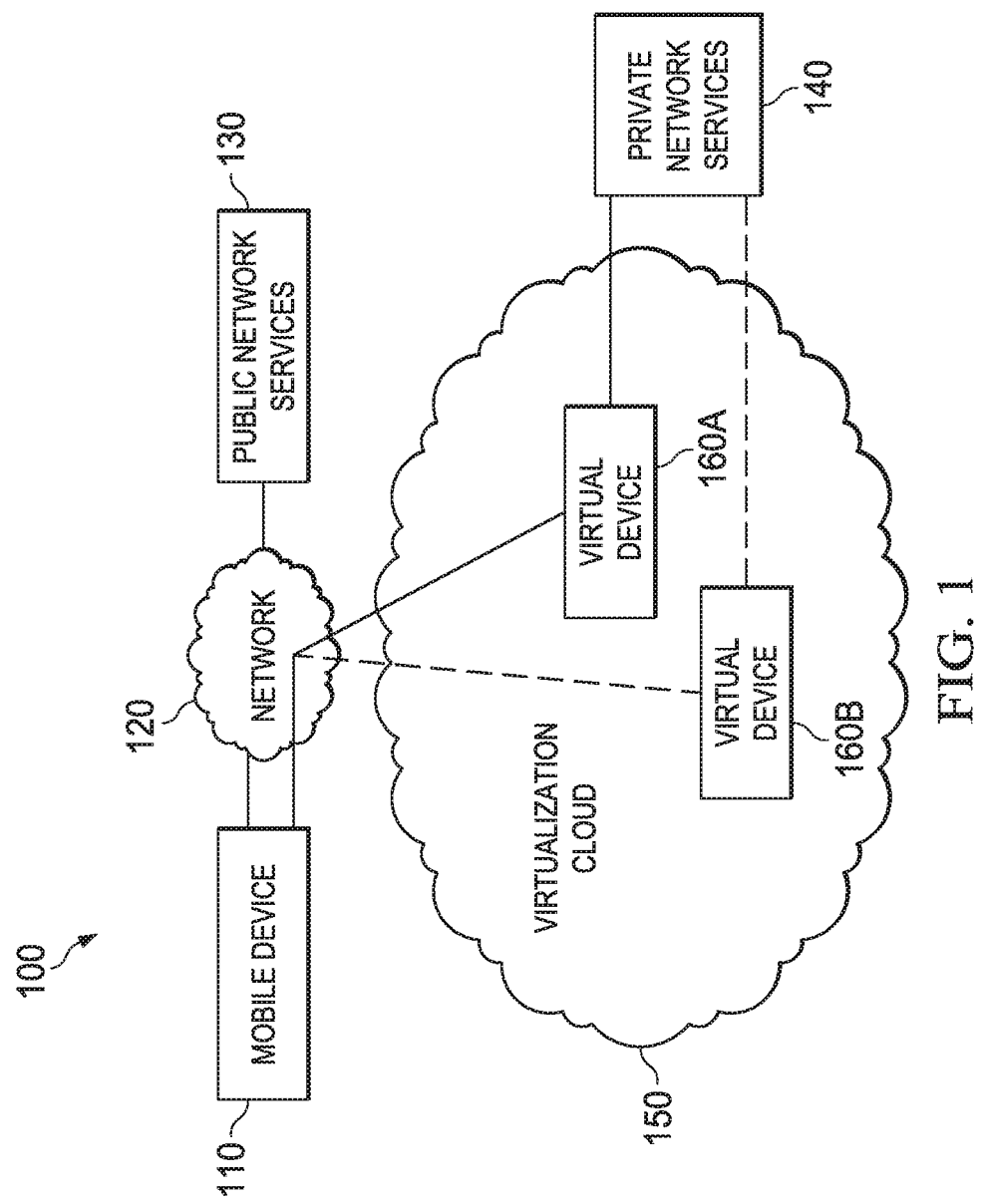
FIG. 1 depicts a diagrammatic representation of an example of an overall network environment in which embodiments disclosed herein may be implemented.

As illustrated in FIG. 1, embodiments disclosed herein can allow a user of mobile device 110 in network environment 100 to switch between using public network services 130 and using private network services 140. In particular, the user may access public network services 130 via public network 120 such as the Internet over which non-sensitive information may be communicated. However, to access private network services 140, a virtualization cloud client application (referred to hereinafter as a "VC client application") running on mobile device 110 connects to a virtualized device (e.g., virtual device 160A) hosted in virtualization cloud 150 and brokers access to private network services 140 as well as local device functions.

Those skilled in the art will appreciate that local device functions may vary depending upon the type of mobile device 110. For example, mobile device 110 can be a touchscreen smartphone with local device functions such as the touch screen, the dialer/phone network, camera, Global Positioning System (GPS), keyboard, speakers, microphone, and so on. Other examples of mobile device 110 may include touchscreen tablets and other touch-enabled mobile devices. As will be explained in further detail below, such mobile device functions can be provided by embodiments disclosed herein on protected hardware and software in virtualization cloud 150 without adversely affecting the user's experience in interacting with mobile device 110, even if the user travels frequently from one continent to another.

In some embodiments, multiple virtualized devices may be created for the same physical device. For example, in FIG. 1, virtual device 160A and virtual device 160B may be created for mobile device 110. This feature is further described below with reference to FIG. 2.

Figure 2:
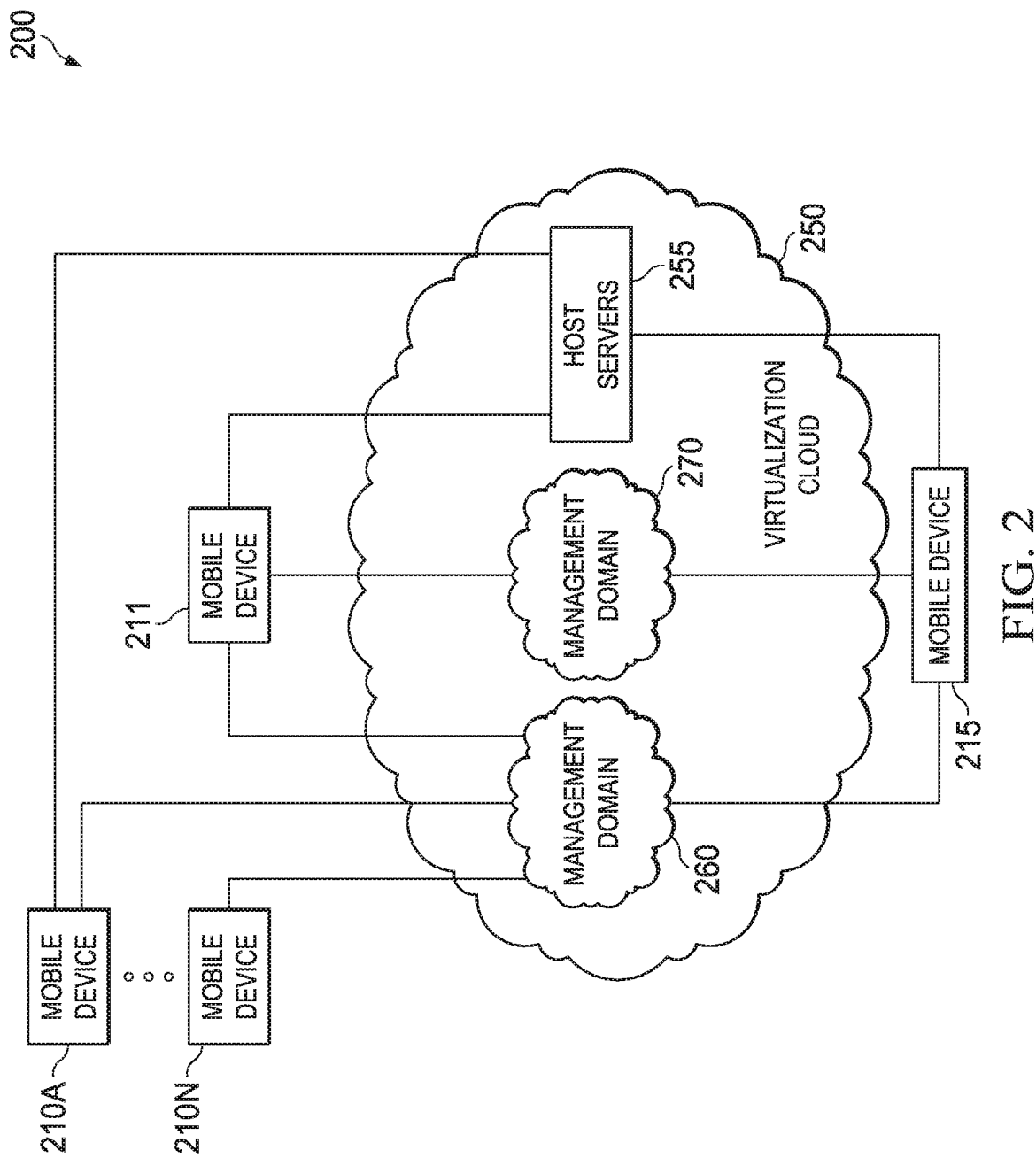
FIG. 2 depicts a diagrammatic representation of an example of a network architecture according to one embodiment.

FIG. 2 depicts a diagrammatic representation of an example of a network architecture according to one embodiment. In this example, system 200 may include virtualization cloud 250 communicatively connected to various types of mobile devices 210A . . . 210N, 211, and 215. Mobile devices 210A . . . 210N, 211, and 215 may represent different types of actual touchscreen devices such as smartphones and tablets. Mobile devices 210A . . . 210N, 211, and 215 may be owned by the same or different entities (e.g., enterprises, users, etc.). Further, mobile devices 210A . . . 210N, 211, and 215 may be programmed with different operating systems such as iOS, Android, and Windows.

Each of mobile devices 210A . . . 210N, 211, and 215 may have a VC client application installed, for instance, by an administrator or IT personnel of system 200. In one embodiment, a VC client application may be downloaded from an online device-specific app store.

In one embodiment, a VC client application may comprise software that brokers access to mobile devices' physical interfaces (e.g., soft and hard keyboards, touchscreen, GPS, camera, accelerometer, speakers, microphone, phone dialer, etc.) and Virtual Private Network (VPN) software that connects across a public network such as the Internet to servers in a virtualization cloud (e.g., virtualization cloud 150 of FIG. 1) over encrypted network interfaces. Virtualization cloud 250 may be an embodiment of virtualization cloud 150 described above with reference to FIG. 1.

Virtualization cloud 250 provides a hosted, networked, application environment. As a non-limiting example, in one embodiment, virtualization cloud 250 is configured as an Android application environment. As illustrated in FIG. 2, virtualization cloud 250 may comprise host servers 255 and management domains 260, 270.

Host servers 255 may host application services. Private network services 140 of FIG. 1 may be an embodiment of application services hosted by host servers 255 of FIG. 2. In one embodiment, a plurality of application services may execute on a collection of servers with extensions to support separation and segmentation of a core server.

Each management domain may comprise a collection of virtualized devices, hosted on one or more server machines. In an Android application environment, such virtualized devices may be referred to as virtual Android devices. From another perspective, a management domain is made up of a collection of server machines providing services to a large number of users. A collection of server machines may host virtual devices for these users and provide access to the applications and services via a remote client interface. In some embodiments, a management domain may further comprise a private application "store" for hosting installable approved enterprise applications particular to that management domain. In some embodiments, a user can have access to one or more "virtual devices" hosted in the management domain, each virtual device containing a core set of applications such as an enterprise address book, mail, calendar, web browser, etc. in addition to any preinstalled enterprise applications.

As FIG. 2 exemplifies, each mobile device (e.g., mobile device 210A, mobile device 211, mobile device 215, etc.) has a connection (via a VC client application installed thereon) to one or more server machines that host their virtual device(s) in a virtualization cloud (e.g., virtualization cloud 250). As explained below, the applications and their data located within a single virtual device are completely inaccessible to the applications and data in another virtual device. The applications are limited to the network services within their management domain and thus cannot access the network services provided in other management domains. For example, mobile device 210A may have a first virtual device hosted on a first server machine in management domain 260 and a second virtual device hosted on a second server machine in management domain 270. However, the applications and their data located within the first virtual device in management domain 260 are completely inaccessible to the applications and data within the second virtual device in management domain 270.

In some embodiments, for each connection to an application service hosted in the virtualization cloud, a different instance of the VC client application is started on the mobile device. For example, a first VC client instance may be started on mobile device 210A to access management domain 260 and a second VC client instance may be started on mobile device 210A to access management domain 270. All of the applications running in a particular management domain for a particular user will be accessed through the corresponding VC client application running on the mobile device. Additionally, the VC client application's remote connection software running in a mobile device does not expose application generated events running natively within the mobile device to the applications running in their virtual device(s), unless they are specific events from the devices brokered by the VC client application. In this way, rather than executing mobile applications in an actual device (e.g., mobile device 210A, etc.), the applications are run remotely in a virtualization cloud (e.g., virtualization cloud 250) under the watchful eyes of an enterprise's systems and network management tools and their administrators, separate from each other and from the consumer/Internet applications and data.

Figure 3:
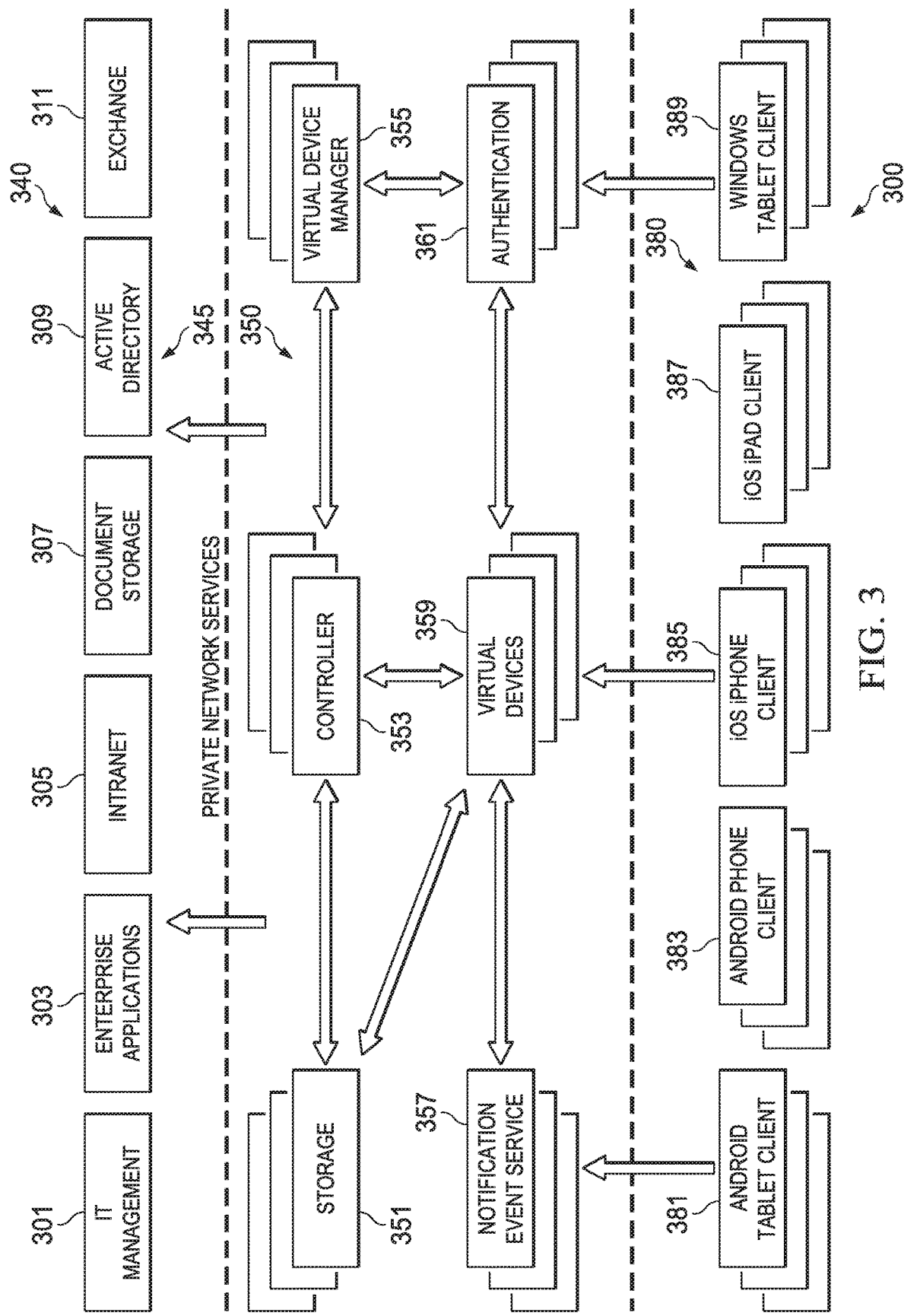
FIG. 3 depicts a diagrammatic representation of an example of a system architecture according to one embodiment.

Turning now to FIG. 3, which depicts a diagrammatic representation of an example of a system architecture according to one embodiment. In this example, system 300 comprises virtualization cloud 350 communicatively connected to private network services 340 and various types of mobile devices 380.

Mobile devices 380 may operate in a distributed computing environment and may operate on various types of operating systems. Similar to mobile devices 110, 210A . . . 210N, 211, 215 described above, each of mobile devices 380 may have a VC client application installed thereon. The installed VC client application may be device-specific. For example, each of Android tablets 381 may have an Android tablet client, each of Android phones 383 may have an Android phone client, each of iOS iPhones 385 may have an iOS iPhone client, each of iOS iPads 387 may have an iOS iPad client, and each of Windows tablets 389 may have a Windows tablet client.

Private network services 340 may comprise enterprise services for private network 345. Non-limiting examples of private network services 340 may include IT management 301, enterprise applications 303, intranet 305, document storage 307, active directory 309, and email exchange 311. These services are known to those skilled in the art and thus are not further described herein.

Virtualization cloud 350 may comprise a plurality of system components, including storage 351, controller 353, virtual device manager 355, notification event service 357, virtual devices 359, and authentication 361. These system components may run on a single server machine or separately on multiple server machines. For the sake of convenience, and not of limitation, FIG. 3 shows each system component running on multiple physical servers.

More specifically, virtual device manager 355 (an application that manages virtual devices) may send a command to controller 353 to create a virtual device. In one embodiment, controller 353 may implement the OpenStack open source cloud computing fabric controller. OpenStack is known to those skilled in the art and thus is not further described herein for the sake of brevity.

In response to the command from virtual device manager 355, controller 353 may first select a golden image, and any applications associated with the golden image. A golden image refers to a virtual machine that was built as a template and that usually contains little, if any, more than the base operating system. A golden image may also be referred to as a gold image, clone image, master image or base image. To create a golden image, an administrator first sets up the computing environment exactly the way it is needed and then saves the disk image as a pattern for making more copies. The use of golden images can save time and ensure consistency by eliminating the need for repetitive configuration changes and performance tweaks. This approach can be compared to automated replication, which requires a configuration management tool to build new images on demand. In a self-service provisioning environment, a collection of golden images may be referred to as a golden repository, gold catalog or golden image library.

Using the selected golden image, controller 353 may create virtual device instance 359 and associate with it a storage location in storage server 351. Storage server 351 holds the persisted, physical storage of each virtual device created by controller 353. Controller 353 may then return the information on virtual device instance 359 to virtual device manager 355.

In some embodiments, each user is assigned one or more virtual devices in one or more management domains when they are provisioned. These virtual "devices" contain applications, their settings and device configuration, as well as any data created locally in the device for the user by any installed applications. The images are maintained in network storage servers (e.g., storage servers 351) within the corresponding management domain(s). In some embodiments, as part of this image, the user is provided an emulated "flash" drive for app storage. The images can also be configured to permit access to external enterprise storage. In some embodiments, storage servers may utilize redundant storage to protect data from failures.

In some embodiments, authentication servers 361 may be configured to provide authentication and session management services. For example, when a user (via a VC client application running on a mobile device that the user is using) attempts to access an enterprise application, authentication server 361 may connect to one or more directory servers (e.g., active directory 309) to authenticate the user's access to virtual device(s) where the enterprise application can be run and to provision the user with one or more virtual devices. After the user authenticates, authentication server 361 may direct virtual device manager 355 to locate a device server that will host the user's virtual device 359. In some embodiments, it may ensure that virtual device 359 is "powered on" as well as initiate the initial session negotiation (via establishment of security tokens) between the mobile device running the VC client application and virtual device 359.

Those skilled in the art will appreciate that a virtual "device" is a not really a device—it is a remote execution environment for all of the services and applications that make up a device. There are (at least) two main classes of device servers, "bare metal" device servers and virtual machine device servers. There are some functional, deployment, and cost differences between these types and so ultimately implementation and market demand will determine their allocation and availability.

The bare metal device servers are made up of a large number of relatively small processing units similar in performance and scale to the processing units of actual mobile devices. Each virtual device instance can run on its own physical central processing unit ("CPU") hardware. In some embodiments, a modified version of the Simple Protocol for Independent Computing Environments (SPICE) protocol server software executes directly in the operating system (OS) on each of these instances to provide remote access.

SPICE is an open source protocol and implementation developed by Red Hat that provides remote access to virtual desktops. SPICE has a well-documented protocol that includes the ability to create new "channels" for different remote services. Embodiments extend the SPICE protocol to provide remote access to virtual devices and to broker access to the sensors of the real (physical) devices.

Virtual machine device servers are server class machines that can be found in the server market today. On the virtual machine device servers, each virtual "device" executes in its own virtual machine on a specially configured Linux device server. In some embodiments, a device server may be configured to provide Transport Layer Security (TLS) and VPN encryption, virtual device instrumentation/auditing, integrity checks and anti-virus from virtualization layer, system-side application management, learning of 'normal' behavior, protocol aware firewall, server-side TPM attestation, SELinux-based virtual device separation, VPN service for applications in the virtual devices, and network proxy for traffic monitoring. Some of these features are further explained below.

In some embodiments, virtual devices hosting Android (or Security Enhancements for Android (SEAndroid)) may be created for each user using Linux's Kernel-based Virtual Machine (KVM) and Quick EMUlator (QEMU).

KVM refers to a kernel-resident virtual machine infrastructure built directly into Linux as opposed to other virtualization techniques that run under Linux as a process. This architecture helps KVM operate very efficiently within Linux. KVM provides completely separate virtual environments for Android devices implementing embodiments disclosed herein. KVM itself does not provide any hardware emulation or remoting capabilities.

QEMU is a user-space emulator that works with KVM to provide the hardware emulation. While QEMU can provide processor instruction emulation, embodiments may employ it only for emulating hardware for the virtual device. For example, some embodiments use or provide emulated hardware for touch screen/display, memory/storage, audio, cameras, sensors, bypass, and networking.

Linux and KVM provide the isolation between each user and the applications that they run. It is not possible to communicate directly between the application components and services in these separate virtual containers. Thus, each "device", while sharing physical server hardware, runs independently and is separate from the others, as depicted in FIG. 4.

Figure 4:
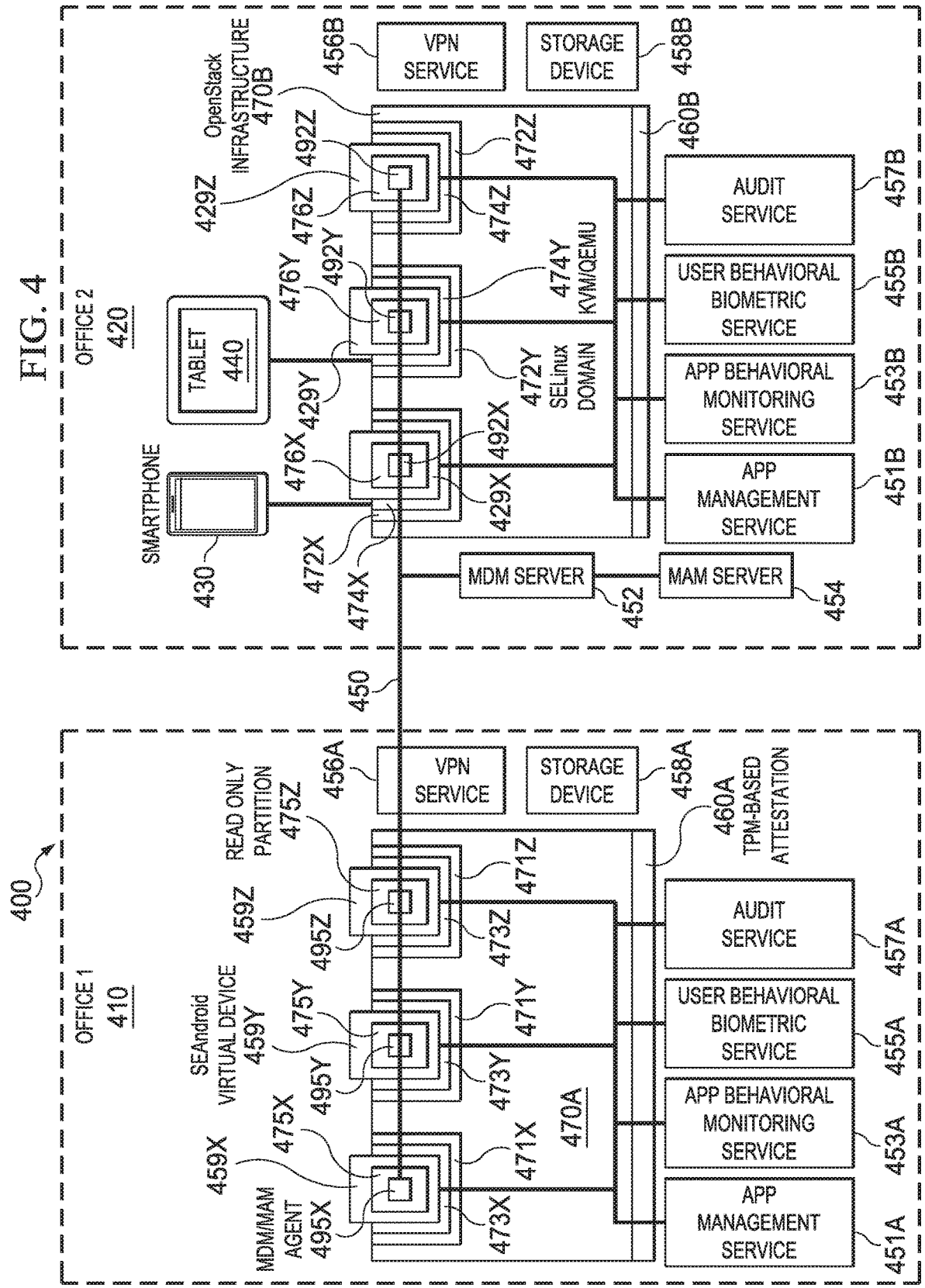
FIG. 4 depicts a diagrammatic representation of an example of virtual device containment and connections according to one embodiment.

FIG. 4 depicts a diagrammatic representation of an example of virtual device containment and connections according to one embodiment. In this example, virtualization cloud 400 may comprise management domain 410 (Office 1) and management domain 420 (Office 2).

Management domain 410 and management domain 420 may be hosted on device servers connected to management network 450 which provides a plurality of network services such as application management services 451A, 451B, application behavioral monitoring services 453A, 453B, user behavioral biometric services 455A, 455B, and audit services 457A, 457B.

Management domain 410 may comprise a plurality of virtual devices 459X, 459Y, 459Z implemented using OpenStack infrastructure 470A on Trusted Platform Module (TPM)-based attestation 460A. Each of the plurality of virtual devices 459X, 459Y, 459Z may include an agent of management network 450 (e.g., agents 495X, 495Y, 495Z, respectively). In some embodiments, the agent may be referred to as a mobile device management and mobile application management (MDM/MAM) agent. In this example, management domain 410 may further comprise VPN service 456A and storage service 458A.

Management domain 420 may comprise a plurality of virtual devices 429X, 429Y, 429Z implemented using OpenStack infrastructure 470B on TPM-based attestation 460B. Each of the plurality of virtual devices 429X, 429Y, 429Z may include an agent of management network 450 (e.g., agents 492X, 492Y, 492Z, respectively). In this example, management domain 420 may further comprise MDM server 452, MAM server 454, VPN service 456B, and storage service 458B.

As illustrated in FIG. 4, each of the plurality of virtual devices 459X, 459Y, 459Z in management domain 410 and each of the plurality of virtual devices 429X, 429Y, 429Z in management domain 420 has a read only partition and its own KVM/QEMU in a particular SELinux domain (e.g., read only partition 475X and KVM/QEMU 473X in SELinux domain 471X, read only partition 475Y and KVM/QEMU 473Y in SELinux domain 471Y, read only partition 475Z and KVM/QEMU 473Z in SELinux domain 471Z, read only partition 476X and KVM/QEMU 474X in SELinux domain 472X, read only partition 476Y and KVM/

QEMU 474Y in SELinux domain 472Y, read only partition 476Z and KVM/QEMU 474Z in SELinux domain 472Z).

In the example of FIG. 4, the virtual devices are implemented as SEAndroid virtual devices. SEAndroid may provide benefits such as privileged daemon protection, application isolation, middleware controls, instrumentation and auditing, application install protection, limit application access to sensors, 'untrusted' application sandboxing, read-only core OS partition, centralized patching, and MDM/MAM controls.

In some embodiments, virtual devices can be migrated between device servers by administrative commands (via management network 450), using tools to automate the balancing of load across multiple device servers or based on geographical location.

Each of these virtual devices may be connected to a physical mobile device (e.g., smartphone 430, tablet 440, etc.). In some embodiments, a VC client application running on the physical device may be configured to provide remote two factor authentication, remote signing and decryption, TLS encryption for data in transit, GPS-based access policies, attributes exposed for MDM integration, mechanisms to improve attestation, and/or integration with the mobile device's Mobile Trusted Module (MTM).

When a user is added to a management domain, they are provisioned with a virtual device of a particular type. Similarly, when a user is removed, their virtual devices must be deactivated and their "parts" archived or reclaimed. A separate management server is used by administrators to manage the lifecycle of devices and users of a virtualization cloud (e.g., virtualization cloud 150, virtualization cloud 250, virtualization cloud 350, virtualization cloud 400, etc., collectively referred to hereinafter as the "VC system"). In some embodiments, provisioning services permit administrators to define device "types" (templates) and configurations and assign them to users depending upon the role or duty.

In some embodiment, the management of the VC system and the virtual devices can be controlled through a management policy system. Servers, storage, and virtual devices can be associated with hierarchically arranged policy containers. Policies and access to components can be controlled through these containers and their position in the hierarchy. In some embodiment, these policy containers may be referred to as policy domains and can be used to allocate and delegate control to multiple administration management domains.

For example, consider a hosted VC environment. A hosting partner wishes to support multiple enterprise customers in a single installation. At the same time, they would like to delegate much of the management to their customers. They may choose to create a single policy domain that contains shared resources such as common virtual device images, common device storage, and a shared pool of device servers. For each new customer, they create a sub-domain and grant administrative access to the customers' administrators for their respective sub-domain. In addition, they create a policy in the root domain that all resources are accessible to the sub-domains. The customers' administrators can now create assets (new device image templates, users, administrators, groups) within their own sub-domain. They, in turn, can create their own sub-domains and assign assets, users, groups, administrators, etc. to those sub-domains as well as policies to determine how resources can be inherited from the companies' sub-domain.

If one of these customers wants dedicated server resources to run the virtual devices or to maintain their storage, the hosting partner can add device server and storage server resources to their sub-domain(s) and thus only their virtual devices will be running or be saved on those server assets. Similarly, those systems might have different networking characteristics that would let them share a VPN connection to the enterprise as opposed to configuring a VPN within each of the virtual devices.

This organization can also be beneficial to enterprises that need to delegate management functions to different departments within their enterprise yet want to control and maintain the overall infrastructure centrally.

When migrating a user between two templates, the VC system can support intelligent upgrading, including:
Scheduling specific times for upgrades to occur.
Roll back to a previous device template if an error occurs.
Partial, incremental upgrade processes across a user population.
Detection of whether a user is active on a virtual device before enacting the upgrade.
Graceful shut down of a virtual device for which an upgrade is being forced.

As a non-limiting example, in some embodiment, a provisioning and management server for the virtual machine device servers described above can be built on top of a virtual datacenter management platform such as OVirt, OpenStack, or the like. OVirt and OpenStack are known to those skilled in the art and thus are not further described herein. OVirt provides the underlying data services for managing and accessing virtual machines. The VC system provides an abstraction interface that hides much of the complexity of the underlying virtual datacenter management platform when trying to manage multiple management domains within a single system. In some embodiments, SPICE may be integrated into the virtual datacenter management platform, allowing users to connect to virtual machines through SPICE.

In some embodiments, an administrator might want to allow users to access a mobile virtual device without a persist state of the virtual device beyond a given user's session. In this case, the virtual device may be deleted when the session ends. In some embodiments, the virtual device may optionally warn the user that the virtual device is operating on a kiosk mode when the user logs in, and delete the virtual device when the user logs out. Essentially, the kiosk mode provides a 'fresh' virtual device based on a specified template each time a user logs in.

In a variant of the kiosk mode, a virtual device can be set to synchronize certain enterprise data (e.g., recent email) when the user logs into the kiosk mode device, but the virtual device is still deleted when the user logs out. In this way, any new enterprise data is placed back into the enterprise applications that should own each respective data type. This allows the user to move between server node clusters (e.g., moving between countries) without concern about moving or synchronizing virtual device state between the different servers.

The VC system may support additional modes of operation. For instance, a published app mode may enable an organization to offer specific applications in remote 'containers' to large user populations. An example would be a bank using the published app mode to make an online banking application available to its customers, while hosting that online banking application in their own data centers on their own locked down OS image.

In such a published app mode, the end client application icon can be customized to enable white labeling. For example, when the user logs in, the published application is already open and in focus. When the user quits the application, the remote connection closes. In some embodiments, the published app mode can be coupled with the kiosk mode described above such so that the virtual device does not have a persist state.

In some embodiments, an organization may wish to provision a virtual device (whether a full device, kiosk mode, published app, etc.) to a person not employed by that organization, and the user need only download a VC client application or add the account to their existing VC client application on their mobile device(s).

In some embodiments, an organization may wish to provision one or more virtual devices to one or more employees at a partner organization. In this case, the publishing organization can liaise with the consuming organization to add a VC client application and/or set of authentication settings to the consuming organization. One of the advantages of this approach is that the publishing organization can leverage the user provisioning and authentication mechanisms of the consuming organization. For example, access to the VC client application can become a setting in the consuming organization's active directory, and users in the consuming organization must already have authenticated to the consuming organization in order to have access to the publishing organization's applications/virtual devices.

In this scenario, doing two remoting steps would add latency and complexity to the VC system. To avoid this, when the user connects to the publishing organization's virtual device, the VC client application on the user's physical device can connect to the publishing organization's VC servers via a bypass channel in the VC server of the consuming organization.

As described above, SPICE can create new "channels" for different remote services. Different types of data can be communicated between a mobile device running a VC client application and a virtual device running in the VC system via different SPICE channels. These SPICE channels are mapped to virtual input/output channels.

Figure 5:
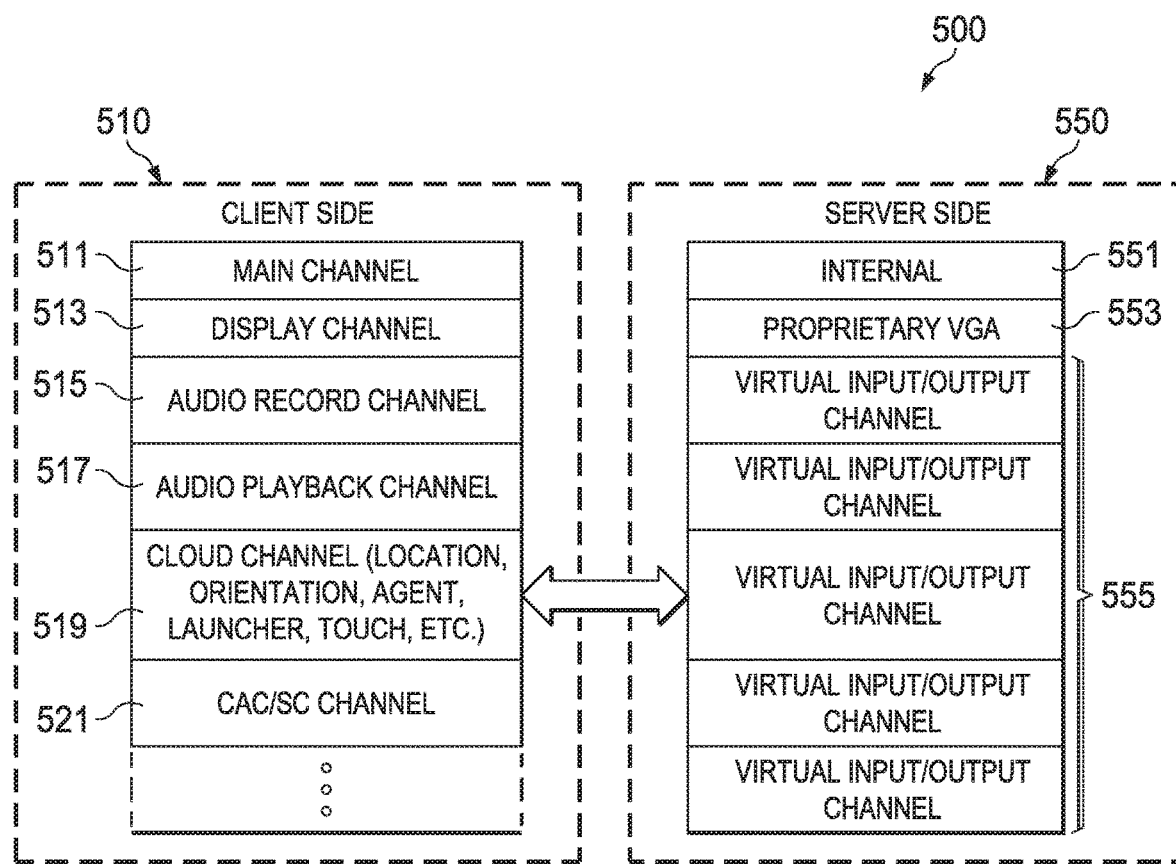
FIG. 5 depicts a diagrammatic representation of an example of a channel-based device mapping architecture according to one embodiment.

FIG. 5 depicts a diagrammatic representation of an example of channel-based device mapping architecture 500 according to one embodiment. In this example, data (e.g., display data, audio data, location data, etc.) may be communicated from a mobile device (e.g., client side 510) via various SPICE channels (e.g., main channel 511, display channel 513, audio record channel 515, audio playback channel 517, cloud channel 519, Call Admission Control (CAC)/Signaling Controller (SC) channel 521, etc.) to a server in the VC system (e.g., server side 550). Channel-based device mapping architecture 500 may include a virtual device mapping module embodied on a non-transitory computer readable medium and configured for mapping the incoming data to appropriate virtual device component (e.g., internal component 551, proprietary video graphic adapter (VGA) 553, etc.) and/or virtual input/output channels 555, each associated with a particular virtual driver. This is further described below with reference to FIG. 6.

Figure 6:
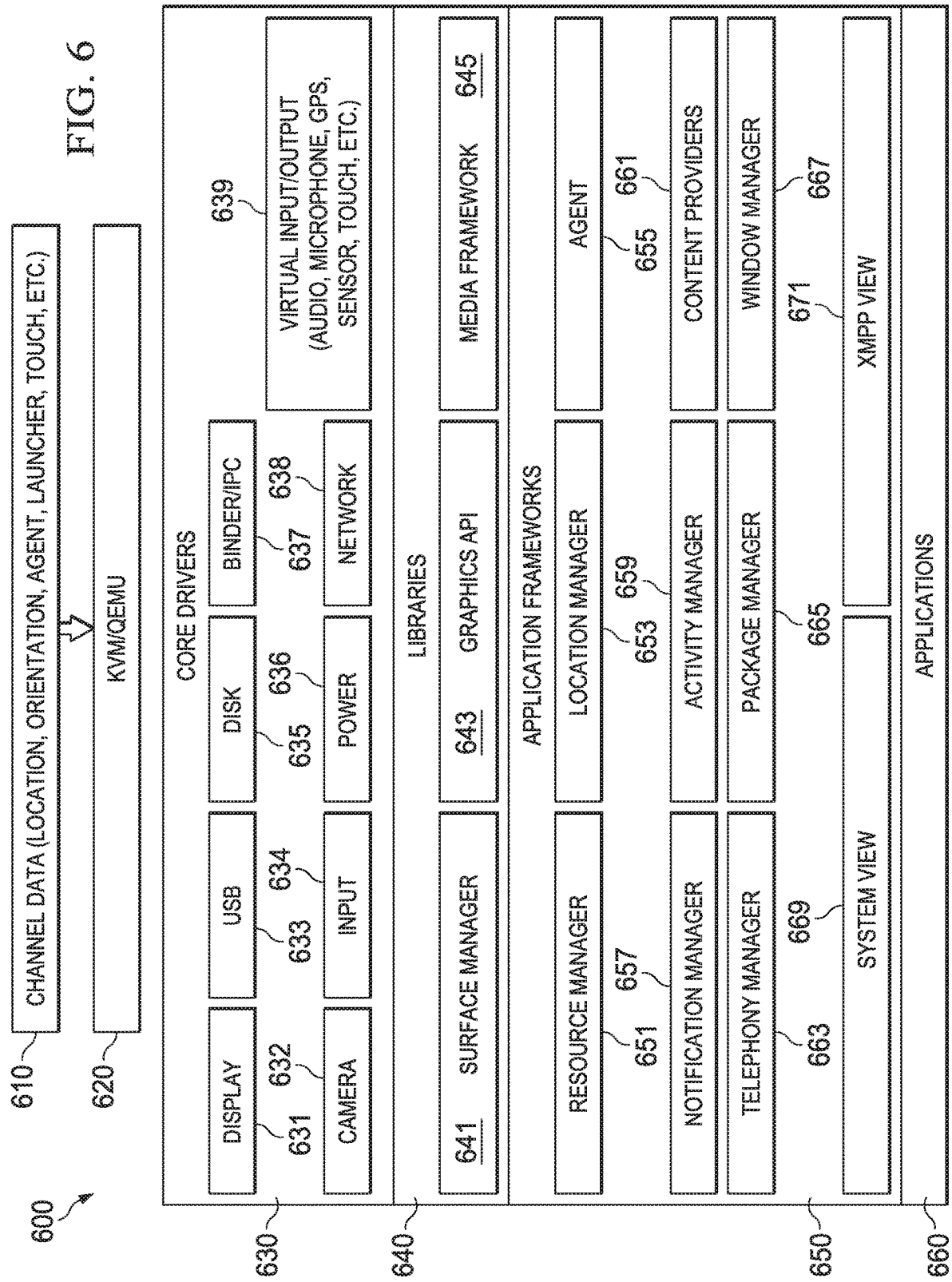
FIG. 6 depicts a diagrammatic representation of an example of virtualization server software architecture according to one embodiment.

FIG. 6 depicts a diagrammatic representation of an example of virtualization server software architecture according to one embodiment. As a non-limiting example, virtualization server software architecture 600 may implement a modified version of Android OS.

As illustrated in FIG. 6, virtualization server software architecture 600 may comprise a plurality of software components. At its core is a Linux kernel with specialized core drivers 630 to abstract the hardware layer from the application runtimes. Channel data 610 are received into a virtual device's KVM/QEMU 620, mapped via virtual input/output channels 639, and handled by corresponding virtual device drivers (e.g., display driver 631, universal serial bus (USB) driver 633, disk driver 635, binder/inter-process communication (IPC) driver 637, camera driver 632, input driver 634, power management 636, and network driver 638, etc.). These "virtual" device drivers replace the drivers for a real device and communicate using QEMU and the SPICE protocol with a VC client application executing on the mobile device for access to the real devices and the services they provide.

Virtualization server software architecture 600 may further comprise a collection of libraries for accessing data, working with text and graphics, encryption and communication, and the underlying OS. In the case of Android OS, each virtual device session includes a full complement of Android's application framework, libraries, runtime, and applications. However, some kernel-based services provided within a virtual device server are modified. For example, power management services are simulated and significantly altered as battery support is not an issue in a virtual device. User interface (UI) indicators for batteries and other elements not applicable to the virtual device can be made to reflect the values of the client device.

As another example, applications running in a virtual device do not use the local device's Wi-Fi or data network. Instead, they use the Internet Protocol (IP)-based network services provided by the virtual device servers. In some embodiments, an "always-on" network interface may be provided to the applications. Wi-Fi 33 and data connectivity management applications the user may install in the virtual device may have no relevance.

Virtualization server software architecture 600 may include additional virtual drivers not shown in FIG. 6. Many of the virtual drivers may communicate with a VC client application running on a mobile device using extensions to the SPICE protocol. Some are designed to improve performance whereas others provide access to features expected in a mobile device. Some example virtual drivers are further described below.

Virtual sensors driver—provides access to the remote client's sensor devices such as the GPS, the gyroscope, the accelerometer, a compass, battery level, Wi-Fi 33 signal strength, and 3G/4G signal strength. Other sensor types can be added as needed.

When an application requests access to a sensor such as the GPS, the sensors driver sends a device message that results in a sensor request being sent to the remote client. The remote client application then makes a similar request to the physical device and begins forwarding sensor data back to the sensor driver as the sensor produces data. When the application no longer needs the sensor information, a close request is sent back to the client where it then stops monitoring the specified sensor.

Some sensors, such as the GPS, can draw significant battery power while running. To prevent unnecessary battery drain, the VC client application running on the physical mobile device can request that the GPS on the local mobile device be turned on or off based on the requirements of applications running on the virtual device in the VC system.

Some sensors such as the accelerometer may change values very frequently. The VC client application can be configured to sample and relay accelerometer values from the local physical device based on attributes and requirements of the app running on the virtual device in the VC system as well as the performance of the network connection between the local and virtual devices (higher network latency and lower available bandwidth result in fewer sensor values being communicated).

A specific example of this is in how the VC system synchronizes the orientation of the remote virtual device to the orientation of the local device by continually monitoring and relaying orientation change events on the accelerometer on the local device, while not relaying every minor rotation of the device all the time even if the application on the remote virtual device is not monitoring the accelerometer data.

Additional sensors that the VC system can remote from the local device to the virtual device may include the network type, network signal strength, battery charge remaining, light sensor (used for screen diming), Bluetooth, peripheral device connectivity and the state of any local payment credential.

Virtual touchscreen driver—supports remoting of multi-touch actions and also gestures. Multi-touch gestures can be used for zooming, rotating and other similar operations. In one embodiment, the SPICE mouse channel may be modified for this purpose. In some embodiments, a designated channel is used for this purpose.

Audio and video bypass driver—improves the performance of audio and video processing for both the VC server and the VC client. While embodiments can work without bypass, there is a CPU cost on both the client and the server when using the internal video processing of the host operating system (e.g., Android). To this end, modified media framework 645 is provided to replace audio and video players that came with the OS with special players that implement the bypass functions. For example, when an application requests to play a video using the Android video player (either full-screen or embedded), the bypass video player captures either the video data or an Universal Resource Locator (URL) that points to an address where the actual video file resides, and passes it via the bypass driver to the remote client. The client then spawns a local video player and plays the video stream. In the case of network video sources, the entire stream can be handled outside of the virtual device via a network proxy.

Audio bypass works much like video bypass. The audio player is replaced to provide proxy access to audio data in the client.

Virtual camera driver—remotes a camera using a combination of a virtual camera device driver and modifications to the camera functions in the media framework. When the camera activity or fragment is loaded in the virtual device, the modified camera viewer and virtual camera driver sends a request to the client to bring up the camera. Once a picture is taken, the picture or video is sent to the virtual device server where it can be placed in the flash storage of the virtual device or can be delivered to an anti-virus scanner and then placed in enterprise storage.

Virtual display driver optimizes delivery of graphics to a remote client. More specifically, the graphics layer can be instrumented to generate messages via a virtual display driver instead of writing directly to a frame buffer. In some embodiments, surface manager 641 in libraries 640 is implemented to handle partial updates to the Android display. In some embodiments, surface manager 641 may work in conjunction with graphics API 643 to provide acceleration for various commands issued by applications and the Android OS.

These and other virtual drivers support remote access for applications 660 running on application frameworks 650 in the virtual device. Operation of the virtual device, including processes associated with applications 660, as well as user behaviors can be monitored via various components in application frameworks 650 (e.g., resource manager 651, location manager 653, agent 655, notification manager 657, activity manager 659, content providers 661, telephony manager 663, package manager 665, window manager 667, system view 669, Extensible Messaging and Presence Protocol (XMPP) communications service 671, etc.), some of which will be further described below.

As described above, a physical mobile device is separated from applications, which are run on protected hardware and software in a data center where they can be managed, monitored, repaired, and deployed under the care of information technology (IT) experts and administrators. As such, visual displays generated by applications run on remote hardware are displayed on the physical mobile device. One challenge in such a system is providing the remote views on the physical device with as little delay as possible. Described below are techniques for providing visual displays in an efficient manner.

To better understand the techniques described below, it is helpful to understand how graphics are displayed on a typical mobile device. For the purposes of this description, an exemplary Android environment will be used to describe how graphics can be displayed on a mobile device. Other examples and environments are also possible, as one skilled in the art will understand. For example, the techniques and embodiments described herein may be utilized in association with iOS, Windows, or the like. Generally, Android applications convert events into visual displays. The Android applications consume events that describe changes in the environment (e.g., GPS) and user actions (e.g., screen touches). After processing these events, apps construct visual displays that (presumably) reflect the meaning of the events.

In some embodiments, a system collects events from a local, physical mobile device, transmits information relating to the events to a distant virtual Android device, and returns the resulting visual display to the local physical device. Such a system presents challenges with issues such as network latency and bandwidth consumption. Described below are techniques that overcome the challenges presented by issues such as network latency and bandwidth consumption. The techniques described improve the responsiveness of remote applications, as well as reduce video bandwidth consumption.

Figure 7A:
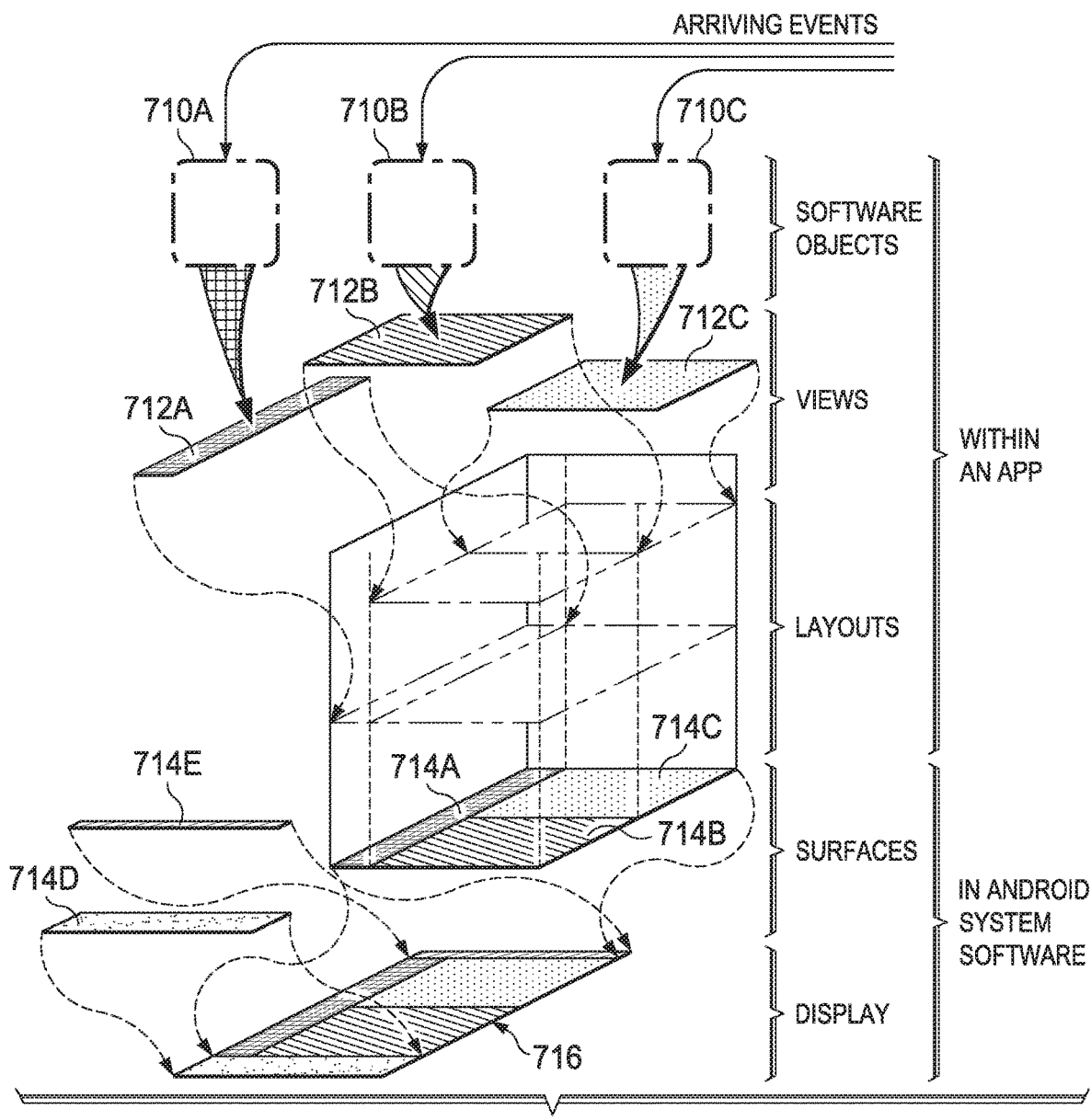
FIG. 7A depicts a diagrammatic representation of an example of an Android graphics stack.

FIG. 7A is a diagram illustrating the structure of an exemplary Android graphics stack in a typical Android application. Generally, the Android system constructs a display through two composition operations, described below. FIG. 7A illustrates functions that happen within an Android application and within the Android system software, as illustrated by the brackets at the far right of FIG. 7A.

Each view in an application's display represents a different way of visualizing the application's internal state. It follows, then, that each view requires unique logic to draw and maintain it. When an application starts, one task is to register with the Android system to receive events. As discussed above, events describe changes to the environment or the user. The events may cause the application to change one or more of its views to reflect the arrival of the event. That is, when a software object receives an event, it may change the way it draws into its view.

FIG. 7A shows events arriving at a plurality of software objects (710A, 710B, 710C) of an application. The events may come from any source, such as sensors, a touch screen, etc. Each software object processes the received events according to the needs of the application. A given application's visual content is typically divided into several sub-areas called "views." The software objects (710A, 710B, 710C) in FIG. 7A draw the views (712A, 712B, 712C), respectively. Each visible application in the Android system has at least one "surface" on which it may draw. With assistance from the Android system, the application composes the views (712A, 712B, 712C) within the application's surface(s), typically (though not necessarily) using objects called "layouts." FIG. 7A shows the resulting surfaces (714A, 714B, 714C). The Android system software also has surfaces it manages for itself, for example, a "navigation bar" surface 714D and a "status bar" surface 714E.

Figure 7B:
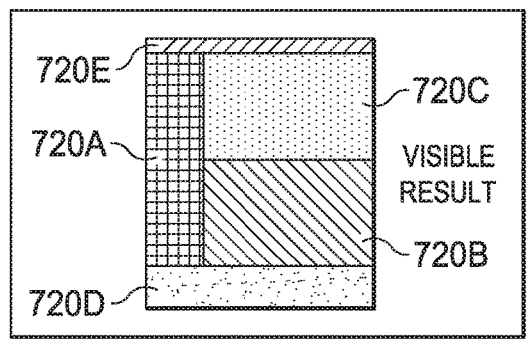
FIG. 7B depicts a diagrammatic representation of a viewable display.

At the bottom of the Android graphics stack illustrated in FIG. 7A, the Android system composes these surfaces into the display 716 the user sees. FIG. 7B shows the visible result of the display, which is what is viewable by a user. The visible result of the display includes components 720A, 720B, 720C, 720D, and 720E originating from the surfaces 714A, 714B, 714C, 714D, and 714E, respectively. When the user switches to a different application, the Android system will compose that application's visual content into the display.

Figure 8:
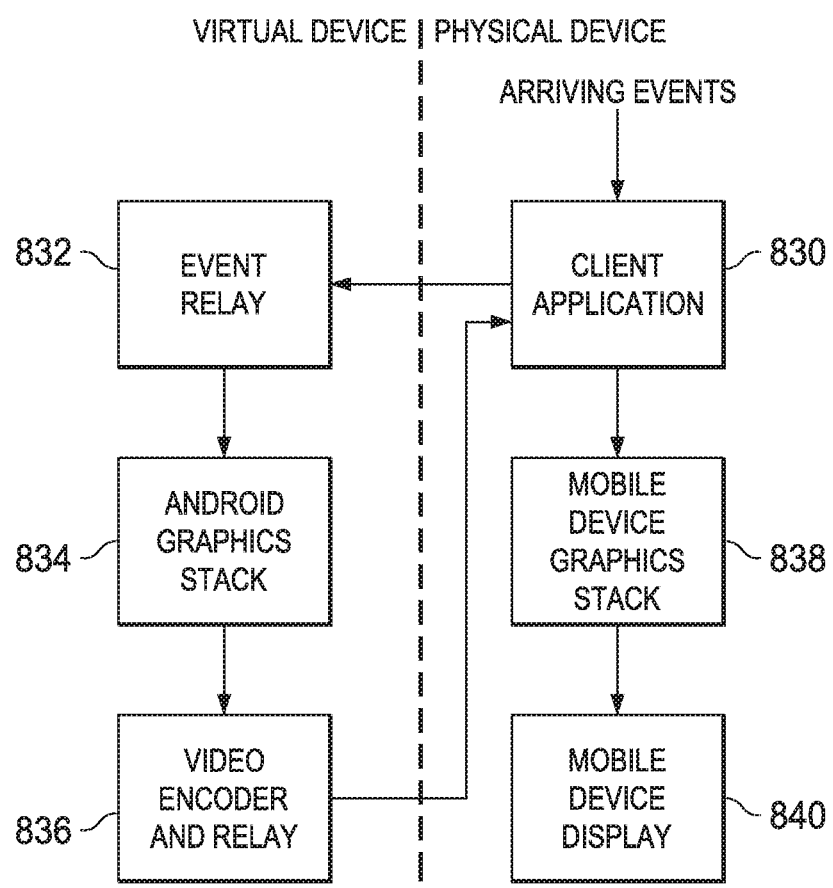
FIG. 8 depicts a diagrammatic representation of an example of a system for generating remote views according to one embodiment.

In the virtual mobile device platform described above, the visual display on the physical mobile device is remote from the virtual device and the virtual device's virtual display. As mentioned, the system collects events from the local, physical device; transmits them to a distant, virtual Android device; and returns the resulting visual display to the local, physical device. FIG. 8 is a block diagram illustrating a system for implementing a process of generating remote views.

FIG. 8 is divided by a dashed line to illustrate the separation between the virtual device and the remote physical device. As shown, events arrive at the physical device, and are provided to the client application 830. The events are relayed to the virtual device via event relay 832. For clarity, FIG. 8 (as well as FIGS. 9, 11, and 12) illustrates an event relay output feeding into the Android graphics stack. However, note that the event relay actually feeds into an application, and thence to the graphics stack. Typically, when an application is running, it incorporates parts of the graphics stack into itself. The events are then processed by the Android graphics stack 834, similar to that described above with respect to FIG. 7A. The resulting display is provided to a video encoder and relay 836. The video encoder and relay encodes and compresses the display information, and returns it back to the client application 830. At the physical device, the client application 830 decodes and decompresses the display information and provides the information to the mobile device graphic stack 838, which then provides display information to the mobile device display 840.

Figure 9:
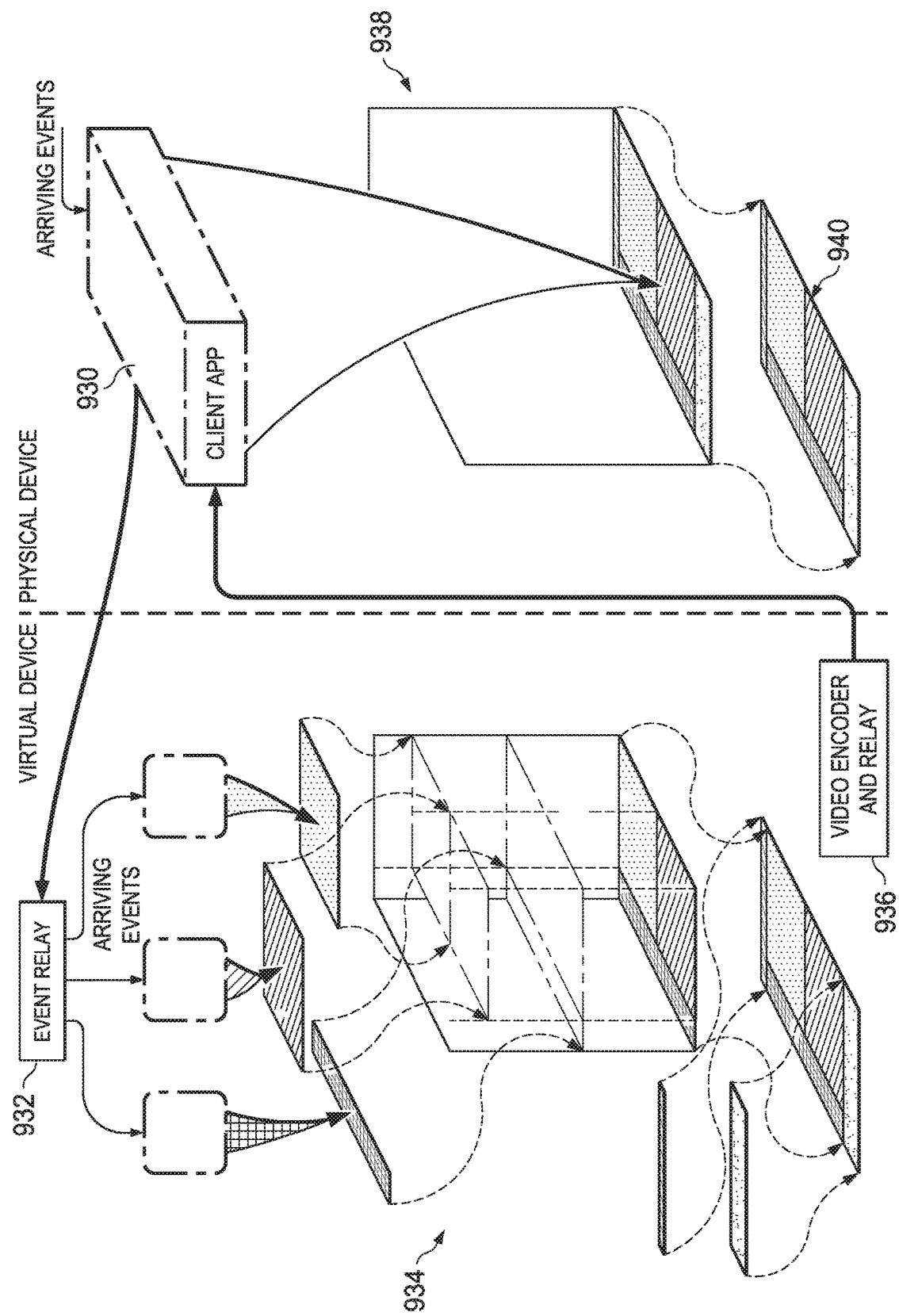
FIG. 9 depicts a diagrammatic representation of an example of a system for relaying the contents of the virtual display to a client running on the physical device according to one embodiment.

FIG. 9 is a diagram illustrating a more detailed example of the system shown in FIG. 8. As before, events arrive at the physical device, and are provided to the client application 930. The events are relayed to the virtual device via event relay 932. The events are then processed by the Android graphics stack 934. The various components of the graphics stack 934 are similar to the components illustrated in FIG. 7A. The resulting display is provided to a video encoder and relay 936. The video encoder and relay 936 encodes and compresses the display information, and sends it to the client application 930. At the physical device, the client application 930 decodes and decompresses the display information and provides the information to the mobile device graphic stack 938, which generates display 940, which is displayed on the display of the physical device.

The system illustrated in FIGS. 8 and 9 has various advantages and disadvantages. First, it always works—in the sense that the physical display will always correctly reflect the content of the remote, virtual display. One challenge with the system shown in FIGS. 8 and 9, however, is that the system is bandwidth intensive. Even with the benefit of data compression, transmitting the entire display to the client consumes a lot of bandwidth. The bandwidth requirement may, in turn, introduce network latency. On a physical device in a user's hand, there is essentially zero latency between when the user generates events and when a locally installed application receives them. Similarly, there's essentially zero latency between when a locally installed application produces new visual content and the display offers it to the user. The mechanism illustrated in FIGS. 8-9 may introduce substantial latency at both points. It is therefore desirable to use techniques to address the bandwidth and latency issues.

Embodiments as disclosed herein may thus address these bandwidth and latency concerns at least in part through the use of an encoder that efficiently compresses the video data. If compressed video is transmitted to the display on the virtual mobile device, one can dramatically lower the bandwidth required to synchronize the displays (e.g., between the virtual mobile device platform and the physical mobile device), as compared to sending raw video data. A good compression algorithm will allow embodiments to be much less sensitive to latency (e.g., network latency). The use of compression may, however, itself introduce some amount of latency due to the time it takes to compress the video data. Moreover, the use of compression in a virtual mobile device environment may introduce additional computational requirements to what may already be a computationally intensive environment. Accordingly, embodiments as disclosed may attempt to optimize the generation and encoding of video data within the context of the virtual mobile device to reduce the computational requirements of the generation and encoding of the video data, reduce latency introduced by the compression itself and reduce the network latency introduced by the transport of poorly encoded video data.

The efficient encoding of display data optimized according to embodiments as disclosed may thus allow for the efficient encoding and transmission of display data generated at the virtualized mobile device to the client application on the physical mobile device including efficient use of available bandwidth on transmission networks. These efficiencies may, in turn, enable a high quality and real-time virtualized user experience at the physical mobile device, even over wireless network connection (e.g., IP based, cellular or other computer based wireless networks). Moreover, by optimizing the generation and encoding of the display data, the use of computing resources at a virtual mobile platform may be reduced; enabling computer hardware to be more efficiently utilized by, for example, enabling more instances of a virtual mobile device platform to be executed on a given set of computer hardware.

Figure 10A:
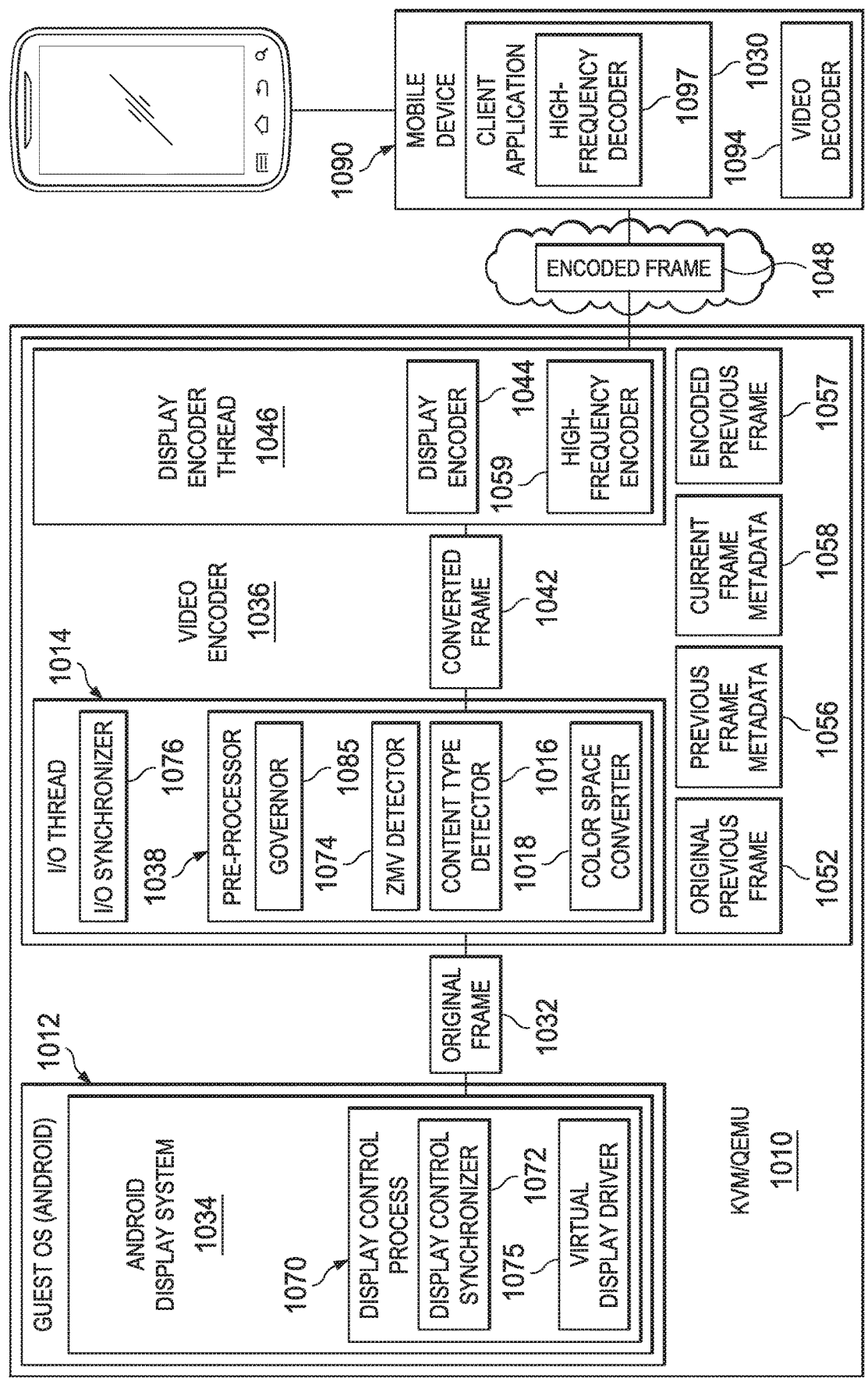
FIGS. 10A and 10B depict a diagrammatic representation of one embodiment of a portion of an architecture for a virtual mobile platform.
Figure 10B:
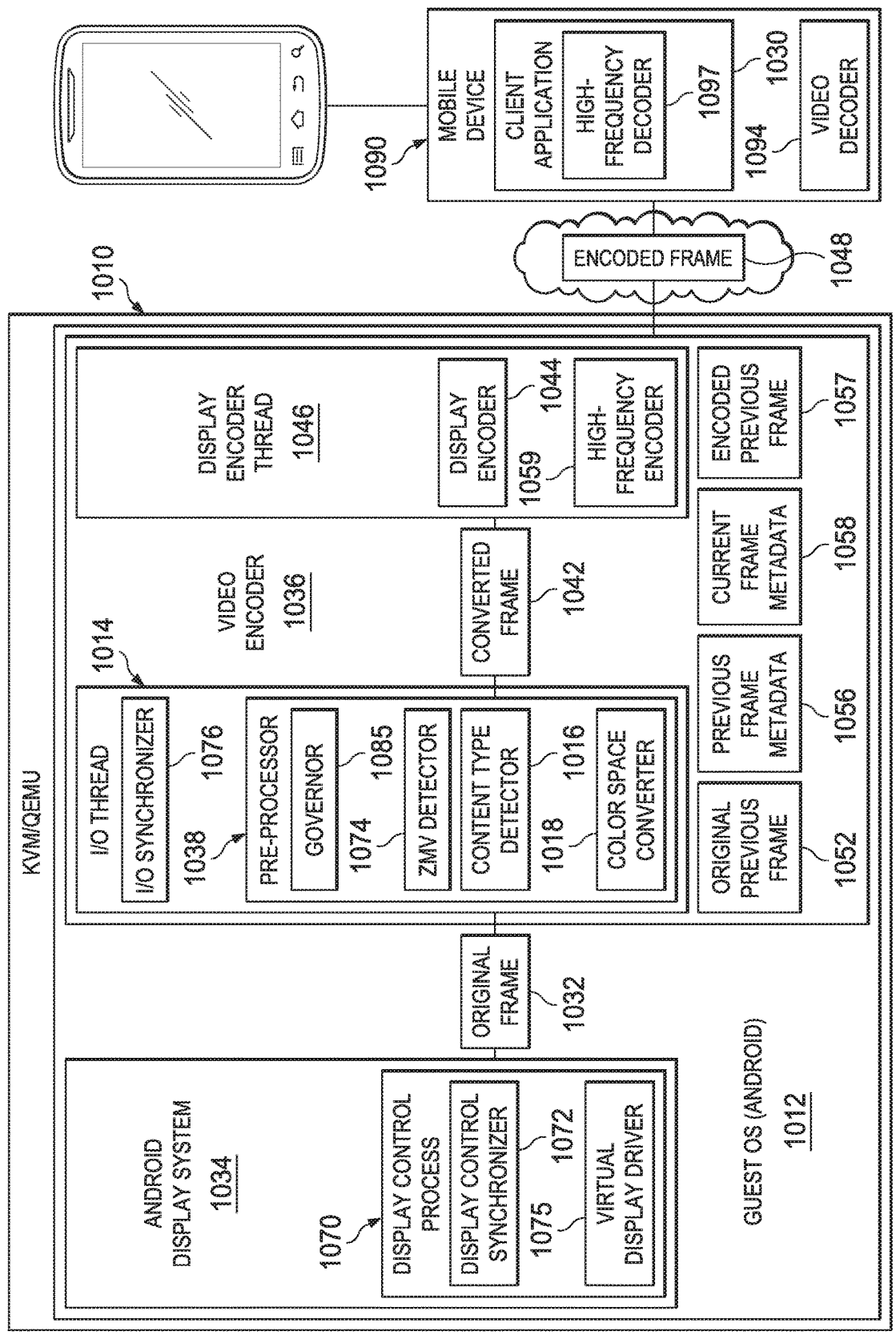

It may now be helpful to give an overview of the implementation of embodiments of a video encoder that may be employed by embodiments as disclosed herein. Referring to FIGS. 10A and 10B, block diagrams of architectures of embodiments including just such a video encoder is depicted. It will initially be recalled from the above discussion that in certain embodiments of a virtual device, the virtual device includes an instance of a guest operating system 1012 (e.g., the Android OS) executing on the KVM/QEMU 1010. Video encoder and relay (referred to also as just the video encoder) 1036 may operate in the KVM/

QEMU 1010 to receive a display generated by the guest OS (e.g., Android) graphics stack (also referred to as the Android display system) 1034 running in the Android guest operating system (OS) 1012 as depicted in FIG. 10A. In another embodiment, video encoder 1036 may operate directly on the Android guest OS 1012 to receive the display generated by the Android display system 1034 as depicted in FIG. 10B. The video encoder 1036 operates to encode and compresses the display information, and sends it to the client application 1030 on the physical mobile device 1090 where it may be rendered by the client application 1030 and presented to the user.

More specifically, the video encoder 1036 may receive a frame of display data from the Android display system 1034 of the Android guest OS 1012. This original frame 1032 produced by the display system 1034 and received by the video encoder 1036 may include a plurality of macroblocks in the Red Green Blue (RGB) color space. The video encoder 1036 includes an I/O thread 1014 running pre-processor 1038. The I/O thread 1014 may be part of the display system of the KVM/QEMU 1010 in the case where the video encoder 1036 is operating in the KVM/QEMU (e.g., as depicted in FIG. 10A). The pre-processor 1038 of the I/O thread 1014 receives the original frame 1032 in the RGB color space and, among other tasks, converts this original frame 1032 to the YUV color space and provides converted frame 1042 comprising macroblocks in the YUV color space to the display encoder 1044 running in display encoder thread 1046. This display encoder 1044 may compress or perform other operations on the converted frame 1042 (or one or more macroblocks thereof) and send the encoded frame 1048 to the client application 1030 on the physical mobile device 1090 over a network (e.g., IP based, cellular, another computer based wireless network or some combination of networks). The display encoder 1044 may, for example, operate according to one or more compression standards or modified versions thereof. For example, in one embodiment, the display encoder 1044 may implement a block-based encoder such as an encoder operating according to a version of the H.264 video compression standard. Other types of encoders are possible and are fully contemplated herein.

To aid in the pre-processing of the original frame 1032 and the encoding of the converted frame 1042, video encoder 1036 may maintain one or more original previous frames 1052 in a buffer in memory or in another storage location. Additionally, in some embodiments, metadata 1056 for the previous frame may also be maintained. For example, an original last (or previous) frame 1052 may be the frame immediately previous to the original frame 1032 currently being processed. The original previous frames 1052 may be stored as an RGB color space version of the original previous frame, may be stored as a YUV color space version of the original previous frame, or both versions may be stored. Additionally, one or more encoded previous frames 1057 may be maintained by the video encoder 1036 in a buffer in memory or in another storage location to aid in the encoding of the converted frame 1042. For example, an encoded last frame 1057 may be a compressed version of the frame immediately previous to the original frame 1032 currently being processed. It will be understood then, that at some point one or more versions of the current frame (e.g., original frame 1032, converted frame 1042 or encoded frame 1048) may be saved as (e.g., replace) an original last frame 1052 or an encoded last frame 1057. This saving may entail a copy of one location in memory (e.g., buffer) to another location in memory (e.g., buffer), a shift of pointers to memory location or another type of memory movement, replacement or referencing.

Bidirectional Display Sync

As may be realized, the frame processing pipeline depicted in FIGS. 10A and 10B comprising the Android display system 1034 and the video encoder 1036, including the I/O thread with the pre-processor 1038 and the display encoder thread 1046 with the display encoder 1044, may be computationally intensive. In some cases, it may be possible to reduce both the latency and the computational resources or overhead required to implement such a pipeline by synchronizing the various components of the pipeline.

In particular, an instance of a guest operating system (e.g., the Android OS) may be substantially equivalent to an instance of an operating system configured to operate directly on a hardware device (e.g., a physical mobile device) and to generate frames of display data at a rate determined by an application executing on that OS. Such a frame rate may be on the order of, for example, 60 frames per second (FPS). While such a frame rate can usually be accommodated without issue when the guest OS is operating directly on a hardware device, such a frame rate may be greater than what is needed or desired in a virtual mobile platform setting such as embodiments described.

In fact, in some cases because of the latency introduced by the use of the virtual mobile device platform, the processing involved in encoding a frame for a client device or the need to transmit data over a network to the client application at the physical mobile device, the frame rate utilized in a virtual mobile device platform may be closer to around 15-20 FPS.

In particular, when an operating system (e.g., the guest OS) is running in a virtualized environment and sending display data to a client application over a network, the "display device" in the virtual mobile device platform (e.g., the video encoder) may be an emulated device running on the virtual machine (e.g., KVM/QEMU) or in the Guest OS itself. Thus, the real refresh frequency is determined by the operation of the emulated display device (e.g., video encoder) and may be both dynamic and heavily dependent on processing speed and transmission time of the display data. Thus, to conserve computational resources, it is desired to synchronize components of the display pipeline in the virtual mobile device platform to this dynamic real refresh rate. It is also desirable to avoid unnecessary display processing. In a virtual mobile deice platform accomplishing these desires is not straightforward, however, at least due to the many virtual (or non-virtual) display components utilized in the virtual mobile device platform that are designed and configured to be utilized with physical hardware.

To accomplish these desires then, among others, embodiments as disclosed herein, may be synchronize the frame rate of the guest OS (or display system of the guest OS) to the refresh rate of the video encoder by synchronizing the generation of a frame by the display system of the guest OS to the transmission of an encoded frame by the display encoder. Specifically, in certain embodiments, this may accomplished by configuring the output or transmission of an encoded frame to trigger the generation of a frame by the display system and blocking the execution of display generation on the guest OS until the generation of the frame is triggered. In this manner, computational resources consumed by the execution of the display processing thread of a guest OS may be reduced.

Additionally, a display handling thread of the hypervisor (e.g., KVM/QEMU) may be synchronized to the generation of an original frame by the display system of the guest OS. In particular, a display handling thread of KVM/QEMU may be blocked until a new frame is generated by display system of the guest OS. In this manner, computational resources consumed by the execution of the display processing thread of at least some components of the hypervisor display thread may be conserved until such a time as they are needed to process an original frame.

To illustrate in more detail with reference to FIGS. 10A and 10B, display system 1034 may have a display control process 1070 that controls the generation of original frames 1032 by the display system 1034 based on display data provided by various applications executing on the Guest OS (e.g., Android OS) 1012. In other words, at some interval, the display control process 1070 may process a set of display data provided by applications to generate an original frame 1032. In some cases, this display control process 1070 may be configured to operate at a certain interval based on one or more variables to achieve a certain frame rate. This capability may be referred to, for example as VSYNC. This VSYNC configuration may allow the display control process 1070 to operate according to a timer, such that the display control process 1070 blocks until the expiration of the VSYNC timer at which point the process 1070 unblocks, process the current display data from the applications and generates another original frame 1032. The VSYNC timer is then reset and the display control process 1070 once again blocks until the expiration of the timer.

While blocking on a timer may be useful in certain instances, in other embodiments, as the frame rate (e.g., rate of generation of frames) of display encoder 1044 may be dynamic, it may be desirable to block the display control process 1070 based on the output of the display encoder 1044 itself. Accordingly, in some embodiments, the display control process 1070 may include a display control synchronizer 1072 responsive to the output of the display encoder 1044 and configured to block the display control process. In other words, when display encoder 1044 generates an encoded frame 1048, the generation of this encoded frame (e.g., the writing of the encoded frame 1048 into a buffer or memory location) may signal the display control synchronizer 1072 which, in turn, may unblock the display control process 1070.

The display control process 1070 may then process display data from applications by invoking or signaling Android display system 1034 such that a new original frame 1032 is generated, at which point the display control process 1070 may once again block until such a time as display control synchronizer 1072 is signaled that a new encoded frame 1048 has been generated. In this manner, the Android display system 1034 and the video encoder 1036 may serve to operate, respectively as a synchronized producer and consumer, with the Android display system 1034 configured to produce a new original frame 1032 only when the video encoder 1036 is ready to process an original frame 1032, thus avoiding the use of computational resources for executing Android display system 1034 to produce original frames 1034 that might just be dropped or discarded by the video encoder 1036.

In one embodiment, the display control synchronizer 1072 may be implemented as a mutex or semaphore or similar variable that is signaled based on the output of the display encoder 1044. For example, the generation of an original frame 1032 may cause the semaphore or mutex to "lock" such that the display control process 1070 is blocked (e.g., does not execute or does not cause Android display system 1034 to execute). Similarly, the generation of an encoded frame 1048 may cause the KVM/QEMU 1010 or Guest OS 1012 to signal or "unlock" the semaphore or mutex causing the display control process 1070 to unblock and begin executing; in turn causing Android display system 1034 to generate a new original frame 1032. To the Android OS 1012 the display control synchronizer 1072 may appear as a hardware interrupt or the like issued from hardware on which it is executing.

Similarly to using the generation of an encoded frame 1048 to unblock the display control process 1070 of the guest OS 1012, the production of an original frame 1032 by the Android display system 1034 may be used as a trigger to unblock a display processing thread of the KVM/QEMU 1010 (or of the guest OS 1012). As has been noted, most hypervisors, including KVM/QEMU have been designed to emulate hardware. Accordingly, the display processing threads of the KVM/QEMU, including for example the I/O thread, have been configured to operate according to frame rates associated with such hardware. So, for example, the I/O thread 1014 may serve as a display processing thread for the KVM/QEMU 1010 and may operate to check and attempt to process original frames 1032 at a rate of 60 FPS by calling pre-processor 1038. As discussed, however, in many instances the display pipeline of embodiments may operate at a lower frame rate, such as 15-20 FPS. Thus, if display encoder 1044 is busy processing another frame, the output of the pre-processor 1038 (e.g., converted frame 1042) may get dropped or discarded. Additionally, in some embodiments, the guest OS (or display component of the guest OS such as Android Display system 1034) will be configured to only generate an original frame 1032 when an encoded frame 1048 is generated by the display encoder 1044. It would thus conserve computer resources if at least portions of the display processing thread (e.g., I/O thread 1014) of the KVM/QEMU 1010 (or the guest OS 1012) could be blocked until such a time that an original frame 1032 is produced by the guest OS 1012 (or Android display system 1034). In this manner, the display processing thread of the KVM/QEMU 1010 (or guest OS 1012) would be synchronized with the output of the Android display system 1034 and unnecessary processing by this thread could be avoided.

Here, the I/O thread 1014 may serve as a display processing thread for the KVM/QEMU 1010. The I/O thread 1014 may handle a variety of different tasks, but may be configured to call the pre-processer 1038 only when an original frame 1032 is produced by the Android display system 1034. In other words, the trigger for a call by the I/O thread 1014 to the pre-processor 1038 may not be based on a timer, but instead triggered by the generation of an original frame 1032. In particular, virtual display driver 1075 may be included in the display control process thread 1070. When an original frame 1032 is generated by the Android display system 1034 (e.g., and before the display control process 1070 blocks based on display control synchronizer 1032) the virtual display driver 1075 may signal or notify I/O thread synchronizer 1076 in I/O thread 1014. The signal or notification may be based on, for example, the writing of the original frame 1032 into a buffer or other memory location designated to hold such an original frame 1032. The I/O synchronizer 1076 unblocks the I/O thread 1014 from calling the pre-processor 1038. When the pre-processor 1038 generates a converted frame 1042 based on this original frame 1042 the I/O synchronizer 1076 may again serve to block the I/O thread 1014 from calling the pre-processor 1038 until it is once again notified by the virtual display driver 1075 that an original frame 1032 has been generated by the Android display system 1034. In this manner, unnecessary calls to, and processing by, pre-processor 1034 may be avoided and computational resources further conserved.

Frame Rate Governor

From the above description it can be understood that embodiments as disclosed may utilize an I/O thread 1014 that unblocks and process a new original frame 1032 only when such a frame has been generated by Android display system 1034. In some cases, however, the entire original frame 1032 may be a duplicate of the previously generated frame. Thus, it may be desirable to avoid performing substantially any processing on such duplicate frames, as there is no need to update the display at the physical mobile device 1090 based on the frame generated by the display system 1034 of the corresponding virtual device (as there has been no change in the display).

In particular, a display system (e.g., Android display system 1034) for an operating system (e.g., guest OS 1012) provides methods or APIs for applications to trigger the OS to update the display with the latest content. Sometimes, applications executing on the OS (e.g., guest OS 1012) are "smart" and only update the screen if the application has actually made a change to the screen data. In other cases applications can be "dumb" and update or refresh the display data continuously with the same data. This smart or dumb behavior may occur, for example, based on the target content of browser based applications.

In a non-virtualized system (e.g., when applications are executing on an operating system running on a physical mobile device), the penalty for "dumb" applications is relatively low. There may be slightly higher power usage on the physical device for this extra processing. On a virtualized system (such as embodiments of a virtualized mobile device platform as disclosed herein), however, computational resources are scarce and thus the penalty for "dumb" type of display updating by applications can be high in terms of computer resources.

Accordingly, embodiments may include mechanisms to account for such "dumb" applications by reducing the computational resources devoted to the processing of repeatedly generated identical frames by an application. In particular, a governor may be employed that limits that rate of frame processing (e.g., the frame rate) of one or more processes in the video encoder 1036. Specifically, in one embodiment, a governor may be employed in the pre-processor 1038 of the video encoder 1036 that can detect the repetition of frames (e.g., original frames 1032) output from the Android display system 1034. Based on the detection of one or more repeated frames the frame processing frequency may be retarded. The slowing of the frame processing frequency may be accomplished in a set of graduated stages or states which may be transitioned between based on a number of repeated frames detected, the number of repeated frames detected in a row, the number of repeated frames detected within a particular time period, or a wide variety of other criteria.

To illustrate, for example, typically pre-processing thread 1038 may process original frames 1032 in a normal manner as they are produced by Android display system 1034. Frame rate governor 1085 may be configured to compare an original frame 1032 to an original last frame 1052 to determine if those frames are substantially identical. Based on the detection, the governor 1085 may increment a counter tracking the number of identical frames received in a row. In one embodiment, the counter may only be incremented if the identical frame is received within a certain time period of the identical last frame. Once the counter reaches a first threshold the frame rate governor 1085 may transition from an initial or normal state (e.g., state 0) of frame processing to a first stage or state (e.g., state 1). This first threshold may be, in one embodiment, three; such that if three identical frames in a row are received the first state may be entered.

In this first stage, a frame processing frequency may be retarded by, for example, setting a frame rate processing frequency to one frame per 100 ms. In other words, other pre-processing functionality such as ZMV detection 1074, content type detector 1016, color space converter 1018 or other pre-processing activities, may only occur for one frame in a 100 ms time period. During this first stage, governor 1085 may keep comparing received original frames 1032 to original last frame 1052 (and storing the received original frame 1032 to original last frame 1052). If a frame 1032 that is not identical to an original last frame 1052 is received, the governor 1085 may reset the counter (e.g., reset the governor to state 0) and remove any minimum or maximum periods on frame processing (e.g., processing of original frames 1032 will go back to a normal or configured frame rate, or may occur every time based on a trigger caused by the output of an original frame 1032). Additionally, a timer may be set when the first state is entered such that at the expiration of the timer the frame rate governor 1085 may transition back to the initial state (e.g., state 0) or may transition back to the initial state if the identical frame counter is below a threshold or if one or more other criteria or met.

If, however, identical frames continue to be received at the governor 1085 during the first state (e.g., state 1) the counter may continue to be incremented. If the identical frame counter surpasses a second threshold, the frame rate governor 1085 may transition to a second state (e.g., state 2) whereby frame processing may be further throttled. This threshold may be, in one embodiment, five, such that if five identical frames in a row are received the second state may be entered. In this second stage a frame processing frequency may be throttled by setting a frame rate processing frequency to, for example, one frame per 500 ms. Again, during this second stage, governor 1085 may keep comparing received original frames 1032 to original last frame 1052 (and storing the received original frame 1032 to original last frame 1052). Additionally, a timer may be set when the second state is entered such that at the expiration of the timer the frame rate governor 1085 may transition back to the initial state (e.g., state 0), the first state (e.g., state 1) or the initial state, if the identical frame counter is below a threshold or if one or more other criteria or met. As will be realized, the number of stages and the maximum frame processing frequency of each stage is configurable.

Figure 11:
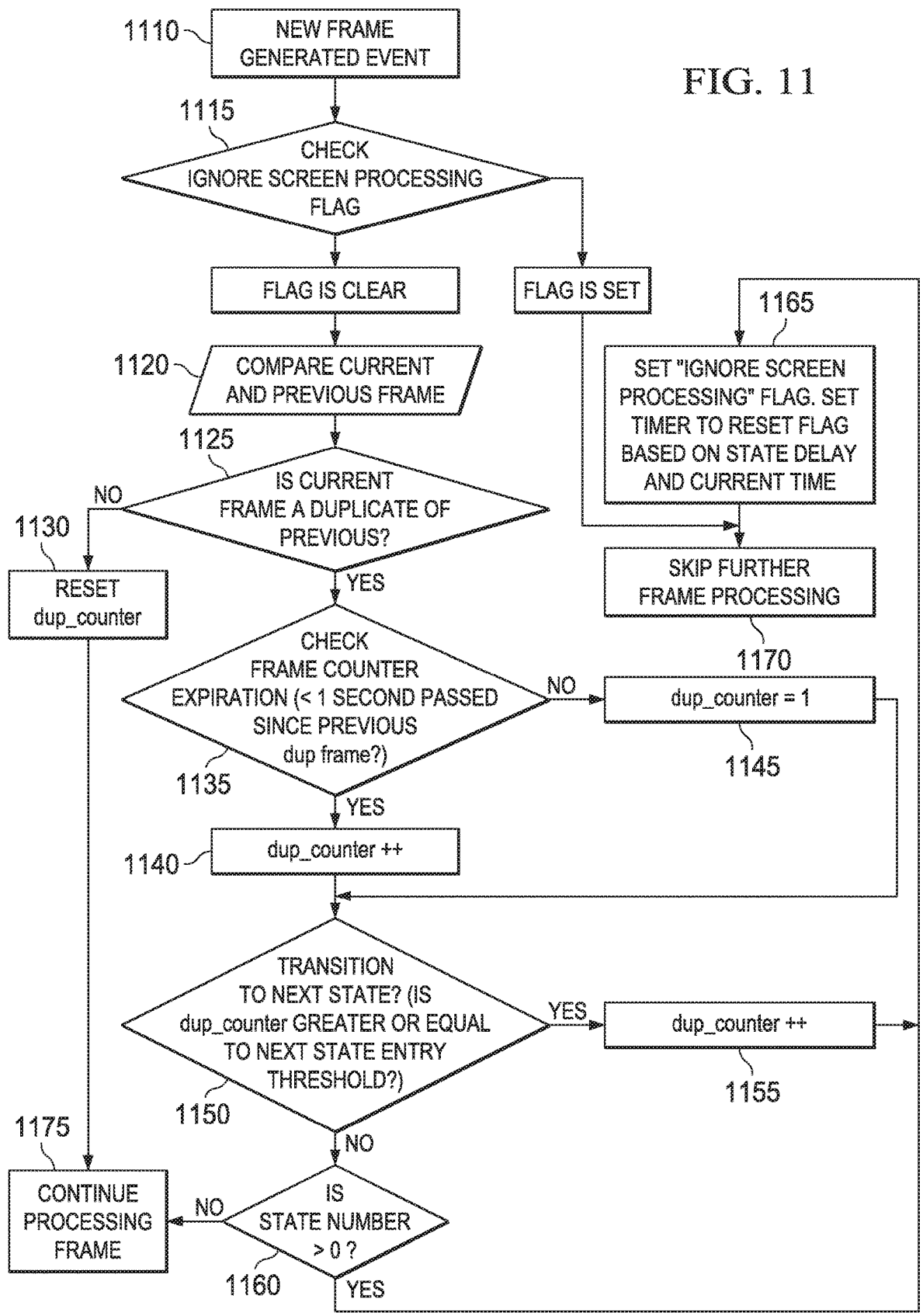
FIG. 11 depicts a flow diagram or one embodiment of a governor for frame rate processing.

FIG. 11 is a flow diagram illustrating one embodiment of a method for implementing a governor for intelligent frame rate restriction in a virtual mobile device platform. Other embodiments are possible and are fully contemplated herein. As discussed, a governor may operate in a number of different states, an initial state (e.g., state 0) where generated frames are processed and one or more throttled states. Thus, the governor may maintain a table or other association between states (e.g., state identifiers), state delays for those states (e.g., 100 ms, 300 ms, 500 ms, etc.) and thresholds indicating the number of duplicate frames to trigger a transition to that state.

At some point then, a new frame may be received, or an event signaling that a new original frame has been generated by the guest OS may be received (STEP 1110). A flag (e.g., "Ignore Screen Processing" flag) may be checked to see if it is set (STEP 1115). If this flag is set (YES branch of STEP 1115) no more processing may be done on the newly generated frame (STEP 1170). The newly generated frame can then be stored as the original last frame.

If, however the flag is not set (e.g., is "clear") (NO branch of STEP 1115), the current (newly generated) frame can be compared to the original last frame to determine if the frames are duplicative (STEPS 1120, 1125). If the current frame is not duplicative of the last frame (NO branch of STEP 1125) a duplicate frame counter (e.g., "dup_counter") may be reset (e.g., to zero) (STEP 1130) and the current frame may be processed (e.g., through the video encoder) (STEP 1175). If, however, the current frame is substantially identical to the last frame (YES branch of STEP 1125) a frame counter (e.g., dup_counter) expiration time may be checked (STEP 1135) to determine if the current frame was received within some expiration time (e.g., one second or the like) of the identical last frame. If the current frame was received within this expiration time period (YES branch of STEP 1135) the frame counter (e.g., dup_counter) may be incremented by one (from its current value) (STEP 1140). If more than this expiration time period has elapsed (NO branch of STEP 1135), the frame counter (e.g., dup_counter) may be set to one (STEP 1145).

Based on the value of the frame counter (e.g., dup_counter) it can be determined (STEP 1150) if a transition should be made to a different or next state. Here, for example, the frame counter (e.g., dup_counter) can be compared to a state entry threshold to determine if new state should be entered. In particular, this determination may be made based on the current state of the governor (e.g., as indicated by a "state number" identifying the current state of the governor). The current state may be used to identify a next state (if any) that may be entered. As discussed, the governor may be configured with one or more transition thresholds, each transition threshold associated with a state and a count for the frame counter, such that if the frame counter meets or exceeds that threshold the governor should enter that state. Thus, based on the current state (e.g., state 0, state 1, state 2, etc.) a threshold for the number of duplicate frames (as reflected by the frame counter) associated with a next or subsequent state may be determined.

This threshold may be compared with the current value of the frame counter (e.g., dup_counter) to determine if the transition should be made to the next state. If the current value of the frame counter (e.g., dup_counter) does not exceed (or meet or exceed) the threshold for the next state (NO branch of STEP 1150), it can be determined if the current state (as reflected in the current state maintained in the "state number") is anything other than the initial state (e.g., state "0") (STEP 1160). If the current state is the initial state (NO branch of STEP 1160) the current frame may be processed (e.g., through the video encoder) (STEP 1175).

If the current state is anything other than the initial state (YES branch of STEP 1160) the ignore processing flag (e.g., "Ignore Screen Processing" flag) may be set along with a reset timer to reset the flag (STEP 1165). The value for this timer may be set based on the current state of the governor (e.g., as indicated by a "state number" identifying the current state of the governor). As discussed, the governor may maintain a configuration associating each state (other than the initial state) with a state threshold and a state delay time. This table can thus be used to determine that state delay for the current state (e.g., 100 ms, 500 ms, etc.) and this state delay added to the current (system) time to set the timer for resetting the ignore processing flag, such at the time reflected by the reset timer the ignore processing flag will be cleared (e.g., unless the reset timer is changed, cleared, etc.). As the ignore processing flag is set no more processing may be done on the newly generated frame (STEP 1170). The newly generated frame can then be stored as the original last frame.

If the current value of the frame counter (e.g., dup_counter) exceeds the threshold for the next state (YES branch of STEP 1150), the frame counter (e.g., dup_counter) may be incremented (STEP 1155). The ignore processing flag (e.g., "Ignore Screen Processing" flag) may be set along with a reset timer to reset the flag (STEP 1165). The value for this timer may be set based on the current state of the governor (e.g., as indicated by a "state number" identifying the current state of the governor) as discussed above. As the ignore processing flag is set no more processing may be done on the newly generated frame (STEP 1170). The newly generated frame can then be stored as the original last frame.

Intra_Frame Content Type Detection

As discussed, in many cases it is desirable to utilize a display encoder that operates according to an encoding protocol designed for use with video data, such as block-based encoders (including, for example, encoders that operate according to the H.264 standard). This desirability may stem at least in part from the ability of certain video encoders to utilize data from previous frames or to use hardware acceleration capabilities provided on physical mobile devices. However, entropy or block-based encoders of these types may not necessarily function efficiently or achieve good results when utilized on image or graphic type data, especially such data that includes non-uniform or non-linear changes. This is the case because from the point of view of digital displays consisting of number individuals pixels, the methods and performance for compressing this data is highly depend on the gradient (rate of change of color and brightness) across the display. These are precisely the types of data that occur with respect to display data utilized on a mobile device, as this data often includes vector graphics or text having non-linear changes (e.g., to contrast with a background). Content such as text or vector graphics quickly changes from very dark to very bright colors across just a few pixels, whereas image type data on average changes very gradually in brightness or color across just a few pixels. Given this, to achieve better compression performance in a virtual mobile device platform, it may be desirable to detect the content type for each frame of display data (or macroblocks thereof) such that different compression may be applied to different types of macroblocks. Embodiments may utilize two methods to detect the display data content type.

In one embodiment, guest OS 1012 may include customized code (e.g., in the user interface and graphics stack layers) in order to capture high level application and system calls that provide display content type information about the areas of the screen they are modifying. For example, in Android, an application can use Android's View classes in order to modify display data. Some view types are also specific to content types, such as the ImageView class or the TextView class. Each view is ultimately rendered to modify a particular portion of the display, so by capturing the view class type, the screen area of the view, or other layout and rendering information in the system, the type of content for some areas of the screen can be determined. In another embodiment, to detect high-frequency macroblocks (e.g., text or vector graphics) the frame data itself may be analyzed to differentiate between low-frequency macroblocks with smooth gradients (e.g., image content) and high-frequency macroblocks with sharp gradients (e.g., text and vector graphics).

Once the low-frequency and high-frequency macroblocks have been identified an appropriate compression can be applied to different macroblocks of different types, where the compression algorithm applied may be optimized or perform (relatively) better for that content type. This allows for a compression result that may be smaller in data size, higher in quality (particularly for text and vector graphics) and requires less processing resources.

Referring to FIGS. 10A and 10B then, as discussed pre-processor 1038 may include a color space converter 1018 to convert the original frame 1032 in the RGB color space to the YUV color space of converted frame 1042. The converted frame 1042 in the YUV color space may then be analyzed by content type detector 1016 to determine, for each macroblock of the converted frame 1042 if that macroblock is a high-frequency macroblock (e.g., a macroblock that contains text or vector graphics). Content type detector 1016 may also determine which macroblocks are low-frequency macroblocks (e.g., by analysis or by identifying all macroblocks as low-frequency that are not identified as high-frequency macroblocks). This identification of the type of macroblocks of the converted frame 1042 (or an identification of the high-frequency macroblocks) may be stored, for example, in current frame metadata 1058. Thus, current frame metadata 1058 may include an association between each macroblock of the current frame and an identifier indicating if that macroblock is a low-frequency or a high-frequency macroblock.

When the display encoder 1044 is invoked to encode the converted frame then, the application programming interface (API) of the display encoder 1044 (which may adhere to, or provide interface substantially similar to, those defined in the H.264 specification or another block-based encoder specification) may be provided with the identities of the identified high-frequency macroblocks and an instruction not to encode those identified high-frequency macroblocks. In particular, the metadata 1058 for the current frame may include a list or array of the number of macroblocks on the screen, with a Boolean value to identify whether or not each macroblock is of a high-frequency type or not. The H.264 encoder API for encoding the frame may have this object type pointer as one of its parameters. Thus, the display encoder 1044 may produce an H.264 frame with the low-frequency macroblocks of the converted frame 1042 encoded according to the H.264 standard (or similar) and the high-frequency macroblocks in an uncompressed format. Alternatively, the display encoder 1044 may be instructed to encode these high-frequency macroblocks with modified parameters, such as a smaller step size.

At this point, if the high-frequency macroblocks were not encoded, the encoded frame (e.g., with the low-frequency macroblocks of the converted frame 1042 encoded according to the H.264 standard (or similar) and the high-frequency macroblocks in an uncompressed format) may be passed to high-frequency encoder 1059. The high-frequency encoder 1059 obtains the uncompressed data for the high-frequency macroblocks from the encoded frame and applies a separate encoding algorithm (e.g., which may be a lossless or lossy encoding algorithm such as zip, etc.) to these high-frequency macroblocks to generate encoded data for these high-frequency macroblocks. Encoded frame 1048 may then be assembled by combining the encoded low-frequency macroblocks (e.g., encoded according to the H.264 standard) and the encoded high-frequency macroblocks (e.g., encoded according to the separate encoding algorithm (e.g., zip)).

It will be apparent that since these high-frequency macroblocks are encoded according to a separate encoding algorithm the encoded frame 1048 may not adhere completely to the H.264 standard. It may, however, be desired to take advantage of specialized hardware or software on the physical mobile device 1090 designed to process H.264 encoded data. Thus, when the encoded frame 1048 is transmitted to client application 1030 it will be wrapped with header information identifying the high-frequency macroblocks within the encoded frame 1048. When the encoded frame 1048 arrives at the client application 1030 these encoded high-frequency macroblocks may be decoded by the separate encoding algorithm (e.g., unzipped) implemented by high-frequency decoder 1097 and this decoded (or raw) data for this high-frequency macroblocks combined with the encoded low-frequency macroblocks to create a frame compliant with the H.264 specification so that it may be processed by the video decoder 1094 on the physical mobile device 1090 configured to operate on H.264 compliant data.

In this manner, computing resources on the virtual mobile device system may be conserved as the display encoder 1044 is alleviated of performing computationally intensive compression (e.g., entropy steps or the like) of high-frequency macroblocks which, in any event, would not accomplish satisfactory compression results. Moreover, network latency is reduced as this high-frequency macroblock data can be efficiently compressed by a separate encoding algorithm to reduce the amount of display data that may need to be transmitted to the physical mobile device 1090 while still taking advantage of any hardware or software on the physical mobile device configured to accelerate the decoding of H.264 data.

Embodiments will now be explained in more detail. Recall from above that traditional image and video encoders do not encode text and vector graphics in an optimum way. This is the case at least because the basic assumption of most compression techniques is that the highest energy is concentrated at lowest frequencies (see, e.g., the discussion of Discrete Cosine Transform (DCT) Energy Distribution below). This is true for all practical purposes for video and images as there is a continuum of image data. For text and vector graphics, which involve sharp lines, sharp jumps in frequency components appear, which essentially represent high frequency components. An attempt to compress this structure efficiently using traditional image and video compression techniques would require either using a smaller step size or leaving them uncompressed to allow some of type of compression technique to be applied to these areas.

The current mechanisms for most image/video processing algorithms consider an average energy of the block or some weighting techniques to decide the Qp (quantization step). This works very well for real-life images and videos, but fails to adequately address text content or vector graphics. To optimally (or better) handle vector graphics (e.g., sharp lines) or text data, a method to identify these types of data is utilized by embodiments. A key question then is how to distinguish between a text/vector graphics data and regular image data. In simplest form, these would represent energies in higher side of the spectrum versus lower side of the spectrum.

Based on these observations, in one embodiment the following may be applied to text or vector graphics. Initially, spectral differences of upper and lower half of the macroblock in frequency domain may be determined. These differences may or determination may be weighted. If the energy of upper half of the spectrally represented macroblock is higher than lower half of the spectrally represented macroblock by a certain amount (e.g., a delta or threshold difference), then the macroblock is designated as a high-frequency macroblock (e.g., it represents text/vector graphics) and is identified as such in current frame metadata 1058. As discussed, the identified high-frequency macroblock can then be, for example, encoded using smaller step size in video encoder or left uncompressed, allowing an additional stage of data encoding after the video or image encoding step that is better suited to encode high frequency data.

Figure 12:
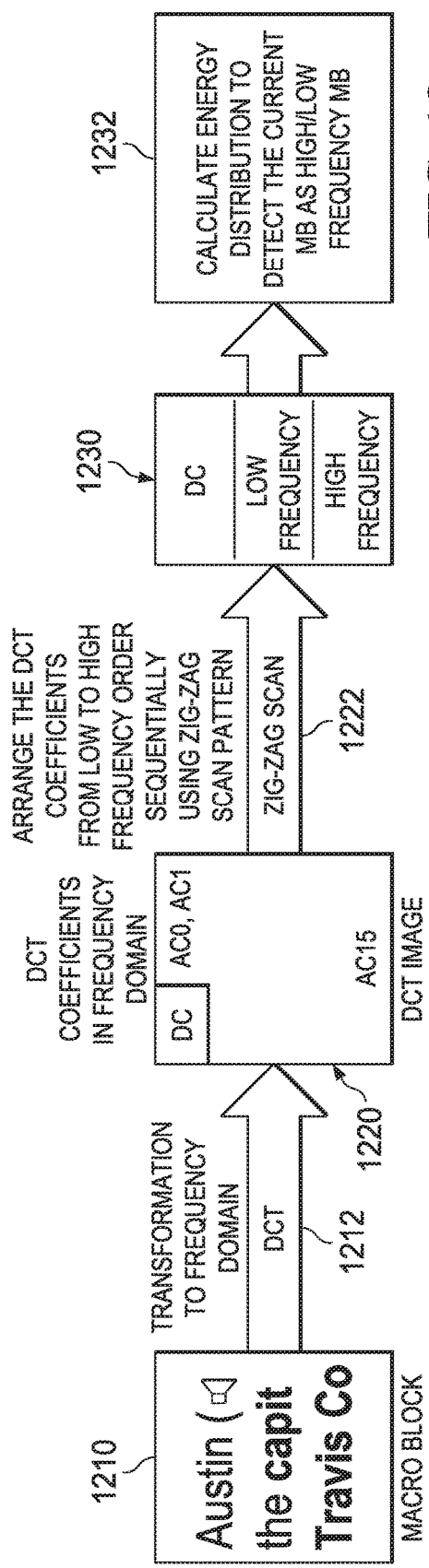
FIG. 12 depicts a diagrammatic representation of detection of macroblocks.

Referring now to FIG. 12, a block diagram illustrating one embodiment of the detection of high-frequency macroblocks is depicted. The different methodologies involved in this embodiment are computation of DCT, zig-zag scanning and energy distribution. Thus, a DCT is applied to macroblock 1210 (STEP 1212) resulting in a DCT image 1220 including the DCT coefficients in the frequency domain. Next a zig-zag scan is performed (STEP 1222) on the DCT image 1220 resulting in an ordered DCT coefficient array 1230. This ordered DCT coefficient array 1230 can then be processed (STEP 1232) to calculate an energy distribution for the macroblock. Based on the energy distribution the macroblock can be identified as a high-frequency (or low-frequency) macroblock.

DCT Transform

In general, DCT expresses data as the sum of cosine function to reduce size of data. The basic transform, 'core transform', is a 4×4 or 8×8 integer transform, a scaled approximation to the Discrete Cosine Transform, (DCT). In this technique, DCT is applied on 16×16 macroblock data which ultimately calls 4×4 DCT on 16 sub blocks.

One Embodiment Zig-Zag Operation:

After the DCT operation, significant DCT coefficients of the macro block are typically the low frequency coefficients' which are clustered around the DC (0,0).

In the H.264 encoder, prior to entropy coding scanning is performed on quantized DCT coefficients. The main purpose of the scan is to re-order coefficients and clustered the non-zero coefficients together, which enables optimum representation of the remaining zero-valued quantized coefficients.

In a typical frame non-zero coefficients are mostly clustered towards top-left corner (also known as DC) and zig-zag scan is performed.

Figure 13:
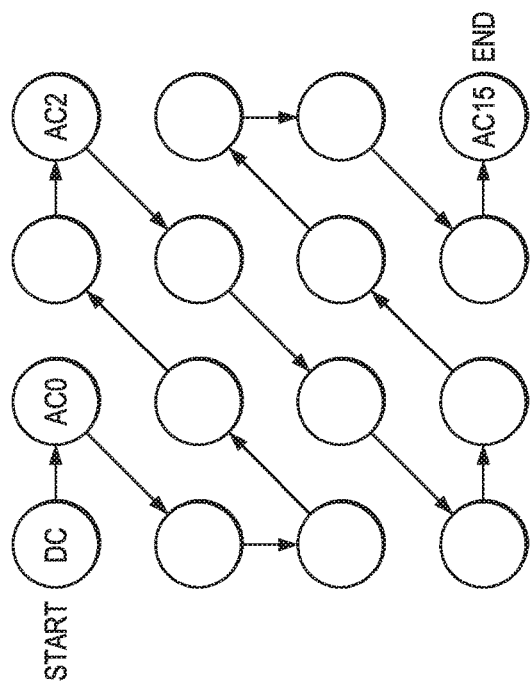
FIG. 13 depicts a diagrammatic representation of one embodiment of a zig-zag scan.

In the given example, DCT is applied on 4×4 blocks which generates the total 16 DCT coefficients and it starts zig-zag scan from DC coefficient and then AC coefficients in zig-zag pattern as shown in FIG. 13. The pattern in FIG. 13 illustrates the order in which the scan may be performed on the blocks.

Figure 14:
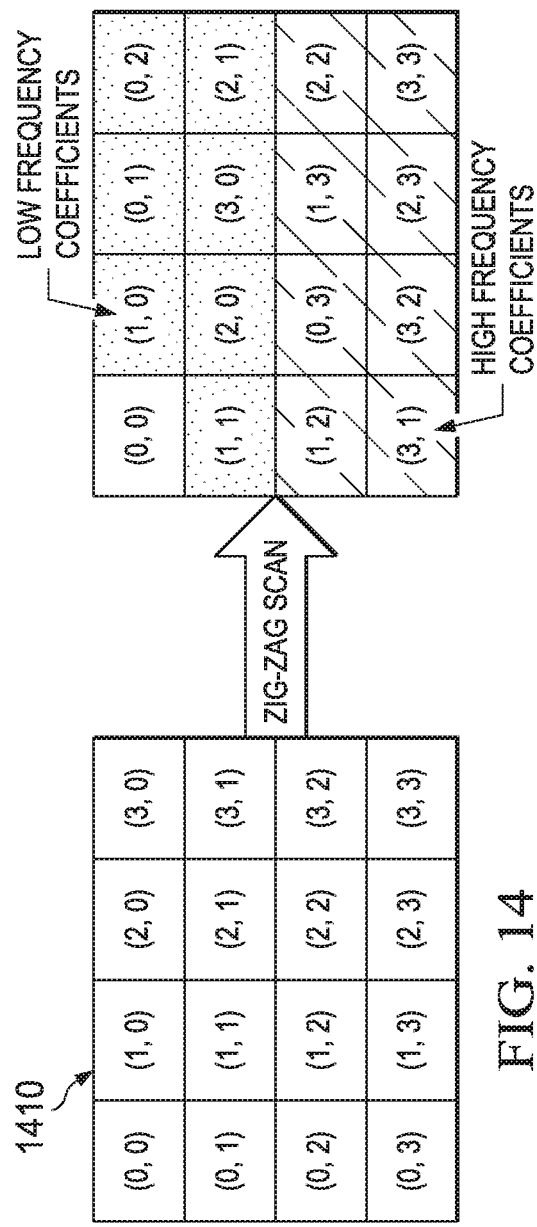
FIG. 14 depicts a diagrammatic representation of one embodiment of re-ordering in a linear array.

After performing the zig-zag, low frequency coefficients tend to occupy space near the start of the array (as indicated by the dotted blocks in FIG. 14) and high frequency coefficients clustered towards end of array (marked by diagonal lines in FIG. 14). DCT coefficients are re-ordered in the linear array as shown in FIG. 14. Thus, FIG. 14 illustrates the result 1420 of a zig-zag scan as illustrated in FIG. 12 as applied to blocks 1410.

DCT Energy Distribution

Energy is used to describe a measure of "information" in an block. Energy Distribution represented gives the contribution of individual transformed coefficients. The energy of the DCT coefficients may be computed by the following equation.

$$\text{Energy} = \sum_{y=1}^{y=N} \sum_{x=1}^{x=M} |\text{coeff}(x,y)^2|$$

Where, coeff (x,y) represents the macroblock in the transform domain.

It may be desired to avoid the first DC coefficients in energy calculation as it contains the maximum energy. N×M is the size of DCT coefficients matrix.

Normalize energy=Energy/Total number of coefficients taken to find the energy

To normalize the energy distribution divided the total energy with the number of coefficients taken in to account for finding energy. To have weighted of DCT coefficients, some threshold may be taken into consideration.

For example, for 4×4 block there are 16 DCT coefficients and if scan_threshold=0.3, then Scan_width=0.3*16=4 and normalize energy distribution is calculated using following equation.

$$\text{Low\_coeff\_energy} = \sum_{x=0}^{x=4} |\text{coeff}(x,y)|^2 / \text{scan\_width}$$

$$\text{High\_coeff\_energy} = \sum_{x=4}^{x=16} |\text{coeff}(x,y)|^2 / (\text{block\_width} - \text{scan\_width})$$

After processing all the blocks, compare the energy distribution. If the low frequency coefficients have more energy compared to high frequency coefficients then declare this macroblock as a low-frequency macroblock else identify it as a high-frequency macroblock.

Figure 15A:
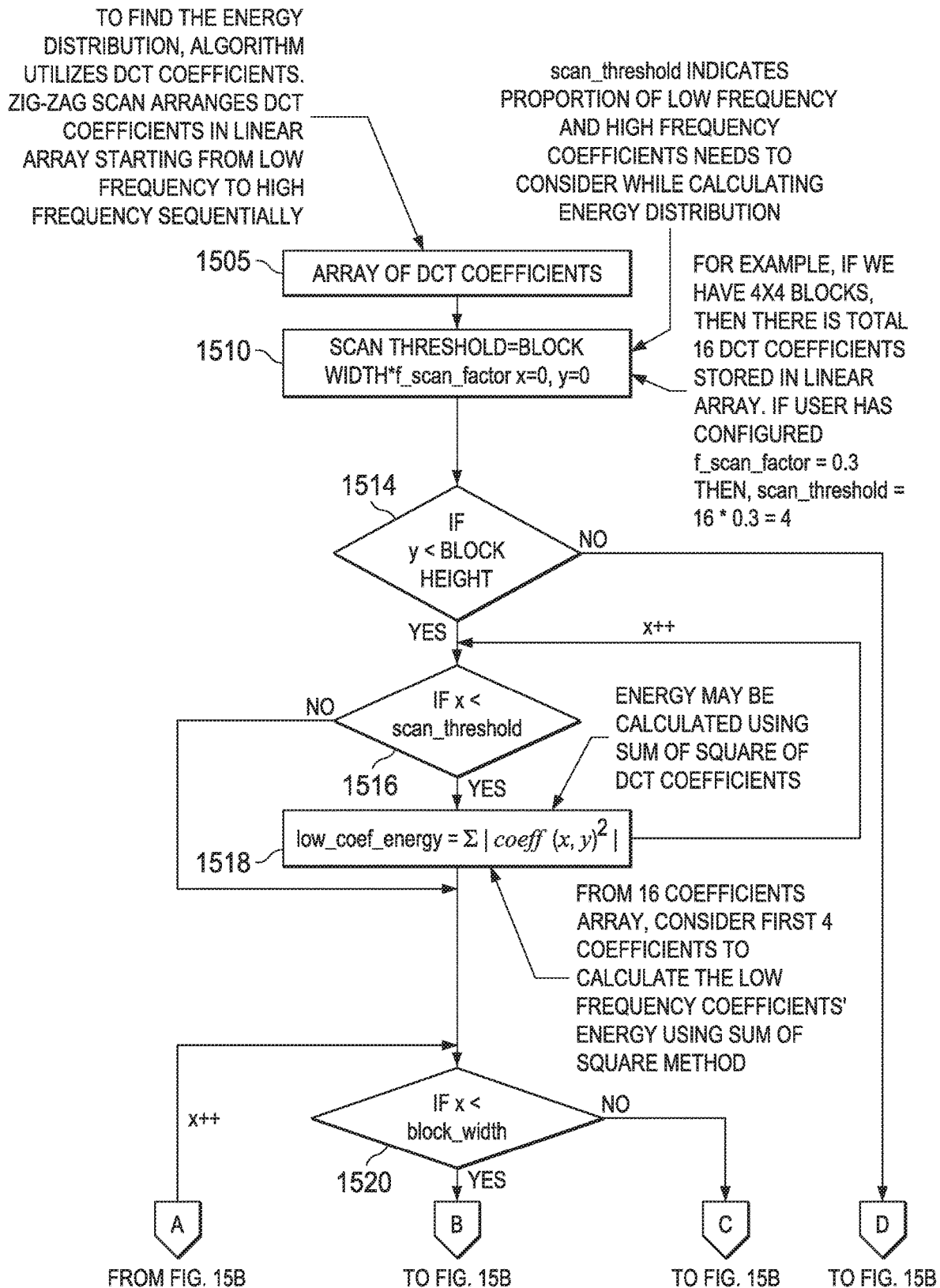
FIGS. 15A and 15B depicts a flow diagram for one embodiment of a method for detecting energy distribution.
Figure 15B:
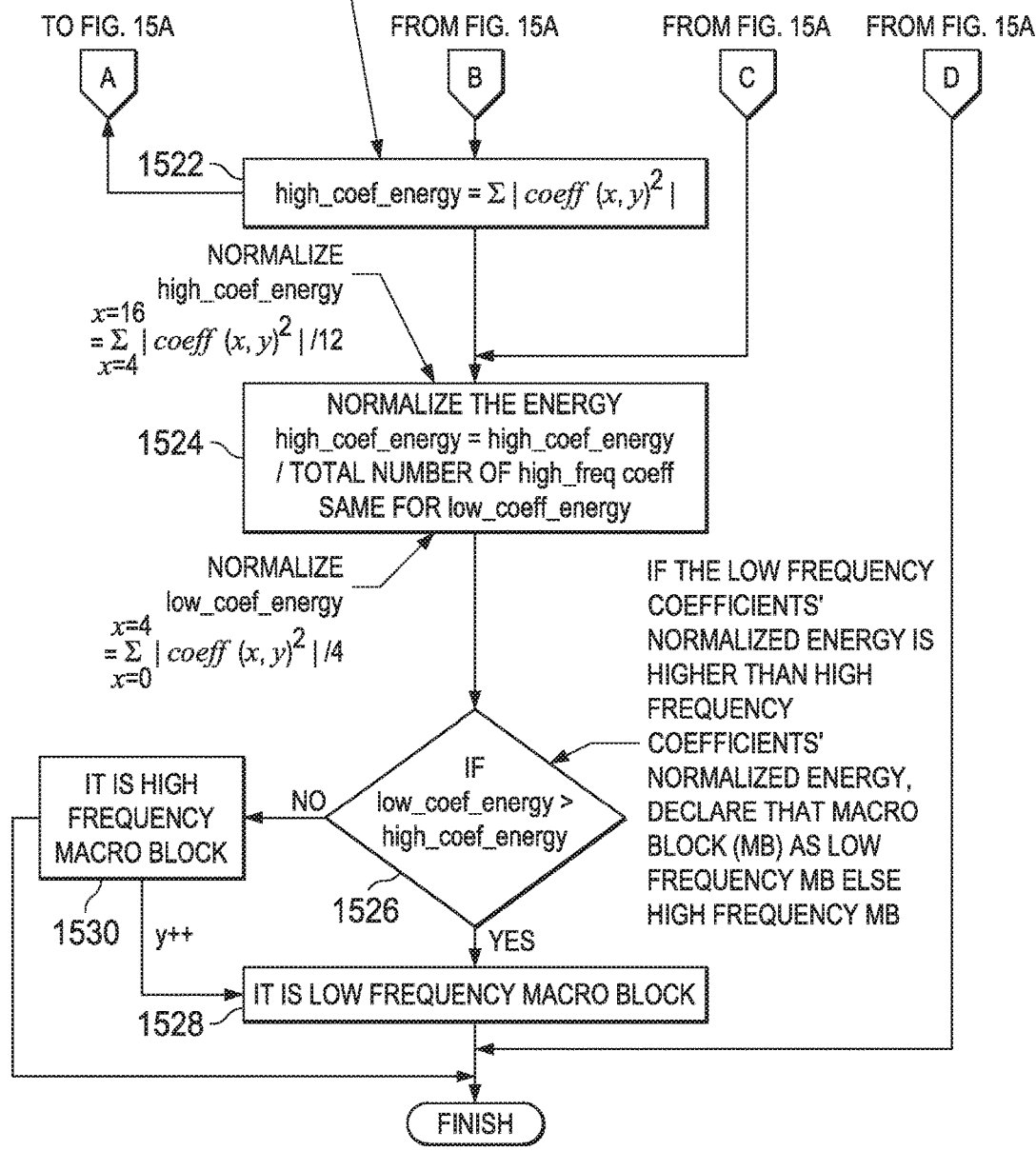

FIGS. 15A and 15B depict a flow diagram for one embodiment of a method for detecting energy distribution in a macroblock. As can be seen, this embodiment of the method functions as follows: if the macroblock is of inter type, performs a DCT on the (e.g., 16×16) block. The DCT operates on sub-blocks (e.g., 4×4 sub blocks) and gives the 16 coefficients, from which DC is located at (0,0) positions. The zig-zag scan arranges the DCT coefficients from low frequency to high frequency order (e.g., in a linear array). For example array [0]=DC component, array [1]=low(est) frequency and so on with array [15]=highest frequency coefficients. Then the method calculates the energy distribution as described above on each of the (e.g., 4×4) sub-blocks avoiding the DC component. If the low frequency count is more than the high frequency count for that 16×16 macroblock, that macroblock is identified as a low frequency macroblock otherwise it is identified as a high frequency block. While embodiments herein are illustrated with respect to a 16×16 macroblock and 4×4 sub-blocks other embodiments will be generally applicable to macroblocks and sub-blocks of other sizes.

Specifically, the method may be called with the array of DCT coefficients for the current macroblock (STEP 1505). As discussed, these DCT coefficients may be arranged as (e.g., 4×4) sub-blocks. Initially, a scan threshold may be determined based on the width of the macroblock and a scan factor (e.g., "f_scan_factor"). Height tracking index variables (y) and width tracking index variable (x) may also be initialized along with variables for low frequency count and high frequency counts (STEP 1510).

In particular, the f_scan_factor may indicate a proportion of low frequency and high frequency coefficients that should be considered in the calculation of energy distribution. The scan_threshold maps the f_scan_factor as a threshold value for the DCT structure (e.g., linear array). The scan_threshold indicates how many coefficients should be considered from the DCT data structure (e.g., the linear array) to calculate low frequency coefficients' energy. For example, if a sub-block is 4×4 pixels, there may be a total of 16 DCT coefficients stored in the data structure (e.g., linear array) if DCT coefficients for the sub-block. If the f_scan_factor is 0.3 then the scan threshold may be 16*0.3=4.8 (which may in some embodiments be rounded down to 4).

It can then be determined if the height tracking variable (y) is less than the block height (e.g., the number of pixels of a macroblock in the Y direction) (STEP 1514). If the height tracking variable (y) is less than the block height (YES branch of STEP 1514) it can then be determined if the width tracking variable (x) is less than the scan threshold. If the width tracking variable (x) is less than the scan threshold (YES branch of STEP 1516) the low energy coefficients may be used to calculate the low frequency energy (e.g., for the sub-block) (STEP 1518). For example, if the DCT array has 16 coefficients corresponding to the macroblock, the first number of coefficients associated with the scan_threshold (e.g., 4 in the instant example) may be used to calculate the low frequency energy using the sum of squares method. Thus, while the width tracking variable (x) is less than the scan threshold, the low frequency energy of these coefficients may be summed and the width tracking variable (x) incremented until the width tracking variable (x) is equal to the scan threshold (NO branch of STEP 1516).

At the point the width tracing variable (x) is equal to (or greater) than the scan threshold (NO branch of STEP 1516) it can be determined if the width tracking variable (x) is less than the block_width (e.g., the width of the macroblock) (STEP 1520). While the width tracking variable (x) is less than the block_width (YES branch of STEP 1520) the high energy coefficients may be used to calculate the high frequency energy (STEP 1522). For example, if the DCT array has 16 coefficients corresponding to the macroblock, the coefficients from 5-16 (e.g., in the case where the scan_threshold is 4) may be used to calculate the high frequency energy using the sum of squares method. Thus, while the width tracking variable (x) is less than the block_width, the high frequency energy of these coefficients may be summed and the width tracking variable (x) incremented until the width tracking variable (x) is equal to the block_width (NO branch of STEP 1520).

At the point the width tracking variable (x) is equal to (or greater) than the block threshold (NO branch of STEP 1520), the high frequency energy and the low frequency energy may be normalized by dividing by the number of coefficients utilized to determine each (e.g., 4 or 12) (STEP 1524). The normalized low frequency energy may then be compared to the high frequency energy (STEP 1542). If the low frequency energy is greater than the high frequency energy (YES branch of STEP 1542) the low frequency count may be incremented (STEP 1544). Otherwise, (NO branch of STEP 1542) the high frequency count may be incremented (STEP 1546). The height tracking variable (y) may then be incremented (STEP 1548), the width tracking variable (x) reset (e.g., to 0) (STEP 1552) and the height tracking variable (y) again compared against the block height (STEP 1514) (e.g., to determine if the last sub-block has been processed).

If the height tracking variable (y) is equal to (or greater than) the block height (NO branch of STEP 1514), the low frequency count may then be compared to the high frequency count (STEP 1526). If the low frequency count is greater than the high frequency count (YES branch of STEP 1526) the macroblock may be designated as a low frequency macroblock (STEP 1528). Otherwise, (NO branch of STEP 1526) the macroblock may be designated as a high frequency macroblock (STEP 1530).

Combined Copy and Conditionally Compare

Returning now to FIGS. 10A and 10B, another way to conserve computing resources on the virtual mobile device platform may be to avoid processing parts of a frame that have not changed from the previous frame. In particular, in some cases original frame 1032 stored in a buffer or memory location may have various areas (e.g., macroblocks) that did not change at all from the previously output frame 1052. If areas of the original frame 1032 have not changed from the original previous frame 1052 it may be possible to bypass some processing for these areas of the original frame 1032 when producing encoded frame 1048, including for example pre-processing 1038 of the duplicative area(s) (e.g., processing of the area by content-type detector 1016, or color space converter 1018) or encoding of the unchanged area(s) by display encoder 1044. Instead, a corresponding area of the original previous frame 1052 (e.g., in the YUV color space) or an encoded version of the corresponding unchanged area from encoded previous frame 1057 may be utilized to generate the current encoded frame 1048. By bypassing this processing, computing resources may be conserved and the generation of encoded frame 1048 accelerated.

Recall from the above that the pixel data of frames is organized into square subsections of pixels called macroblocks. For example, a 16×16 pixel size is a typical macroblock size for the H.264 codec. When the original frame 1032 is received by pre-processor 1038, ZMV detector 1074 may operate on the macroblocks of the original frame to determine macroblocks of the original frame 1032 that have not changed from the previous frame 1052. Because the data in these macroblocks do not change, from a motion detection point of view, macroblocks with only unchanged data are referred to as zero motion vector (ZMV) macroblocks. The identified ZMV macroblocks may be identified in current frame metadata 1058. Such an identification may be in addition to, in lieu of, or may include, an association between each macroblock of the current frame and an identifier indicating if that macroblock is a low-frequency or a high-frequency macroblock.

In particular, in one embodiment, ZMV macroblocks of the original frame may be determined by including customized code in the guest OS 1012 (e.g., in the user interface (UI) and graphics stack layers) in order to capture high level application and system calls that provide display content type information about the areas of the screen they are modifying. Unmodified areas found using this method may incur zero addition processing cost to find.

Alternatively, a comparison between the current frame 1032 in memory (e.g., a buffer) and the original previous frame 1052 in memory (e.g., a buffer) may be utilized to identify ZMV macroblock of the current original frame 1032. Certain embodiments may implement such a memory comparison in an efficient manner. First, while the comparison units are 16×16 (or other dimension) pixel macroblocks (e.g., macroblocks are compared between the current frame 1032 and the original previous frame 1052) line by line comparisons may be used to take advantage of typical hardware cache line sizes and mechanisms. Secondly, hand coded assembly x86 extension operations available at runtime may also be used. Additionally, remember that since the original last frame 1052 is maintained, at some point the current original frame 1032 must be copied (e.g., from a frame buffer containing the current original frame 1032 to a location or buffer for storing the original last frame 1052). By combining the comparison operation where a macroblock of the current original frame 1032 is compared with the corresponding macroblock of the original last frame 1052 with a copy operation to replace the corresponding macroblock of the original last frame 1052 with the macroblock of the current original frame 1032 embodiment may reduce computational resources and overhead.

Specifically, in certain embodiment an OS running in a virtualized environment (e.g., guest OS 1012) actually has a display device frame buffer whose memory was allocated in the hypervisor (e.g., KVM/QEMU 1010) (or on the guest OS 1012). This may be the frame buffer where original frame 1032 is stored. From the point of view of the hypervisor display processing functionality (e.g., I/O thread 1014), this frame buffer memory may be written to by the virtual OS display system (e.g., Android display system 1034) at any time, and thus is unstable. Accordingly, to reliably make a comparison of the current frame buffer contents (e.g., original frame 1032) to the previous frame buffer that was processed, one must keep around an additional frame buffer which holds the data from the previous frame. Original last frame 1052 may be stored in such a frame buffer. While making an extra copy of the entire frame buffer is typically not computationally cheap, by combining a frame buffer copy step with the compare step (e.g., using embodiments of assembly code) the cost required to perform such copy and compare may be shared amongst the operations, thus reducing the total cost of doing both.

Particular embodiments of a macroblock compare-and-conditionally-copy functionality which performs the memory comparison between all the macroblocks in the previous and current frame to determine which macroblocks contain modified data and which macroblocks remain unchanged (e.g., are ZMV macroblocks) will now be discussed in more detail with reference to FIGS. 16-20. This information (e.g., identifying which macroblocks are or are not ZMVs) may be stored in a container called the mb_info_hyp array (or, interchangeably the mb_info_array or mb_info_array) which may be provided to other components (e.g., color space convertor 1018, content type detector 106, display encoder 1044, etc.) in the display pipeline to increase quality and performance of this pipeline. As display encoder 1044 and other components of the pipeline may be configured to operate on macroblock units of a base pixel size (e.g., 16×16 pixel for H.264), pre-processor 1038 may also operate on frame data organized into macroblock units such that data on these macroblock units may be passed to other components (e.g., display encoder 1044).

As discussed, the macroblock comparison between the previous and current frame (e.g., to determine ZMV macroblocks) may be extremely useful, as the identity of the ZMV macroblocks may be used to bypass expensive non-beneficial or unneeded operations in the rest of the display pre-processing and the display encoding. In the pre-processing stage, in certain embodiments expensive color space conversion operations may be bypassed for macroblocks identified as unmodified. For the display encoder, expensive operations at multiple stages of the encoding pipeline may be bypassed and data from the previously encoded frame (e.g., as contained in encoded previous frame 1057) used instead. It will be noted that while certain embodiments may bypass color space conversion or display encoding based on identification of ZMV macroblocks according to embodiments of ZMV identification as disclosed herein, the identification of ZMV macroblocks may be done according to almost any methodology desired in conjunction with embodiments of bypassing color space conversion or display encoding as disclosed herein.

While block-based display encoders (e.g., those used for H.264 based encoders) typically attempt to re-use data from the previous screen as much as possible in their encoding of the current frame these typical approaches are less optimal and less accurate than embodiments of the macroblock compare-and-conditionally copy method as disclosed. To illustrate in more detail, a straightforward and obvious solution for comparing macroblocks between the current and previous frame would be to compare each pixel row of the macroblock from top to bottom.

Figure 16:
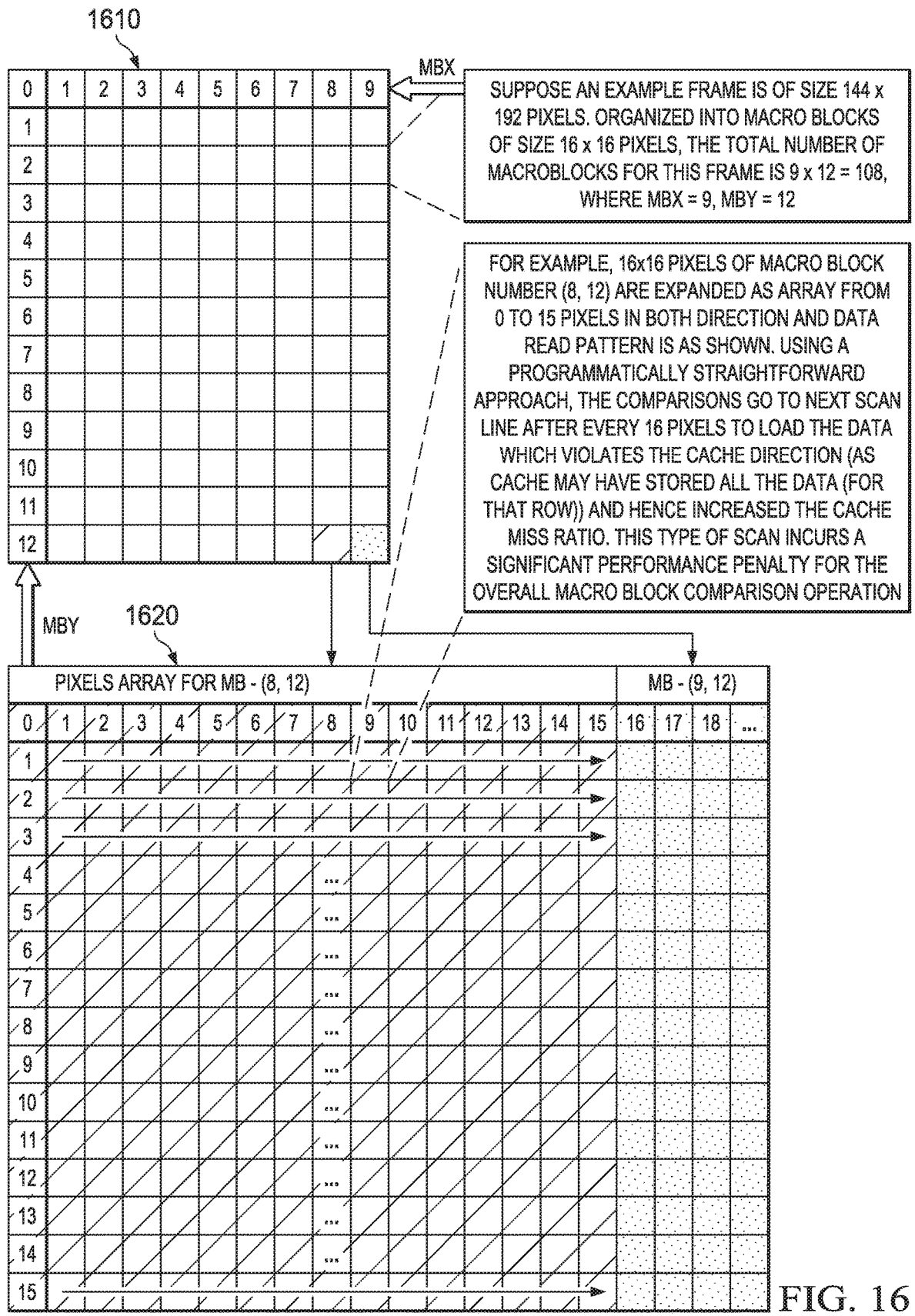
FIG. 16 depicts a diagrammatic representation of one example of macroblock comparison.

But, this approach is inefficient as illustrated with respect to FIG. 16. Suppose for example a frame 1610 is of size 144×192 pixels. When this frame 1610 is organized into macroblocks having a size of 16×16 pixels the total number of macroblocks for frame 1610 is 108 (where MBX=9 and MBY=12 or 9×12). For example, 16×16 pixels of macroblock number (8, 12) 1620 are expanded as an array from 0 to 15 pixels in both directions (X and Y). The data read pattern is illustrated as shown, starting with pixel (1,1) of the array and proceeding down row 1 until pixel (1, 15). The scan can then start on row 2 beginning with pixel (2, 1), etc. Using a programmatically straightforward approach, the comparisons go to next scan line after every 16 pixels to load the data. Proceeding in this manner violates or goes against the cache direction (as cache may have stored all the data (for that row)). Hence, scanning in this manner may increase the cache miss ratio. Accordingly, these types of scans may incur significant performance penalty for an overall macroblock comparison operation.

Figure 17:
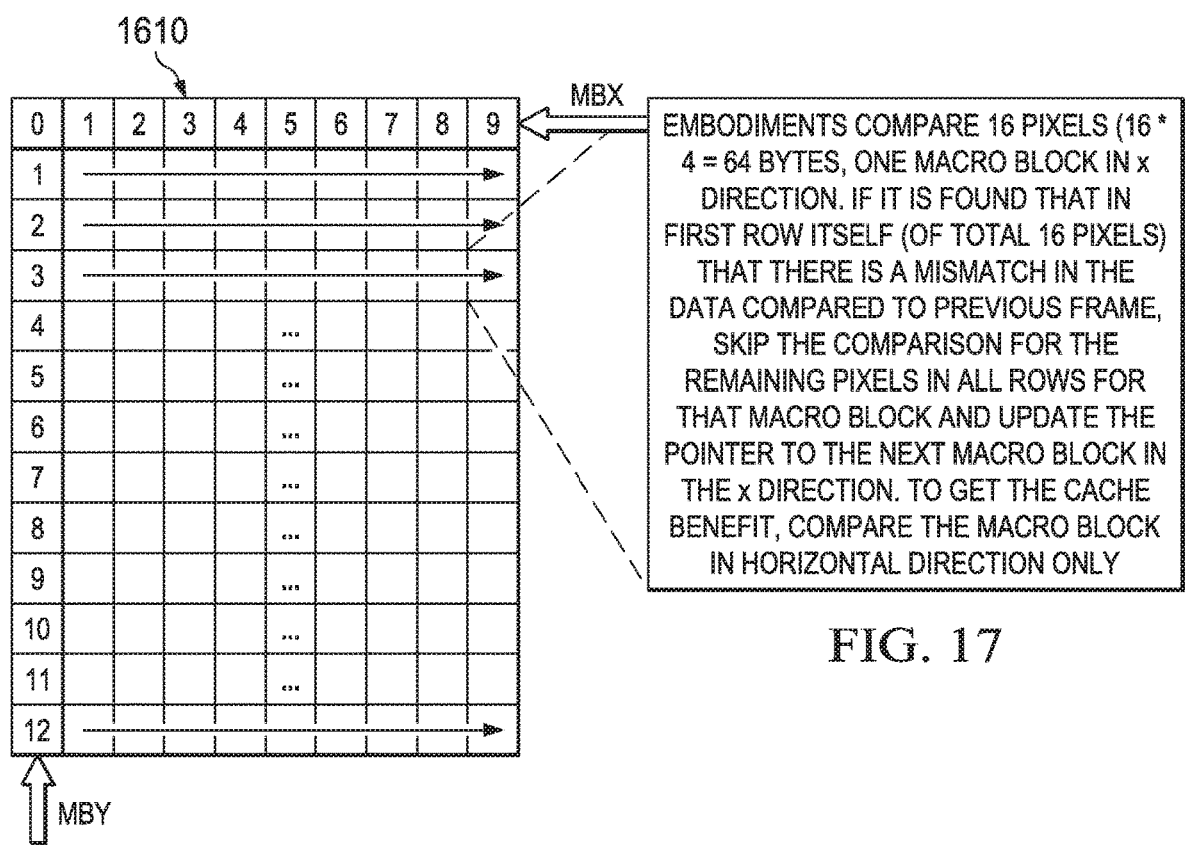
FIG. 17 depicts a diagrammatic representation of one embodiment of processing along a scanline boundary.

As illustrated in FIG. 17, a major efficiency gain of embodiments of the compare and conditionally copy methodology as disclosed is achieved by processing data along the display scanline boundary versus the more obvious boundary of the memory of a particular macroblock. In particular, embodiments may compare 16 pixels (16×4=64 bytes), one macroblock in the X direction. In other words, one macroblock of the current frame may be compared to one macroblock in the previous frame, proceeding in the horizontal (or X) direction. If this comparison finds that in the first row itself (of 16 pixels) that there is a mismatch in the data in the previous frame being compared, the comparison may be skipped for the remaining pixels in all rows for that macroblock. The comparison can then proceed to the next macroblock in the X direction (if possible) or the first macroblock of the next row (if possible). In particular, a pointer being used to point to the current macroblock(s) of the frames being compared may be updated to the next macroblock in the X direction (if possible) or the first macroblock in the next row (if possible). To get the benefit of cache, macroblocks may be compared between the two frames (current frame and previous frame) in a horizontal direction only.

Processing data along the display scanline boundary may achieve efficiencies because the data along the display scanline is contiguous, and thus allows for the most efficient access by CPUs due to the standard memory caching architectures that are optimized for such contiguous memory access. While this may be more programmatically complex for the comparison of macroblocks, the operational efficiency gains are large. More specifically, as discussed in embodiments of the virtual mobile device platform, a virtual mobile OS (e.g., Android OS 1012) is running under a hypervisor which provides a virtual display device (e.g., I/O thread 1014) to which the virtual mobile OS display system 1034 renders its RGB display output. The display handling hypervisor code then processes and compresses this display data to be sent out to remotely connected devices 1090, often connecting over bandwidth limited connections.

In certain embodiments, the current rendered frame (e.g., original frame 1032) output by the virtual mobile OS (e.g., Android OS 1012) uses a single frame memory buffer (e.g., to store original frame 1032). In order to perform the macroblock comparison, a copy of the previous frame buffer must also be kept (e.g., original last frame 1052). Accordingly, to compare the data from the frames, the copy functionality may be integrated with the comparison of the frames such that only modified data is immediately copied from the current frame buffer to the previous frame buffer memory location for the pixel data that was just compared. This allows for an efficient method of copying this data due to a) only copying data that did not change, and b) re-using cached data that was used for the compare operations. Re-using the cached data avoids expensive cache misses that would result in inefficient external memory fetch operations. These integrated compare-and-conditionally-copy operations do not exist in standard libraries (e.g., C libraries).

FIGS. 18-20 are flow diagrams illustrating embodiments of methods for a combined copy and compare. These flow diagrams illustrate embodiments of implementations for efficient macroblock compare-and-conditionally-copy functionality of 32-bit RGB data. These methods are similarly applicable to other formats such as 16-bit or 24-bit or 64-bit RGB data formats (among others). Generally, in certain embodiments an array for the macroblocks (e.g., mb_info_hyp array) is initialized with value 1, and it is assumed that all the macro blocks are unmodified/static. Next, the total number of static_count is calculated and initialized, as all the macroblocks in the frame. Next, reference and current pointers may be loaded into registers. A main outer loop runs (e.g., index i) on the total number of macro blocks in the Y direction. An inside loop is run for 16 rows (one macroblock size). A last loop (e.g., index j) will be run on the number of macroblock in the X direction. The total number of macroblocks may always be processed in the X direction, which is the cache direction and then move to the next scanline. By scanning in the X direction the cache miss ratio is reduced and hence the CPU performance increased.

Embodiments of the method checks for the mb_info_hyp [j] array and if the value is equal to 1, this macroblock is not processed yet so compare the 64 bytes (16 pixels*4 bits/pixel) for this scanline of the macroblock with the reference frame. If the comparison is successful, increment both the pointers to the macroblocks being compared, go to the next macroblock in the X direction and go until the last macroblock in the X direction is processed. If the comparison fails, reset the value in mb_info_hyp[j] array to 0 for this macroblock, decrement the total static count (e.g., number of unchanged macroblocks between the frames) and increment both the pointers to move to the next macroblock scan. If the comparison fails and a calling application has indicated the macroblocks should be copied, copy back the data from current frame pointer to the reference pointer for this macroblock position.

If all the macroblocks are processed in X direction, the method moves to the next row of pixels and again checks the mb_info_hyp array value. If that value of mb_info_hyp is 0, it indicates that first row comparison fails for this macroblock, so avoid comparison for remaining rows for this macroblock and move to the next macroblock. If the all the 16 rows are completed, the method increments the macroblock count in the y direction (e.g., index i) count and if the macroblock count in the y direction (e.g., index i) exceeds the total number of macroblocks in the Y direction, it returns the total number of static macroblocks to the caller of the method.

Figure 18A:
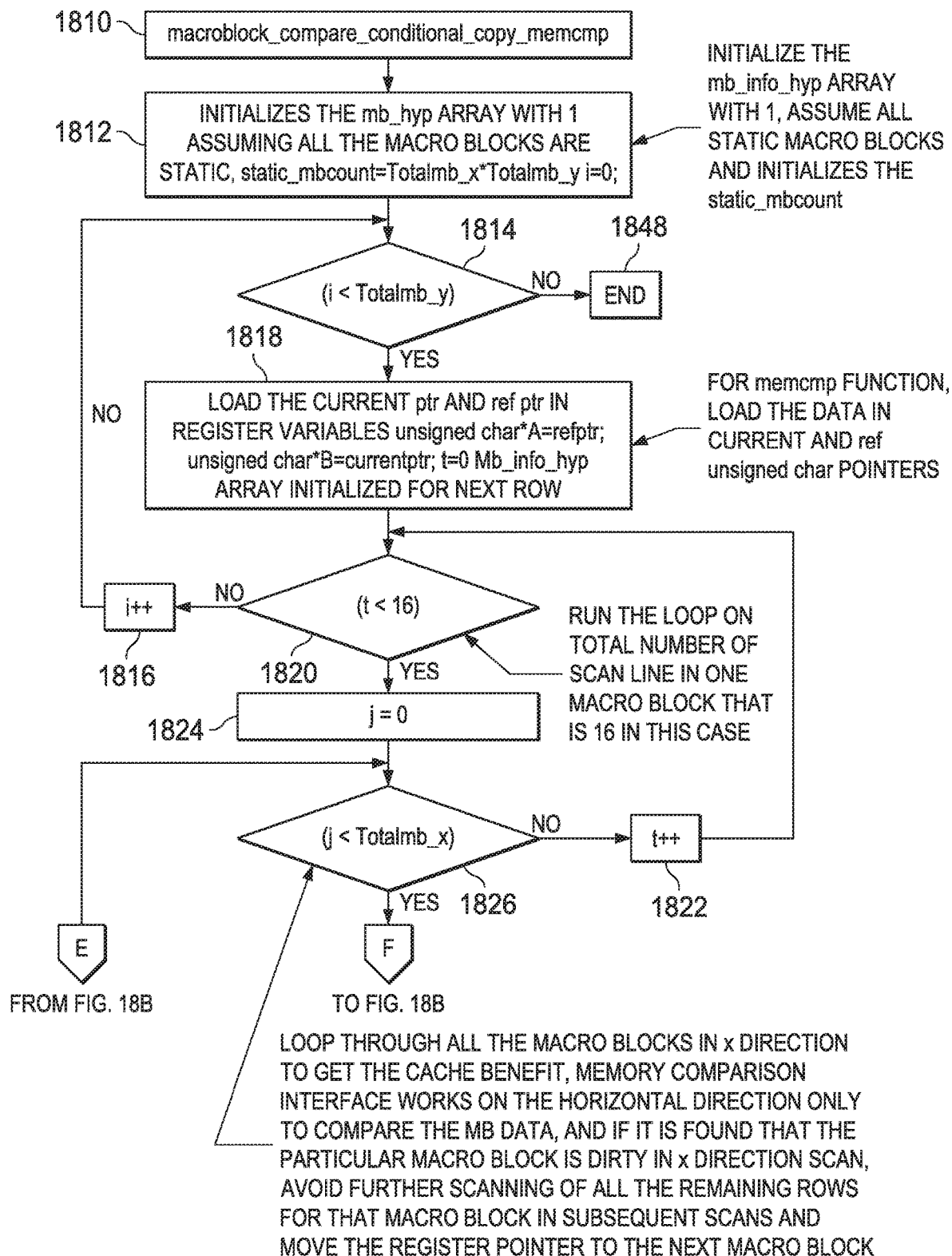
FIGS. 18A, 18B, 19A, 19B, 20A and 20B are flow diagrams illustrating embodiments of methods for a combined copy and compare.
Figure 18B:
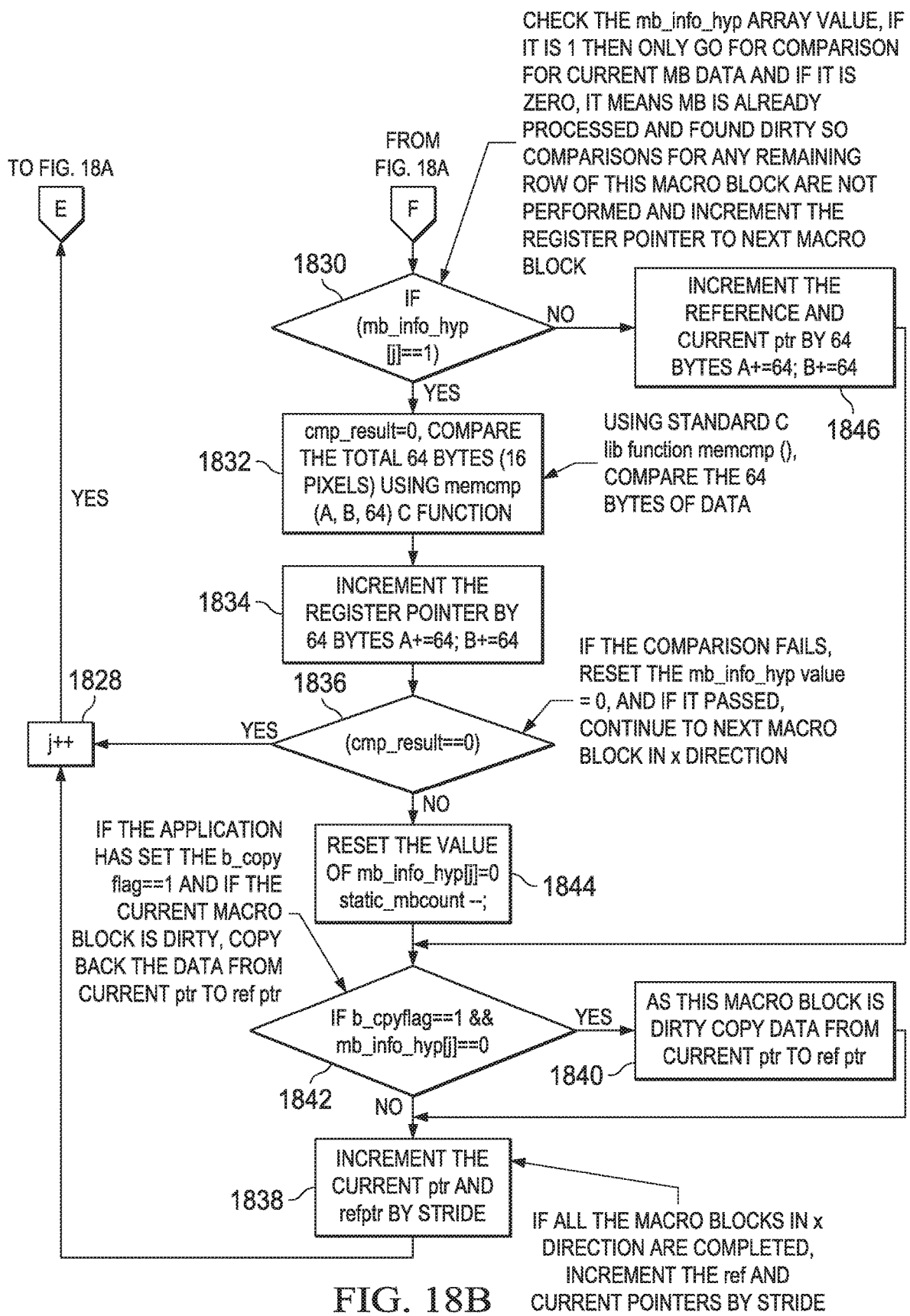

FIGS. 18A and 18B depict an embodiment of a non-platform specific implementation using standard C library functions. Additionally, FIGS. 19A and 19B and 20A and 20B illustrate embodiments that utilized x86 platform specific functionality to more efficiently perform these operations by using Intel x86 extensions in the SSE2 and AVX2 extension family. SSE2 is support by most x86 machines in operation today and AVX2 is support by more recent machines. These embodiments are given by way of example. Other embodiments could apply to other platforms as well and similarly use their platform specific extension in a similar manner. For purposes of the following description it is assumed that there are 32 bits/pixel RGB data and SSE2 SIMD instructions are being used. Macroblock size is assumed to be 16×16 pixels.

Referring first to FIGS. 18A and 18B then, the macroblock comparison and conditional copy may be called (STEP 1810). The macroblock (mb) array (the mb_info_hyp array) is initialized with value 1, indicating that it is assumed that all the macroblocks of the frames being compared are unmodified/static. Next, the total number of static_count is calculated. A variable (e.g., static_mbcount) may be initialized for the frames being compared (e.g., total number of macroblocks in the X direction (totalmb_x) multiplied by the total number of macroblocks in the Y direction (totalmb_y)). The number of static macroblocks between the two frames being compared may be stored in this variable (e.g., static_mbcount). A loop counter variable (i) for the total number of macro blocks in the Y direction is also initialized (STEP 1812).

The main outer loop runs on the total number of macro blocks in Y direction, which is determined by comparing the Y direction loop counter (i) to the total number of macroblocks in the Y direction (totalmb_y) (STEP 1814). If the Y direction loop counter (i) is equal or greater than the total number of macroblocks in the Y direction (totalmb_y) it indicates that all the macroblocks have been compared, the method may end and the value of the variable (e.g., static_mbcount) indicating the total number of static or unchanged macroblocks for the frames being compared may be returned (STEP 1848).

If, however, the Y direction loop counter is less than the total number of macroblocks in the Y direction (totalmb_y) (YES branch of STEP 1814), the reference pointer (refptr) for pointing to the (macroblock or scanline of) the previous frame buffer and current pointer (currentptr) for pointing to the (macroblock or scanline) the current frame buffer may be loaded into register variables (e.g., A and B respectively).

A variable (e.g., t) for an inside loop counter (e.g., for 16 rows of scanlines) may also be initialized. The macroblock array (the mb_info_hyp array) may be initialized for the current row (e.g., the row corresponding to index i) (STEP 1818). The inner loop (indexed by t) may be run on the total number of scanlines in one macroblock (e.g., 16). Accordingly, it can be checked if this loop counter (t) is less than 16 (STEP 1820). If it is not, it indicates the last scanline has been reached and the method may increment the row counter (i) (STEP 1816) and return to see if the last row has been processed (STEP 1814).

If, however, the last scanline has not been reached (YES branch of STEP 1820), a loop counter (j) for the number of macroblocks in the X direction may be initialized (STEP 1824). This last loop will thus be run on the number of macroblock in the X direction. The total number of macroblocks may always be processed in the X direction, which is the cache direction, and then move to the next scanline. By scanning in the X direction the cache miss ratio is reduced and hence the CPU performance increased.

Accordingly, it can be checked if this X direction macroblock counter (j) is less than the total number of macroblocks in the X direction (totalmb_x) (STEP 1826) (e.g., indicating the last macroblock of the row has or has not been reached). If it is not, it indicates the last macroblock of the row has been reached and the method may increment the scanline counter (t) (STEP 1822) and return to see if the last scanline has been processed (STEP 1820). If, however, the last macroblock has not been reached (YES branch of STEP 1826), the value for the entry in the macroblock array (the mb_info_hyp array) corresponding to the macroblock associated with current value of the macroblock loop counter (j) may be checked to determine if that macroblock has been processed (or processed and found to be "dirty" (e.g., the macroblock in the current frame is different than the corresponding macroblock in the previous frame)).

Recall that the entries in the macroblock array (the mb_info_hyp array) were initialized to 1 indicating that they are static macroblocks. Thus, if the value of the mb_info_hyp array for the current index (mb_info_hyp[j]) is equal to 1, this macroblock has not been compared (or has been previously compared and found not to be dirty). Accordingly, if the value of the mb_info_hyp array for the current index (mb_info_hyp[j]) is equal to 1 (YES branch of STEP 1830), a scanline of the macroblock of the current frame may be compared to a scanline of the corresponding macroblock of the previous frame (STEP 1832). This comparison may be done, for example, using the memcmp function of the standard C library called with the current value of the register variables (e.g., A and B) pointing to the areas of the macroblock to be compared and the number of bytes to be compared (e.g., 64) (STEP 1832). These register values (A and B) can then be incremented by 64 to advance them to point to the scanline of the next macroblock of the respective frames in the X direction (STEP 1834).

If the comparison of the scanline of the macroblocks indicates that they are equivalent (e.g., the return value from the memcmp operation is 0) (YES branch of STEP 1836), the counter for the macroblocks in the row (j) may be incremented (STEP 1828) and it can then be determined if that macroblock was the last macroblock in the row (STEP 1826). If it was the last macroblock in the row (NO branch of STEP 1826), the inside loop counter corresponding to the number of scanlines (t) may be incremented (STEP 1812) and it can be determined (STEP 1820) if that is the last scanline for that row of macroblocks.

If, however, the memcmp indicates that the scanline in the two macroblocks being compared are not equivalent (NO branch of STEP 1836), the value for that macroblock in the value of the mb_info_hyp array for the current index (mb_info_hyp[j]) may be set to 0, indicating the macroblock is dirty and the static_mbcount indicating the number of static macroblocks between the two frames decremented (STEP 1844). If a value is set (e.g., b_cpyflag) indicating that the macroblocks should be copied and the value of the mb_info_hyp array for the current index (mb_info_hyp[j]) is set to zero (YES branch of STEP 1842), the data for that scanline may be copied from the location pointed to by the current pointer (e.g., B) to the location pointed to by the reference pointer (e.g., A) (STEP 1840). Additionally, if the indexed scanline for each macroblocks in the X direction have been compared, the reference pointer and the current pointer (e.g., A and B) may be incremented by a stride so that they may point to next row of scanlines (STEP 1838). A stride may be a memory size corresponding to a number of bits utilized to store data for a row of pixels and may be, for example, dependent on the data format or architecture used by a computing device. The index (j) for the for the X direction macroblock counter may be incremented (STEP 1828) and again it can be checked if this X direction macroblock counter (j) is less than the total number of macroblocks in the X direction (totalmb_x) (STEP 1826) to see if the indexed scanline (e.g., indexed by t) has been compared for each macroblock in the X direction.

If, when evaluating whether the value of the mb_info_hyp array for the current index (mb_info_hyp[j]) is equal to 1, it is determined that this value is not equal to 1 (indicating that the indexed macroblock has been determined to be dirty) (NO branch of STEP 1830), the register values (A and B) can be incremented by 64 to advance them to point to the scanline of the next macroblock of the respective frames in the X direction (STEP 1846) without performing a comparison of the scanlines between the two macroblocks. If a value is set (e.g., b_cpyflag) indicating that the macroblocks should be copied and the value of the mb_info_hyp array for the current index (mb_info_hyp[j]) is set to zero (YES branch of STEP 1842), the data for that scanline may be copied from the location pointed to by the current pointer (e.g., B) to the location pointed to by the reference pointer (e.g., A) (STEP 1840). Additionally, if the indexed scanline for each macroblock in the X direction have been compared, the reference pointer and the current pointer (e.g., A and B) may be incremented by a stride so that they may point to next row of scanlines (STEP 1838). The index (j) for the for the X direction macroblock counter may be incremented (STEP 1828) and again it can be checked if this X direction macroblock counter (j) is less than the total number of macroblocks in the X direction (totalmb_x) (STEP 1826) to see if the indexed scanline (e.g., indexed by t) has been compared for each macroblock in the X direction.

Figure 19A:
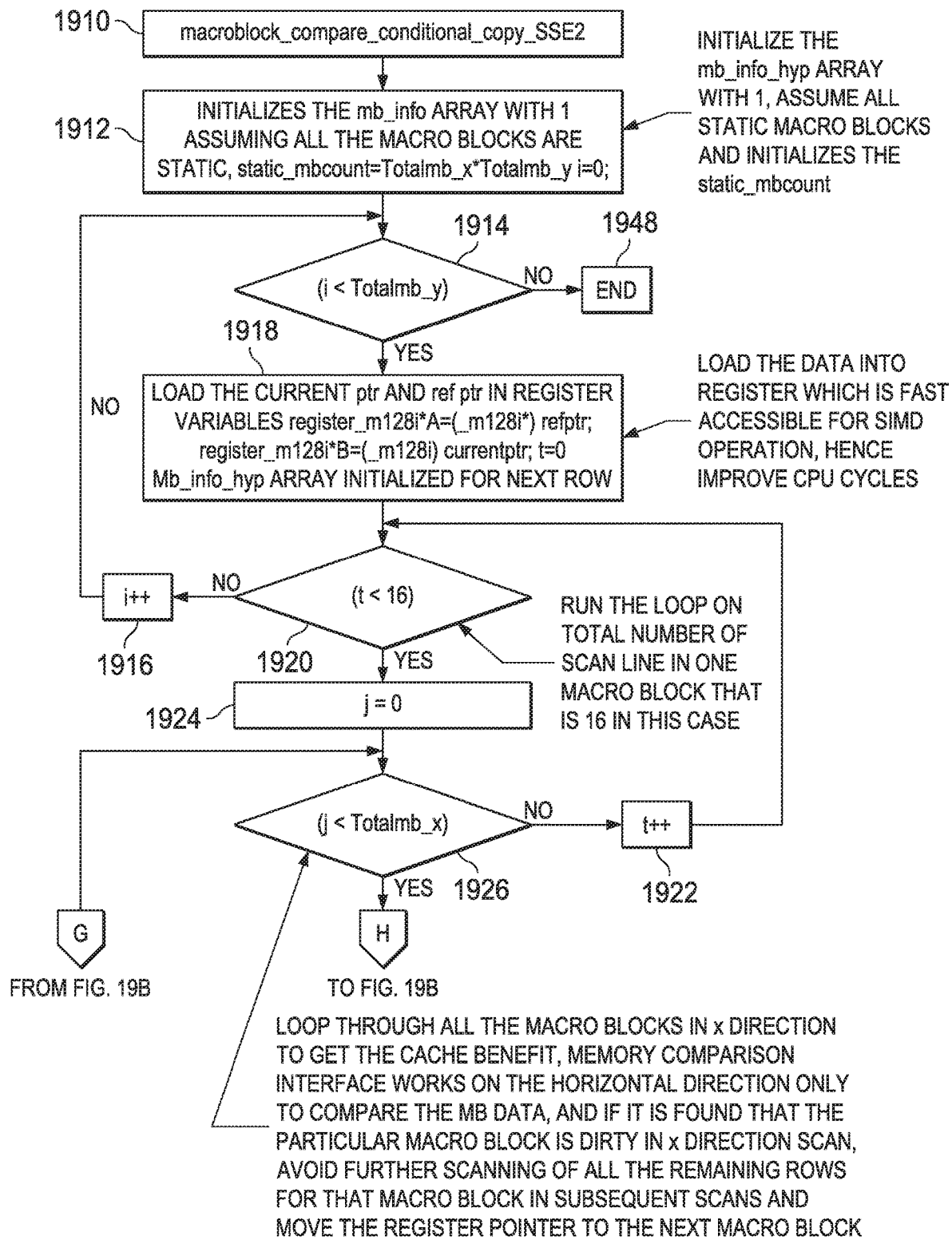
Figure 19B:
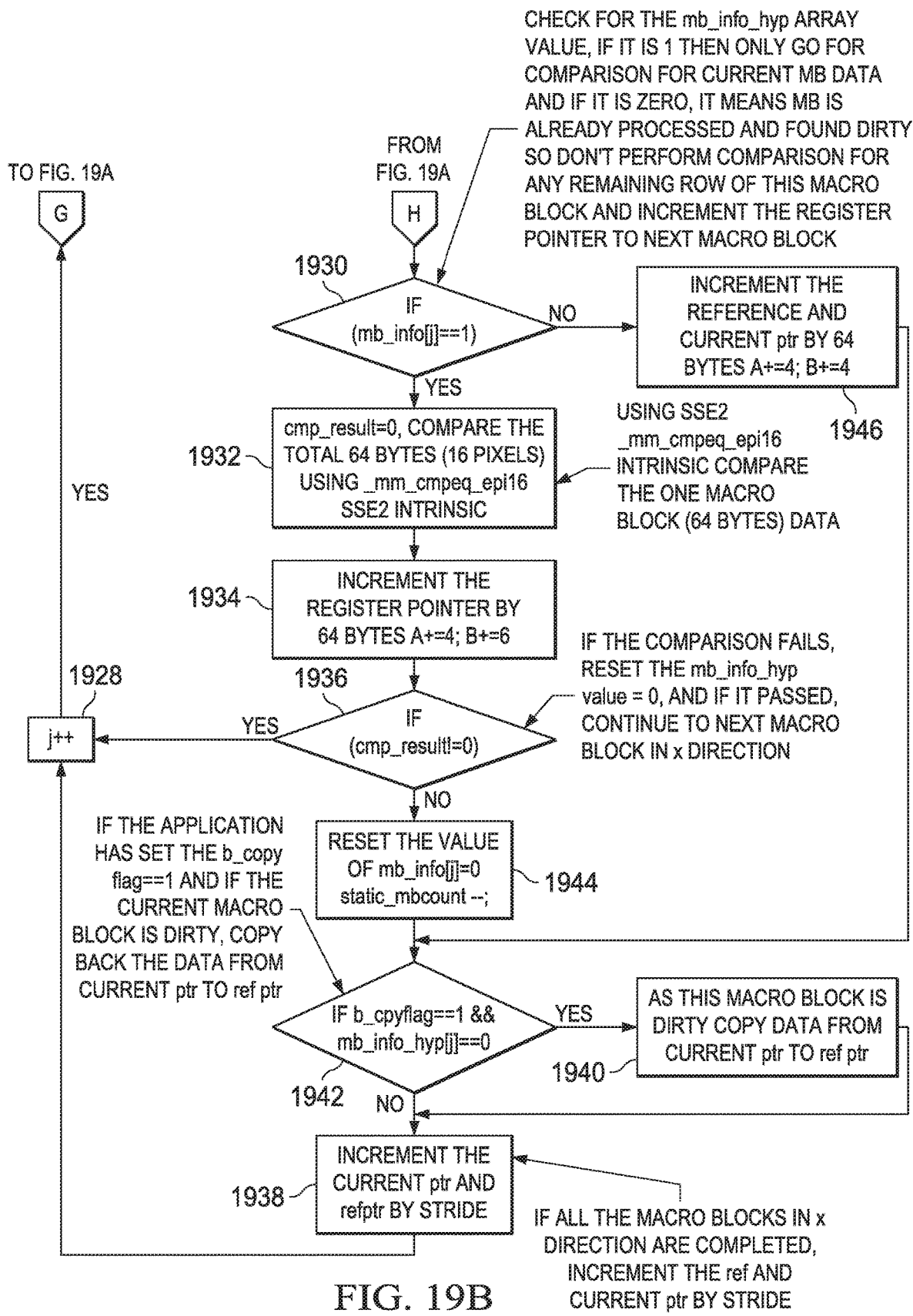

Moving now to FIGS. 19A and 19B, one embodiment for a method of conditionally comparing and copying macroblocks using SSE2 is depicted. The macroblock comparison and conditional copy may initially be called (STEP 1910). The macroblock (mb) array (the mb_info_hyp array) is initialized with value 1, indicating that it is assumed that all the macroblocks of the frames being compared are unmodified/static. Next the total number of static_count is calculated. A variable (e.g., static_mbcount) may be initialized for the frames being compared (e.g., total number of macroblocks in the X direction (totalmb_x) multiplied by the total number of macroblocks in the Y direction (totalmb_y)). The number of static macroblocks between the two frames being compared may be stored in this variable (e.g., static_mbcount). A loop counter variable (i) for the total number of macro blocks in the Y direction is also initialized (STEP 1912).

The main outer loop runs on the total number of macro blocks in Y direction, which is determined by comparing the Y direction loop counter (i) to the total number of macroblocks in the Y direction (totalmb_y) (STEP 1914). If the Y direction loop counter (i) is equal or greater than the total number of macroblocks in the Y direction (totalmb_y) it indicates that all the macroblocks have been compared, the method may end and the value of the variable (e.g., static_mbcount) indicating the total number of static or unchanged macroblocks for the frames being compared may be returned (STEP 1948).

If, however, the Y direction loop counter is less than the total number of macroblocks in the Y direction (totalmb_y) (YES branch of STEP 1914), the reference pointer (refptr) for pointing to the (macroblock or scanline of) the previous frame buffer and current pointer (currentptr) for pointing to the (macroblock or scanline) the current frame buffer may be loaded into register variables (e.g., A and B respectively). These registers may be, for example 128 bit register (e.g., _m128i registers) variables for SSE2 SIMD.

A variable (e.g., t) for an inside loop counter (e.g., for 16 rows of scanlines) may also be initialized. The macroblock array (the mb_info_hyp array) may be initialized for the current row (e.g., the row corresponding to index i) (STEP 1918). The inner loop (indexed by t) may be run on the total number of scanlines in one macroblock (e.g., 16). Accordingly, it can be checked if this loop counter (t) is less than 16 (STEP 1920). If it is not, it indicates the last scanline has been reached and the method may increment the row counter (i) (STEP 1916) and return to see if the last row has been processed (STEP 1914).

If, however, the last scanline has not been reached (YES branch of STEP 1920), a loop counter (j) for the number of macroblocks in the X direction may be initialized (STEP 1924). This last loop will thus be run on the number of macroblock in the X direction. The total number of macroblocks may always be processed in the X direction, which is the cache direction, and then move to the next scan line. By scanning in the X direction the cache miss ratio is reduced and hence the CPU performance increased.

Accordingly, it can be checked if this X direction macroblock counter (j) is less than the total number of macroblocks in the X direction (totalmb_x) (STEP 1926) (e.g., indicating the last macroblock of the row has or has not been reached). If it is not, it indicates the last macroblock of the row has been reached and the method may increment the scanline counter (t) (STEP 1922) and return to see if the last scanline has been processed (STEP 1920). If, however, the last macroblock has not been reached (YES branch of STEP 1926), the value for the entry in the macroblock array (the mb_info_hyp array) corresponding to the macroblock associated with current value of the macroblock loop counter (j) may be checked to determine if that macroblock has been processed (or processed and found to be "dirty" (e.g., the macroblock in the current frame is different than the corresponding macroblock in the previous frame)).

Recall that the entries in the macroblock array (the mb_info_hyp array) were initialized to 1 indicating that they are static macroblocks. Thus, if the value of the mb_info_hyp array for the current index (mb_info_hyp[j]) is equal to 1, this macroblock has not been compared (or has been previously compared and found not to be dirty). Accordingly, if the value of the mb_info_hyp array for the current index (mb_info_hyp[j]) is equal to 1 (YES branch of STEP 1930), a scanline of the macroblock of the current frame may be compared to a scanline of the corresponding macroblock of the previous frame (STEP 1932). For SSE2, the comparison may be performed using _mm_cmpeq_epi16 intrinsic functionality. A first call checks for the first 16 bytes, and if it's the same then the method compares next 16 bytes and so on . . . up to 4th 16 bytes. If any of the first 16 bytes is not equal, it skips calling of _mm_cmpeq_epi16 for remaining bytes of that macroblock and skip to the next macroblock (STEP 1932). These register values (A and B) can then be incremented to advance them to point to the scanline of the next macroblock of the respective frames in the X direction (STEP 1934). Here, the increment may be by 4 for SSE2, as the instructions for SSE2 may be 128 bit instructions.

If the comparison of the scanline of the macroblocks indicates that they are equivalent (e.g., the return value from the _mm_cmpeq_epi16 operation is not equal to 0) (YES branch of STEP 1936), the counter for the macroblocks in the row (j) may be incremented (STEP 1928) and it can then be determined if that macroblock was the last macroblock in the row (STEP 1926). If it was the last macroblock in the row (NO branch of STEP 1926), the inside loop counter corresponding to the number of scanlines (t) may be incremented (STEP 1912) and it can be determined (STEP 1920) if that is the last scanline for that row of macroblocks.

If, however, the comparison indicates that the scanline of the two macroblocks being compared are not equivalent (NO branch of STEP 1936), the value for that macroblock in the value of the mb_info_hyp array for the current index (mb_info_hyp[j]) may be set to 0, indicating the macroblock is dirty and the static_mbcount indicating the number of static macroblocks between the two frames decremented (STEP 1944). If a value is set (e.g., b_cpyflag) indicating that the macroblocks should be copied and the value of the mb_info_hyp array for the current index (mb_info_hyp[j]) is set to zero (YES branch of STEP 1942), the data for that scanline may be copied from the location pointed to by the current pointer (e.g., B) to the location pointed to by the reference pointer (e.g., A) (STEP 1940). Additionally, if the indexed scanline for each macroblock in the X direction have been compared, the reference pointer and the current pointer (e.g., A and B) may be incremented by a stride so that they may point to next row of scanlines (STEP 1938). The index (j) for the for the X direction macroblock counter may be incremented (STEP 1928) and again it can be checked if this X direction macroblock counter (j) is less than the total number of macroblocks in the X direction (totalmb_x) (STEP 1926) to see if the indexed scanline (e.g., indexed by t) has been compared for each macroblock in the X direction.

If, when evaluating whether the value of the mb_info_hyp array for the current index (mb_info_hyp[j]) is equal to 1, it is determined that this value is not equal to 1 (indicating that the indexed macroblock has been determined to be dirty) (NO branch of STEP 1930), the register values (A and B) can be incremented (e.g., by 4 for SSE2) to advance them to point to the scanline of the next macroblock of the respective frames in the X direction (STEP 1946) without performing a comparison of the scanlines between the two macroblocks. If a value is set (e.g., b_cpyflag) indicating that the macroblocks should be copied and the value of the mb_info_hyp array for the current index (mb_info_hyp[j]) is set to zero (YES branch of STEP 1942), the data for that scanline may be copied from the location pointed to by the current pointer (e.g., B) to the location pointed to by the reference pointer (e.g., A) (STEP 1940). Additionally, if the indexed scanline for each macroblock in the X direction have been compared, the reference pointer and the current pointer (e.g., A and B) may be incremented by a stride so that they may point to next row of scanlines (STEP 1938). The index (j) for the for the X direction macroblock counter may be incremented (STEP 1928) and again it can be checked if this X direction macroblock counter (j) is less than the total number of macroblocks in the X direction (totalmb_x) (STEP 1926) to see if the indexed scanline (e.g., indexed by t) has been compared for each macroblock in the X direction.

Figure 20A:
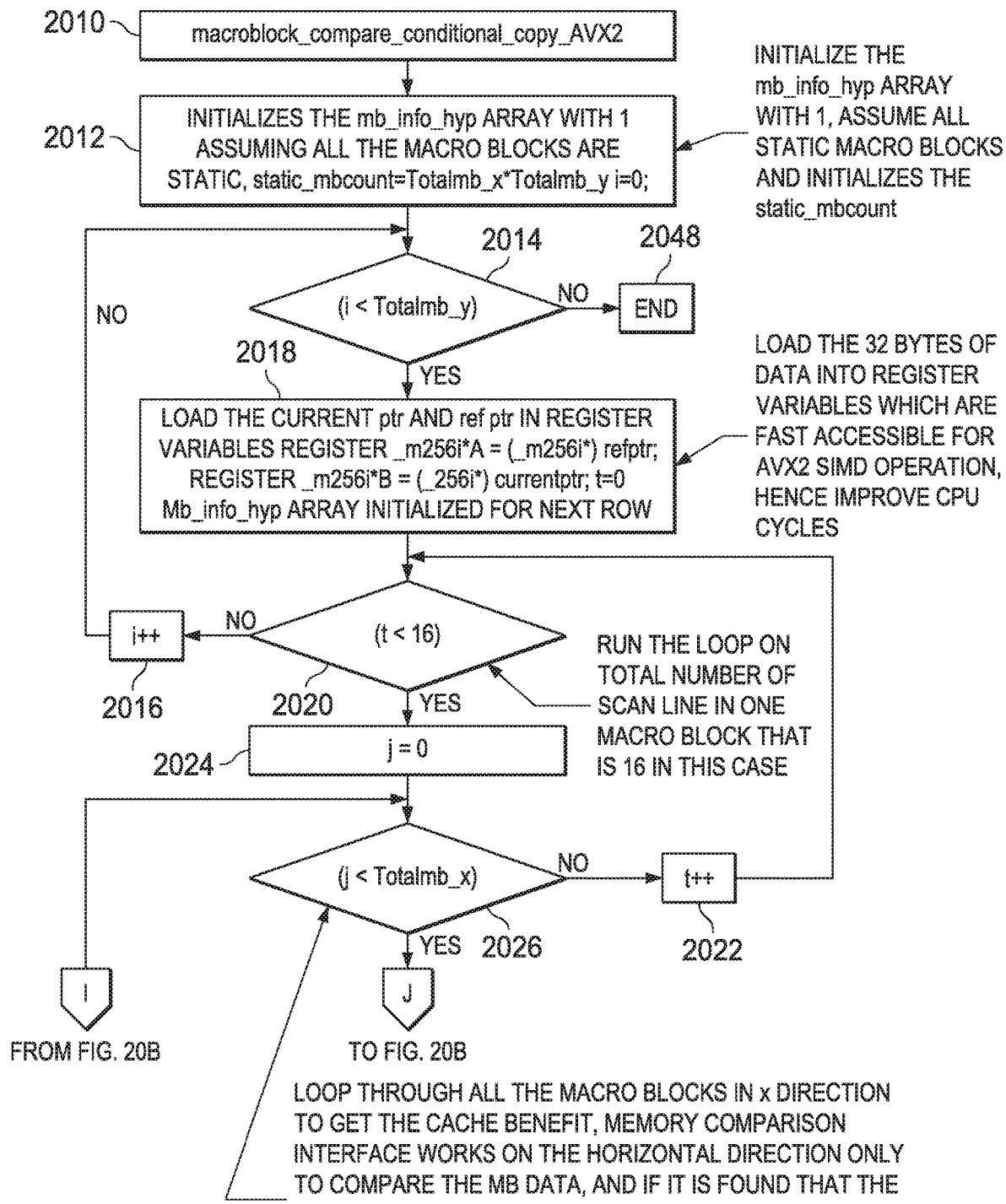
Figure 20B:
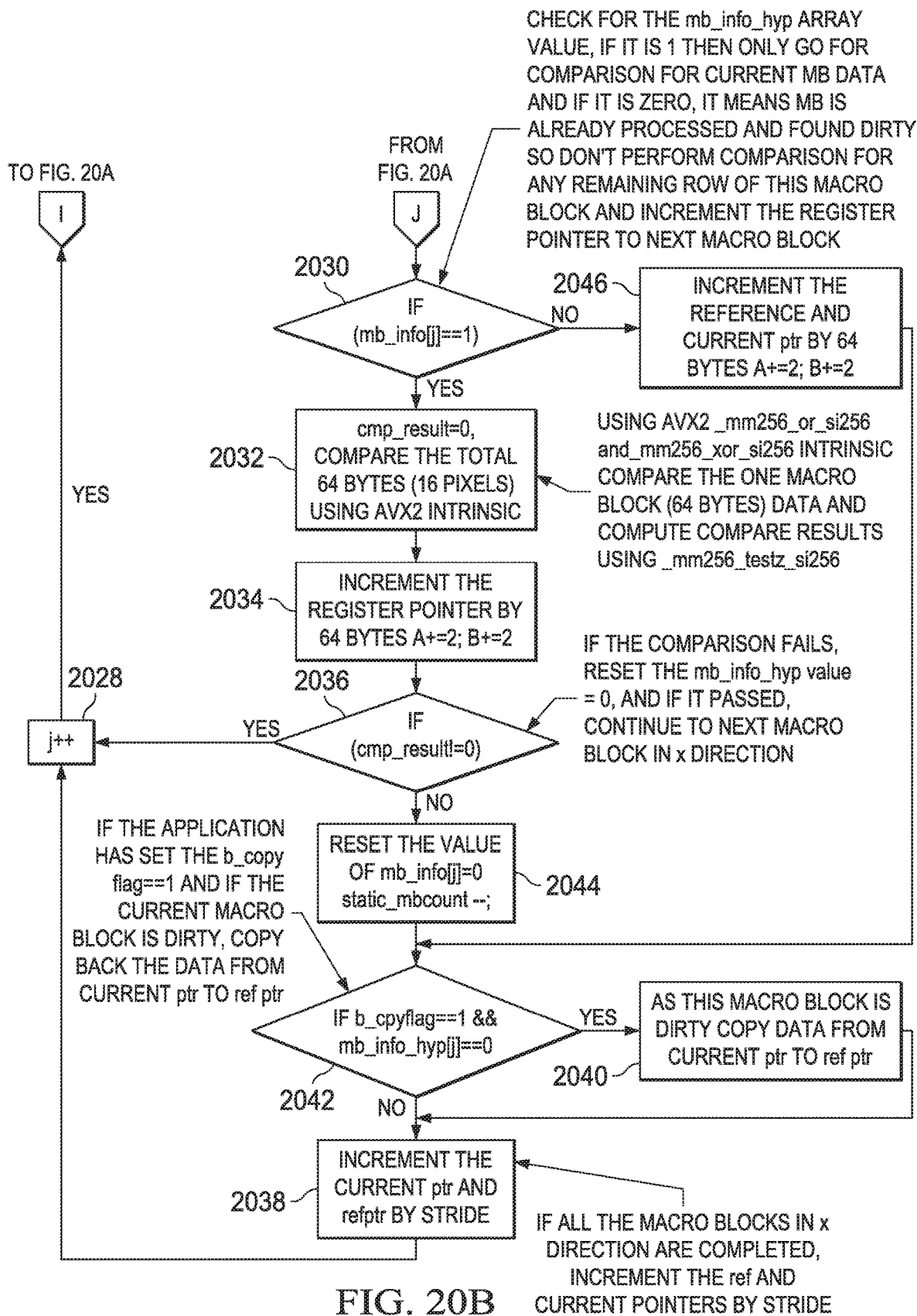

Referring to FIGS. 20A and 20B, one embodiment for a method of conditionally comparing and copying macroblocks for non-SSE2 implementations using AVX2 is depicted. The macroblock comparison and conditional copy may initially be called (STEP 2010). The macroblock (mb) array (the mb_info_hyp array) is initialized with value 1, indicating that it is assumed that all the macroblocks of the frames being compared are unmodified/static. Next the total number of static_count is calculated. A variable (e.g., static_mbcount) may be initialized for the frames being compared (e.g., total number of macroblocks in the X direction (totalmb_x) multiplied by the total number of macroblocks in the Y direction (totalmb_y)). The number of static macroblocks between the two frames being compared may be stored in this variable (e.g., static_mbcount). A loop counter variable (i) for the total number of macro blocks in the Y direction is also initialized (STEP 2012).

The main outer loop runs on the total number of macro blocks in Y direction, which is determined by comparing the Y direction loop counter (i) to the total number of macroblocks in the Y direction (totalmb_y) (STEP 2014). If the Y direction loop counter (i) is equal or greater than the total number of macroblocks in the Y direction (totalmb_y) it indicates that all the macroblocks have been compared, the method may end and the value of the variable (e.g., static_mbcount) indicating the total number of static or unchanged macroblocks for the frames being compared may be returned (STEP 2048).

If, however, the Y direction loop counter is less than the total number of macroblocks in the Y direction (totalmb_y) (YES branch of STEP 2014), the reference pointer (refptr) for pointing to the (macroblock or scanline of) the previous frame buffer and current pointer (currentptr) for pointing to the (macroblock or scanline) the current frame buffer may be loaded into register variables (e.g., A and B respectively). These registers may be, for example 256 bit register (e.g., _m256i registers) variables for AVX2 SIMD.

A variable (e.g., t) for an inside loop counter (e.g., for 16 rows of scanlines) may also be initialized. The macroblock array (the mb_info_hyp array) may be initialized for the current row (e.g., the row corresponding to index i) (STEP 2018). The inner loop (indexed by t) may be run on the total number of scanlines in one macroblock (e.g., 16). Accordingly, it can be checked if this loop counter (t) is less than 16 (STEP 2020). If it is not, it indicates the last scanline has been reached and the method may increment the row counter (i) (STEP 2016) and return to see if the last row has been processed (STEP 2014).

If, however, the last scanline has not been reached (YES branch of STEP 2020), a loop counter (j) for the number of macroblocks in the X direction may be initialized (STEP 2024). This last loop will thus be run on the number of macroblock in the X direction. The total number of macroblocks may always be processed in the X direction, which is the cache direction, and then move to the next scan line. By scanning in the X direction the cache miss ratio is reduced and hence the CPU performance increased.

Accordingly, it can be checked if this X direction macroblock counter (j) is less than the total number of macroblocks in the X direction (totalmb_x) (STEP 2026) (e.g., indicating the last macroblock of the row has or has not been reached). If it is not, it indicates the last macroblock of the row has been reached and the method may increment the scanline counter (t) (STEP 2022) and return to see if the last scanline has been processed (STEP 2020). If, however, the last macroblock has not been reached (YES branch of STEP 2026), the value for the entry in the macroblock array (the mb_info_hyp array) corresponding to the macroblock associated with current value of the macroblock loop counter (j) may be checked to determine if that macroblock has been processed (or processed and found to be "dirty" (e.g., the macroblock in the current frame is different than the corresponding macroblock in the previous frame)).

Recall that the entries in the macroblock array (the mb_info_hyp array) were initialized to 1 indicating that they are static macroblocks. Thus, if the value of the mb_info_hyp array for the current index (mb_info_hyp[j]) is equal to 1, this macroblock has not been compared (or has been previously compared and found not to be dirty). Accordingly, if the value of the mb_info_hyp array for the current index (mb_info_hyp[j]) is equal to 1 (YES branch of STEP 2030), a scanline of the macroblock of the current frame may be compared to a scanline of the corresponding macroblock of the previous frame (STEP 2032). For AVX2, the comparison may be performed using _mm256_orsi256_and_mm256_xor_si256 intrinsic functionality. A first call checks for the 64 bytes and a second call to _mm256_testz_si256 may be used to determine the compare results (STEP 2032). These register values (A and B) can then be incremented to advance them to point to the scanline of the next macroblock of the respective frames in the X direction (STEP 2034). Here, the increment may be by 2 for AVX2, as the instructions for AVX2 may be 256 bit instructions.

If the comparison of the scanline of the macroblocks indicates that they are equivalent (e.g., the return value from the _mm_cmpeq_epi16 operation is not equal to 0) (YES branch of STEP 2036), the counter for the macroblocks in the row (j) may be incremented (STEP 2028) and it can then be determined if that macroblock was the last macroblock in the row (STEP 2026). If it was the last macroblock in the row (NO branch of STEP 2026), the inside loop counter corresponding to the number of scanlines (t) may be incremented (STEP 2012) and it can be determined (STEP 2020) if that is the last scanline for that row of macroblocks.

If, however, the comparison indicates that the scanline of the two macroblocks being compared are not equivalent (NO branch of STEP 2036), the value for that macroblock in the value of the mb_info_hyp array for the current index (mb_info_hyp[j]) may be set to 0, indicating the macroblock is dirty and the static_mbcount indicating the number of static macroblocks between the two frames decremented (STEP 2044). If a value is set (e.g., b_cpyflag) indicating that the macroblocks should be copied and the value of the mb_info_hyp array for the current index (mb_info_hyp[j]) is set to zero (YES branch of STEP 2042), the data for that scanline may be copied from the location pointed to by the current pointer (e.g., B) to the location pointed to by the reference pointer (e.g., A) (STEP 2040). Additionally, if the indexed scanline for each macroblock in the X direction have been compared, the reference pointer and the current pointer (e.g., A and B) may be incremented by a stride so that they may point to next row of scanlines (STEP 2038). The index (j) for the for the X direction macroblock counter may be incremented (STEP 2028) and again it can be checked if this X direction macroblock counter (j) is less than the total number of macroblocks in the X direction (totalmb_x) (STEP 2026) to see if the indexed scanline (e.g., indexed by t) has been compared for each macroblock in the X direction.

If, when evaluating whether the value of the mb_info_hyp array for the current index (mb_info_hyp[j]) is equal to 1, it is determined that this value is not equal to 1 (indicating that the indexed macroblock has been determined to be dirty) (NO branch of STEP 2030), the register values (A and B) can be incremented (e.g., by 2 for AVX2) to advance them to point to the scanline of the next macroblock of the respective frames in the X direction (STEP 2046) without performing a comparison of the scanlines between the two macroblocks. If a value is set (e.g., b_cpyflag) indicating that the macroblocks should be copied and the value of the mb_info_hyp array for the current index (mb_info_hyp[j]) is set to zero (YES branch of STEP 2042), the data for that scanline may be copied from the location pointed to by the current pointer (e.g., B) to the location pointed to by the reference pointer (e.g., A) (STEP 2040). Additionally, if the indexed scanline for each macroblocks in the X direction have been compared, the reference pointer and the current pointer (e.g., a and B) may be incremented by a stride so that they may point to next row of scanlines (STEP 2038). The index (j) for the for the X direction macroblock counter may be incremented (STEP 2028) and again it can be checked if this X direction macroblock counter (j) is less than the total number of macroblocks in the X direction (totalmb_x) (STEP 2026) to see if the indexed scanline (e.g., indexed by t) has been compared for each macroblock in the X direction.

As can be seen from FIGS. 18-20, the three embodiments of methods presented herein are based on similar logic but may use different calls for comparison operation. The following table listed the different standard and intrinsic functions used for comparison operation for different CPU type.

TABLE 1

Macroblock Comparison Standard and Intrinsic Functions

| No | CPU type | Comparison Intrinsics or function |
|---|---|---|
| 1 | Default (Using c lib function) | memcmp ( ) |
| 2 | SSE2 | _mm_cmpeq_epi16 ( ) <br> _mm_movemask_epi8 ( ) |
| 3 | AVX2 | _mm256_or_si256, <br> _mm256_xor_si256, <br> _mm256_testz_si256 |

Partial Color Space Conversion

Returning now to FIGS. 10A and 10B, as discussed above embodiments of virtual mobile device platform as described herein may serve to conserve computational resources by identifying macroblocks of the original frame (e.g., original frame 1032) as unchanged (e.g., ZMV macroblocks) and based on the identification of a macroblock as a ZMV macroblock, avoiding performing color space conversion (by color space converter 1018) on that macroblock. The previously converted or encoded version of that macroblock (e.g., encoded previous frame 1057) may then be used by the other components of the display processing pipeline to avoid unnecessary duplicative processing. It will be noted that while certain embodiments may bypass color space conversion based on identification of ZMV macroblocks according to embodiments of ZMV identification as disclosed herein, the identification of ZMV macroblocks may be done according to almost any methodology desired in conjunction with embodiments of bypassing color space as discussed.

Accordingly, color space converter 1018 may be configured to perform RGB to YUV color space conversion at a pixel macroblock level (e.g., 16×16 pixel macroblock) instead of at a full screen level as is typical in video and image compression pre-processing. Recall that embodiments as discussed employ a virtual display pipeline that takes the frame buffer output (e.g., original frame 1032) from the virtual device (e.g., from Android display system 1034) and then pre-processes the frame data and encodes it before sending this data out to a connected physical mobile device 1090. In certain embodiments, an H.264 or other block-based video encoder serves as the primary encoder (e.g., display encoder 1044). As block-based video encoders such as H.264 encoders (e.g., an x264 encoder) require frame data to exist in the YUV color space, the RGB frame data of original frame 1032 is converted to YUV frame data as a pre-processing step in pre-processor 1038.

Traditionally, color space conversion (CSC) operates on a whole screen buffer for conversion of the RGB pixel format to the YUV pixel format. In embodiments as disclosed however, color space converter 1018 is configured to perform this conversion at the macroblock unit level to convert macroblocks of RGB pixel data to macroblocks of YUV pixel data. By converting the frame data at the macroblock level significant performance optimizations may be achieved by only performing partial screen CSC when possible (e.g., only on macroblocks that are not identified as ZMV macroblocks as discussed).

As may be recalled from the previous disclosures, during the display pre-processing, before the CSC operation, the macroblock compare-and-conditionally-copy functionality (e.g., as accomplished by ZMV detector 1074) compares the current frame RGB data with the previous frame RGB data to find the macroblocks whose data has not changed and thus is static (e.g., macroblock type ZMV). A data structure representing the list of macroblocks that the screen is organized into is used to capture this information (e.g., in current frame metadata 1058). This data structure may be referred to as mb_info_hyp (or, interchangeably, mb_info or mb_info_array). The data structure may be an array representing the macroblocks of the current frame, where an element representing each macroblock has a Boolean value where "false" (0) represents a non-static macro blocks while "true" (1) represents a static macroblock (ZMV macroblock) in the array.

In certain embodiments, the memory buffer created to store YUV data converted from RGB data (e.g., converted frame 1042) is a single statically allocated memory buffer that is only ever written to by the CSC functionality (e.g., color space converter 1018). Thus, once a list of unmodified macroblocks (ZMV macroblocks) is obtained from the RGB buffer comparison, the color space converter 1018 can simply skip over the expensive colors pace conversion process for these particular unmodified blocks, as the previously converted YUV data for these blocks has already been generated and written to the YUV buffer. In other words, in this embodiment the converted frame 1042 may overwrite the same memory location where original last frame 1052 in the YUV format is stored (e.g., a single statically allocated memory buffer). This bypass of CSC operations can save significant amount of the CPU cycles.

Figure 21:
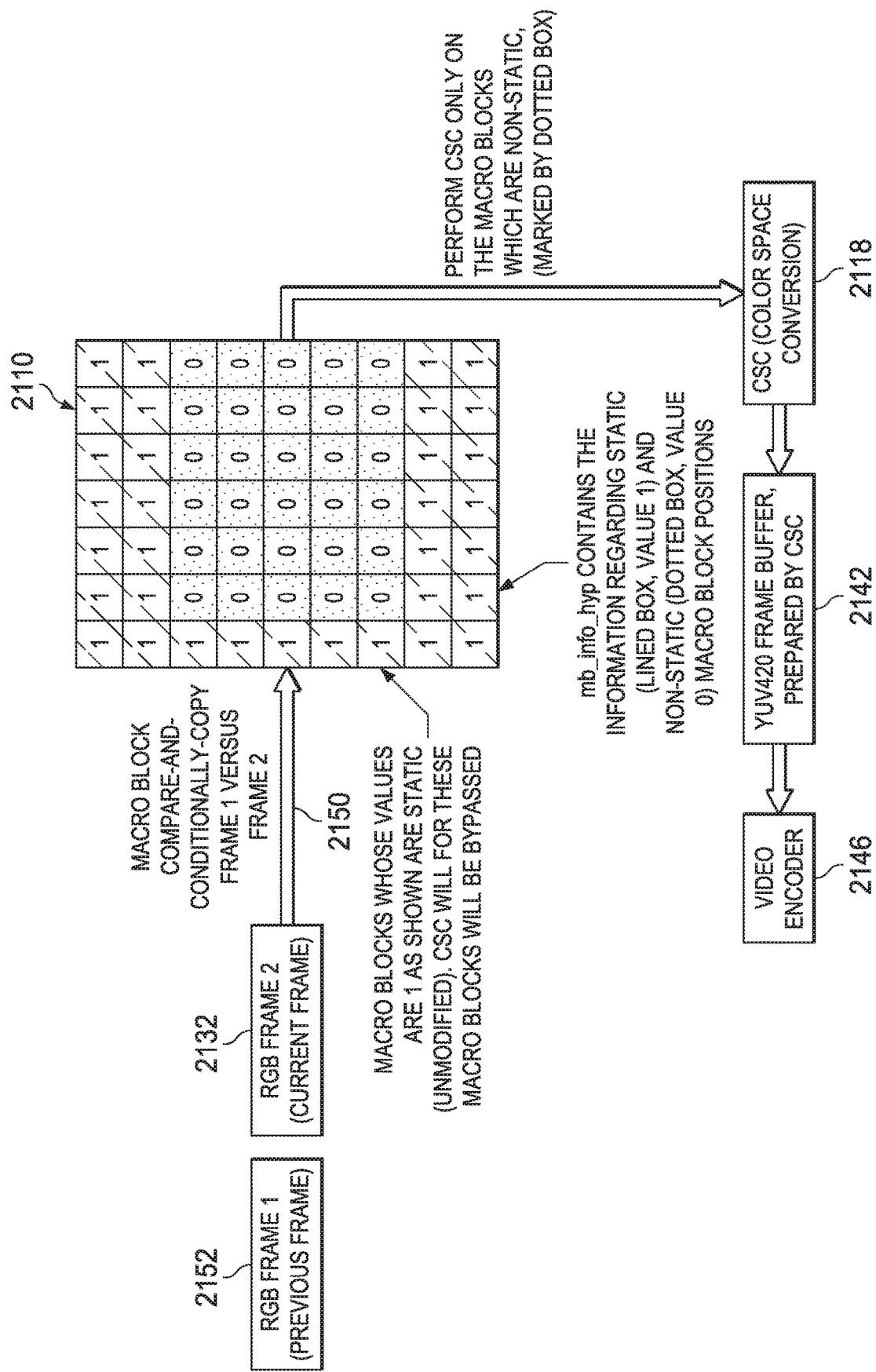
FIG. 21 depicts a diagrammatic representation of one embodiment of macroblock comparison.

As shown in FIG. 21, embodiments may utilize a data structure indicating static macroblock of the current frame to perform color space conversion on only those macroblocks of the current frame that are not static (e.g., those that have been changed since the previous frame). In particular, according to one embodiment, the original current frame 2132 in the RGB color space and the original previous frame 2152 in the RGB color space are compared to determine which macroblocks of the current frame 2132 are static relative to the previous frame 2152 (STEP 2150). This comparison may be accomplished, for example, using embodiments of the conditional copy and compare discussed above or other methods of comparing may be utilized.

During this comparison a data structure 2110 indicating which macroblocks of the current frame 2132 are (and are not) static relative to the previous frame 2152. For example, embodiments of the macroblock compare-and-conditionally-copy functionality discussed may populate an mb_info_hyp array which contains the static (and non-static) macroblock information. Specifically, embodiments of the conditional copy and compare functionality may utilize an mb_info_hyp array including an element corresponding to each macroblock of a frame. During the conditional copy and compare each element of the mb_info_hyp may be populated with a value (e.g., 1 or 0) indicating if the macroblock of the current frame corresponding to that element is static or non-static. As illustrated in the example of FIG. 21, the dotted boxes (with the value 0) of the data structure 2110 represent the non-static macroblock while lined boxes (with the value 1) represent the static macroblocks of the current frame 2132.

This data structure 2110 may be utilized by the color space converter 2118 (e.g., libyuv) so that color space conversion may only be performed by the color space converter 2118 for the macroblocks that are indicated as being non-static (e.g., have a value 0 in the mb_info_hyp array). Specifically, YUV frame buffer 2142 may contain the previous frame (e.g., previous frame 2152) in the YUV color space. Thus, color space converter 2118 may only convert the identified non-static macroblocks of current frame 2132 from the RGB color space to the YUV color space. These converted macroblocks of the current frame (e.g., current frame 2132) may replace the corresponding macroblocks of the previous frame (e.g., previous frame 2152) in the YUV frame buffer (or converted frame buffer) 2142. The YUV macroblocks of the previous frame (e.g., previous frame 2152) corresponding to static macroblocks may thus be retained in the YUV frame buffer 2142 (as they haven't changed from the previous frame 2152 to the current frame 2132), avoiding the need to perform color space conversion on these macroblocks. The frame in the YUV frame buffer 2142 (e.g., the YUV420 frame buffer prepared by libyuv) thus represents the current frame 2132 in the YUV color space. The current frame in the YUV color space in YUV frame buffer 2142 may then be utilized by video encoder 2146 (e.g., an x264 encoder) to produce an encoded frame. By bypassing color space conversion for the static macroblocks CPU cycles may be saved, memory usage reduced, and the speed of color space conversion increased.

In certain embodiments then, color space converter 1018 may utilize a modified standard CSC library (e.g., libyuv), configured (e.g., by adding code or interfaces) to properly and efficiently preform CSC at the macroblock level. As part of these changes, an additional parameter (e.g., a pointer to a mb_info_hyp type object) may be added to the RGB to YUV function APIs. In one particular embodiment, the RGB frame is converted to YUV using, for example, libyuv/ ffmpeg code. Accordingly, the color space conversion (e.g., the libyuv code) is adapted to evaluate the mb_info_array containing information about static macroblocks and skip static that macroblocks. Additionally, as there may be a big difference between accuracy of the computations in ffmpeg and libyuv, the libyuv RGBtoYUV420 formula and conversion code is adapted to maintain the computing accuracy.

Figure 22A:
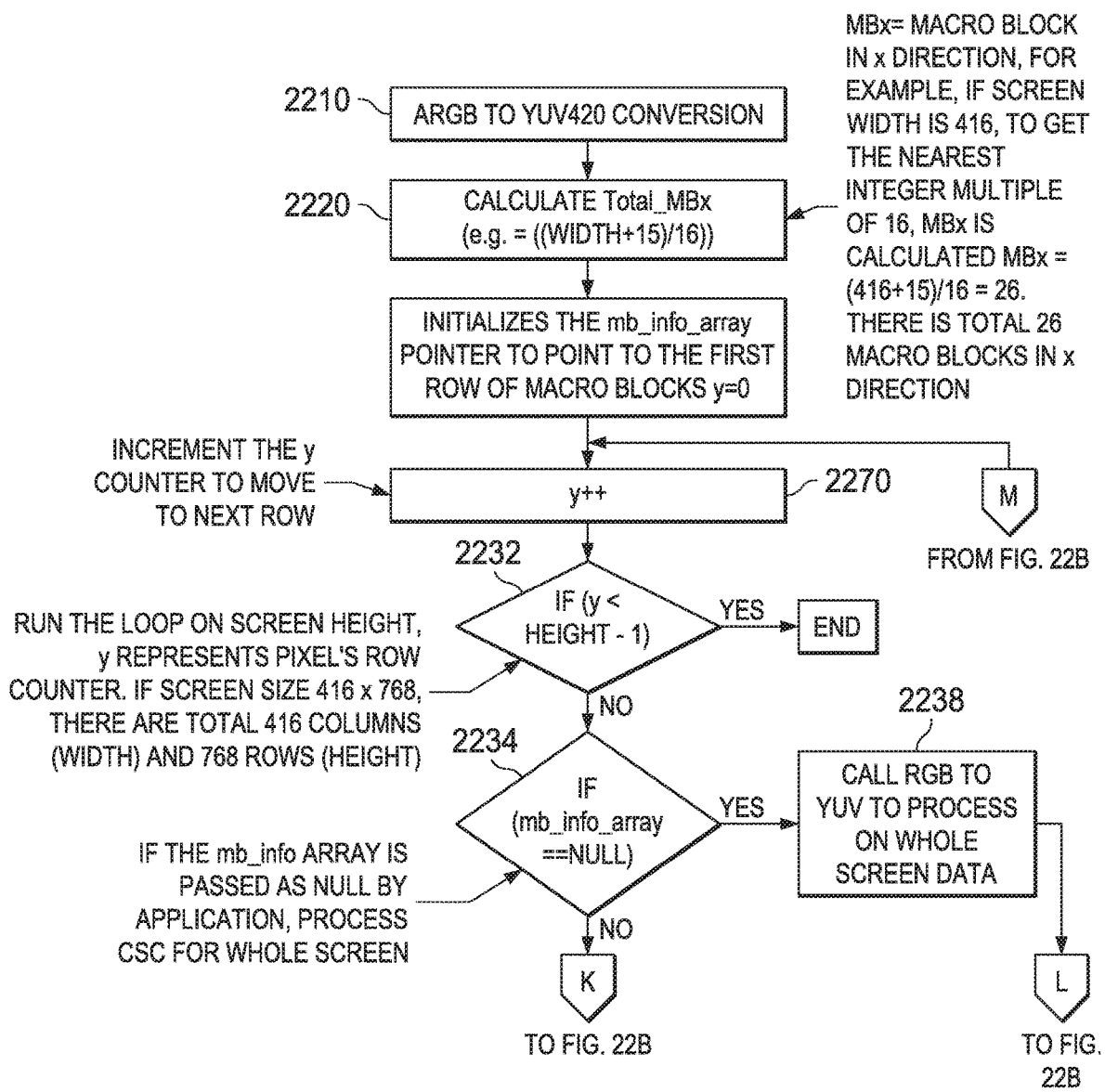
FIGS. 22A, 22B and 23 are flow diagrams illustrating embodiments of methods for color space conversion of macroblocks.
Figure 22B:
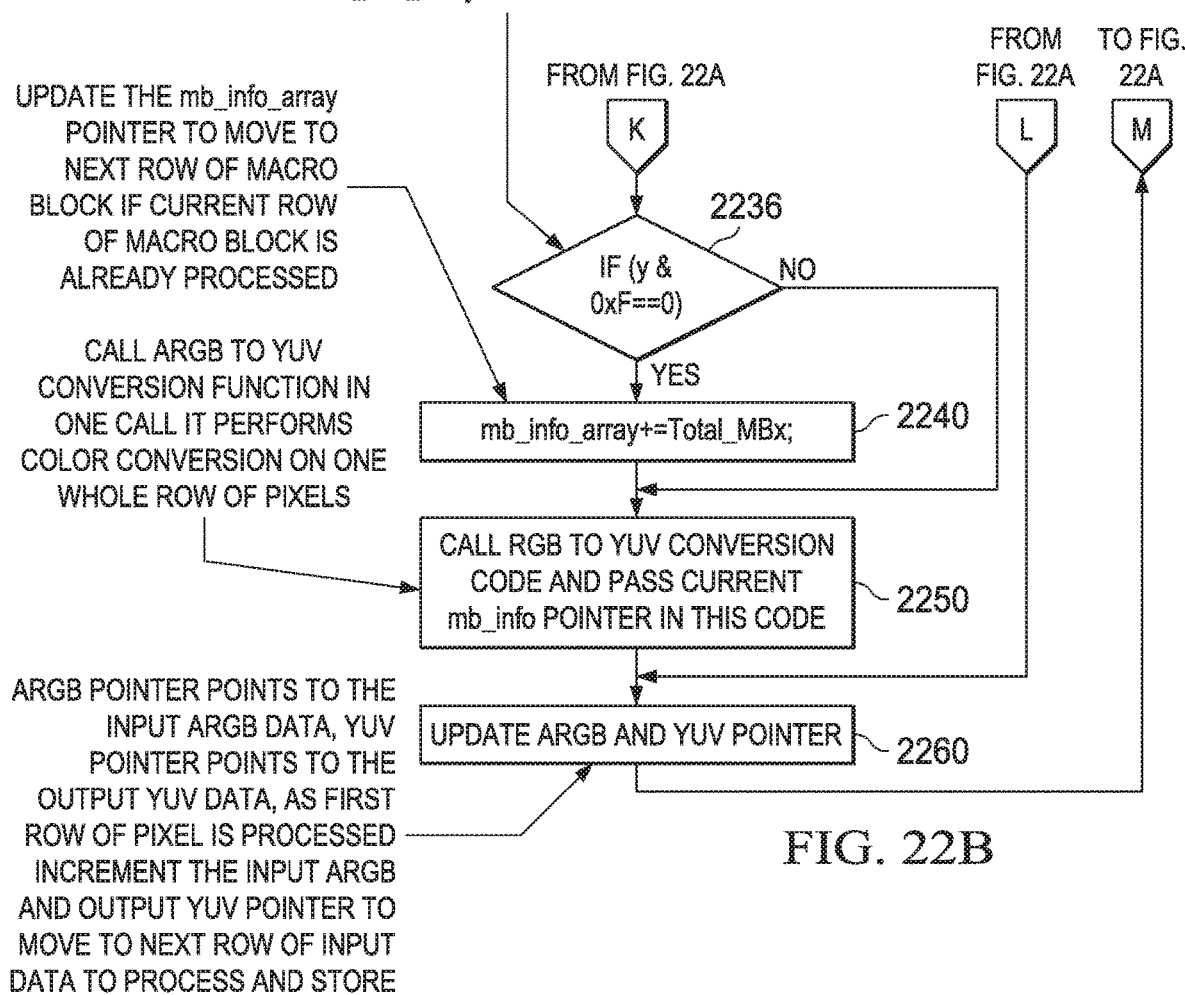
Figure 23:
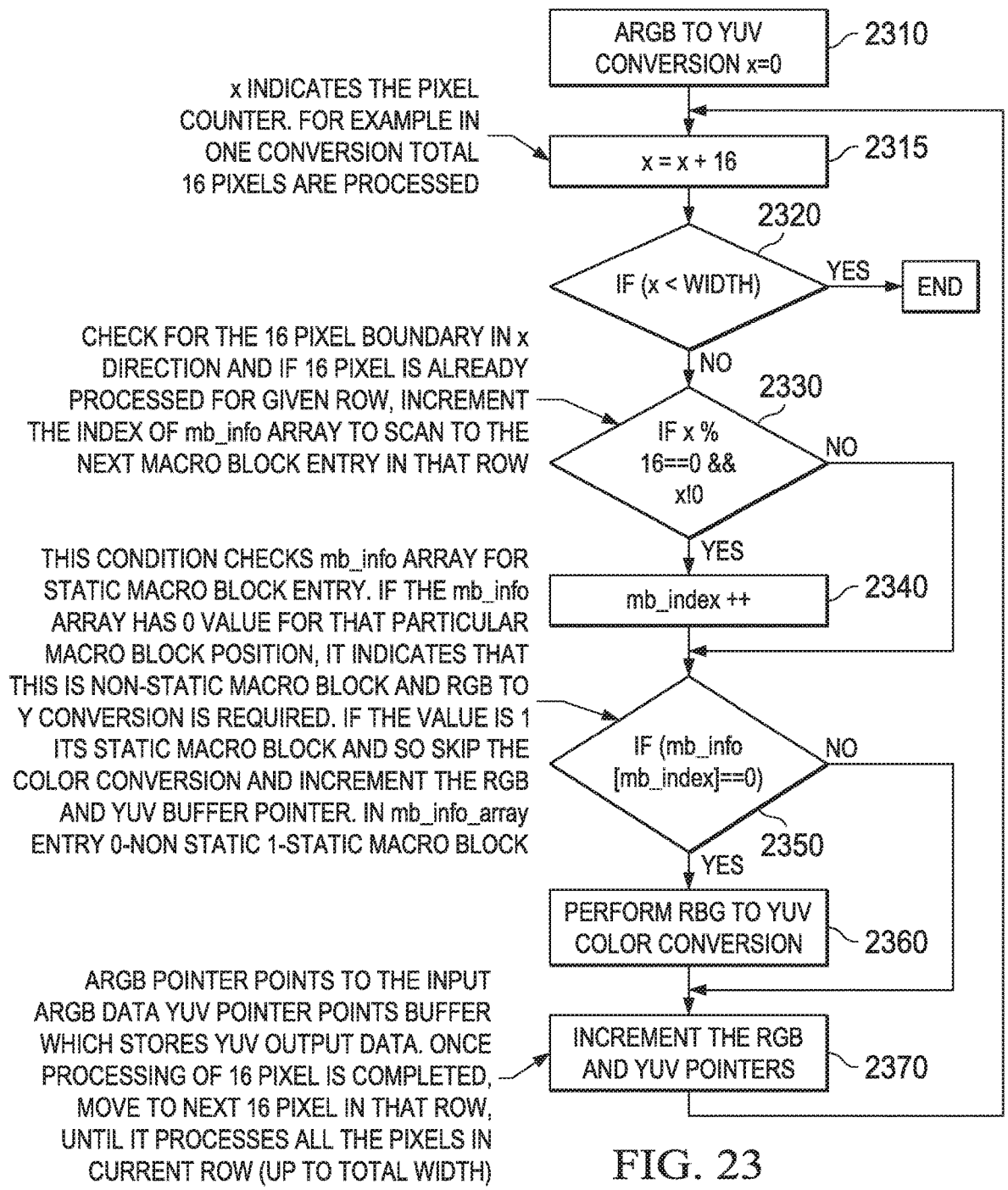

FIGS. 22-23 are two flow charts depicting embodiments of methods for converting a frame in the RGB color space to the YUV color space. It will be noted that such methods may be implemented by modifying an existing library or conversion process (e.g., such as the libyuv library) to utilize a data structure indicating static or non-static macroblocks and performing the color space conversion on individual macroblocks of the current frame (e.g., thus skipping color space conversion for static macroblocks). FIGS. 22A and 22B describe one embodiment of a method for skipping CSC on ZMV macroblocks (e.g., that may include a modification of an interface (API) for libyuv code) while FIG. 23 represents an embodiment of a method for converting color space (e.g., which may include a modification done in the RGB to YUV conversion module of the library).

Here, a ZMV detector (e.g., ZMV detector 1074) or another component or calling application may pass the color space converter (e.g., color space converter 1018) a reference to a macroblock data structure (e.g., mb_info_hyp array) containing the static (or non-static) macroblock information for a corresponding current frame.

As has been mentioned, the size of the data structure with the macroblock data (e.g., mb_info_hyp array) may be equal to the total number of macroblock in that frame and the component may allocate memory for, or populate, that array (e.g., with 0 for non-static macroblock positions and 1 for static macroblock positions). In one embodiment, if the calling component desires for color space conversion to be performed on the entire frame, the component can pass NULL pointer instead of the pointer to the data structure. A loop on the height of the frame to call the RGB to YUV conversion module on each row.

Specifically in one embodiment, if the mb_info_hyp array is not null, the method may check for the 16 pixel boundary in Y direction and if 16 pixels have already processed in the Y direction, the mb_info_hyp array pointer can be incremented to point to the next macroblock row. The RGBtoYUV module may first check for the 16 pixel boundary in the X direction and if 16 pixels have already processed, the index of the mb_info_hyp array can be incremented to scan for the next macroblock status. If the current macroblock being evaluated is static (e.g., mb_info_hyp array contains 1 for the macroblock), RGBtoYUV conversion module skips the RGBtoYUV420 conversion process for that macroblock and increments ARGB and YUV buffer pointers and index of the mb_info_hyp array to process the next set of pixel data.

Referring specifically now to FIGS. 22A and 22B, an API or other interface for the color space conversion (e.g., an ARGB to YUV420 conversion) may be called by a component and passed a reference or pointer to a macroblock data structure (e.g., mb_info_hyp array) containing macroblock data indicating whether each macroblock of a current frame is static or non-static (STEP 2210).

Next, the total number of macroblocks in the X direction (e.g., referred to as Total MBx or MBx) may be determined. (STEP 2220). This determination may be made to the nearest integer multiple of the pixels of a macroblock (e.g., here 16) by adding a value corresponding to the number of pixels of a macroblock (e.g., here 15) to the width of the frame in pixels and dividing by the number of pixels in a macroblock. A pointer (e.g., mb_info_array pointer) to reference the macroblock data structure or elements thereof may be initialized to point to the first element of the array and a row index (e.g., Y) initialized (STEP 2230). The row index can then be incremented to correspond to the next row (STEP 2270).

A loop may be run based on the height of the frame (e.g., number of pixels in the Y direction) to call a color space conversion module (e.g., an RGB to YUV conversion module that may be included in the color space conversion module) on each row of macroblocks. Specifically, in one embodiment, if the data structure with the macroblock data (e.g., mb_info_hyp array) is not NULL, the 16 pixel boundary in the Y direction may be checked and if the $16^{th}$ pixel is already processed in Y direction, the pointer may be pointed to the next macroblock row.

Specifically, a variable (Y) may be used to track the rows of pixels that have been processed and incremented. Thus, this variable can be checked to see if the last pixel of the last macroblock in the Y direction has been processed (STEP 2232). If the last row of macroblocks has been processed (YES branch of STEP 2232) the conversion process may end. If, however, the last row of macroblocks has not been processed (NO branch of STEP 2232) it can be determined if the macroblock data structure (e.g., mb_info_hyp array) that was referenced is NULL or is otherwise empty or invalid (STEP 2234). If so (YES branch of STEP 2234) the conversion process may be called on the entire current frame (STEP 2238). Following the conversion process, one or more pointers may be updated to indicate or refer to the converted current frame (e.g., the converted frame in the YUV color space). (STEP 2260) This pointer, or another reference to the buffer containing the converted current frame, may be returned.

These pointers may include an ARGB pointer for pointing to the original frame (e.g., in the YUV color space) and a YUV pointer for pointing to the converted frame (e.g., in the RGB color space). In the case where the entire frame has been converted, these pointers may be updated to point to the last row of the each of the respective frames and the variable (Y) used to track the rows of pixels that have been processed may be set to a value corresponding to the last row of pixels, such that the method may end when this variable (Y) is subsequently checked (STEP 2232).

If, however, the macroblock data structure (e.g., mb_info_hyp array) is not invalid (NO branch of STEP 2234), it can then be determined if the $16^{th}$ pixel in the Y direction has been processed (STEP 2236). This step may be desired as the libyuv may loop on the total number of scanlines and the macroblock size may be 16×16. This determination may be made by bitwise anding the variable (Y) used to track the rows of pixels that have been processed with a mask (e.g., 0xF) and checking the result.

If the $16^{th}$ pixel in the Y direction has not been processed (NO branch of STEP 2236) the color space conversion process (e.g., an RGB to YUV color space conversion process) can be called to perform the color space conversion on the row of pixels for the referenced macroblock(s) (STEP 2250). This call to the color space conversion process may pass the pointer (e.g., mb_info_pointer) into the macroblock data structure (e.g., mb_info_hyp array) to indicate the row of macroblocks (or index thereof) for pixels that are to be converted. A pointer to the current frame may also be passed on the color space conversion process. If the $16^{th}$ pixel in the Y direction has been processed (YES branch of STEP 2236) the pointer (into the macroblock data structure (e.g., mb_info_hyp array) is updated to point to the next row of the macroblock data structure (e.g., mb_info_hyp array) by incrementing by the number of macroblocks in the X direction (e.g., Total MBx) (STEP 2240) before the color space conversion process is called to perform the color space conversion on the row of pixels for the referenced macroblock(s) (STEP 2250).

Following the conversion process, one or more pointers may be updated to indicate or refer to the converted current frame (e.g., the converted frame in the YUV color space). (STEP 2260). These pointers may include an ARGB pointer for pointing to the original frame (e.g., in the YUV color space) and a YUV pointer for pointing to the converted frame (e.g., in the RGB color space). Thus, data of the original frame may be accessed using the ARGB pointer and converted pixel data written into the converted frame using the YUV pointer. Thus, at this point these pointers are incremented or otherwise updated to point to the next row of pixels in the respective frames (e.g., the memory locations used to hold the original frame and the converted frame). The variable (Y) used to track the rows of pixels that have been processed may be incremented (STEP 2270) and checked again (STEP 2232) to determine if the last row of pixels has been converted.

Moving on to FIG. 23, a flow diagram for one embodiment of a method for color space conversion process that may be used with certain embodiments is depicted. In an embodiment of a color space conversion process an ARGBtoYUV module of a color space converter (e.g., color space converter 1018) may first check the 16 pixel boundary in the X direction and if 16 pixels are already processed, the index of the macroblock data structure (e.g., mb_info_hyp array) incremented to scan the status of the next macroblock. If the current macroblock being processed is static (e.g., mb_info_hyp array contains 1 for the macroblock), the color space conversion (e.g., ARGBtoYUV conversion) for that macroblock may be skipped and increments the ARGB and YUV buffer pointers and index of the mb_info_hyp array to process the next set of pixel data.

Specifically, in one embodiment, the color space conversion method may be an RGB to YUV conversion process that may be called with a pointer or other reference to a row of macroblocks that are to be color space converted (STEP 2310). This reference may include a reference to a macroblock data structure (e.g., mb_info_hyp array) indicating the corresponding row of macroblocks of the current frame to be converted. Reference may also include pointers (e.g., ARGB or YUV pointers) referencing locations in the original frame of data (e.g., in the RGB format) or a location where converted data (e.g., YUV data for the pixels) is to be stored. A pixel variable (X) may be initialized (e.g., to 0) to track the macroblocks or the pixels of the row. A macroblock index (mb_index) that may be used to indicate the macroblock of the row in the X direction may also be initialized. This pixel variable (X) may thus be incremented by the number of pixels in a macroblock in the X direction (e.g., 16) (STEP 2315).

This pixel variable (X) can therefore be checked to determine if the last macroblock of the row of macroblocks has been reached by comparing it to the width of the frame (e.g., the number of pixels of the frame size in the X direction) (STEP 2320). If the last macroblock of the row has been reached (e.g., the variable (x) is equal to or greater than the width) the color space conversion for the row of macroblocks may end (YES branch of STEP 2320).

If the last macroblock of the row has not been reached (NO branch of STEP 2320), it can be determined if the 16 pixel boundary for a macroblock has been reached (STEP 2330). This may be done by checking to see if any remainder is obtained when dividing the pixel variable (x) by 16 (e.g., the pixel width of each macroblock). If the last pixel of a macroblock has not been processed (NO branch of STEP 2230) (e.g., if there is a remainder when dividing the index variable (x) by 16), the variable tracking the current macroblock being processed (mb_index) may be incremented such that the next macroblock in the row can be indexed (STEP 2340). The macroblock data structure may be then be indexed based on the macroblock tracking variable (mb_index) to determine the value associated with the corresponding macroblock in the macroblock data structure. Based on that value it can be determined if the macroblock of the corresponding frame is a static macroblock or non-static macroblock (e.g., relative to the previous frame) (STEP 2350). For example, as discussed, the macroblock data structure (mb_info_hyp array) may contain a 0 if the corresponding macroblock of the current frame is non-static (e.g., has changed relative the previous frame) and a 1 if the corresponding macroblock of the current frame is static (e.g., has not changed relative to the previous frame).

If the last macroblock of the row is non-static (YES branch of STEP 2350), an RGB to YUV color space conversion may be performed on that macroblock (STEP 2360). The converted macroblock can then be stored in the appropriate location in a converted frame buffer as previously discussed. As noted above, a YUV pointer may be used to point to the memory location where the converted data is to be written. The pointers (e.g., the ARGB pointer for the original frame data and the YUV pointer for the converted frame) can then be updated (STEP 2370) before the pixel index is again checked (STEP 2320). If, however, the last macroblock of the row is static (YES branch of STEP 2350), the RGB to YUV color space conversion may be skipped for that macroblock and the pointers updated (STEP 2370) before the pixel index is again checked (STEP 2320).

In one embodiment, from ITU-R BT.601. RGB to YPbPr is derived as follows:

$Y=0.299\ R+0.587\ G+0.114\ B$ $P_B=-0.168\ R-0.331\ G+0.5\ B$ $P_R=0.5\ R-0.4186\ G-0.0813\ B$

Digital Y'CbCr (8 bits per sample) is derived from analog R'G'B' as follows:

$Y=16+(65.481\ R+128.533\ G*24.966\ B)$ $C_b=128+(-37.797\ R-74.203\ G+112\ B)$ $C_r=128+(112\ R-93.786\ G-18.214\ B)$

The resultant signals range from 16 to 235 for Y' (Cb and Cr range from 16 to 240)

Libyuv conversion native original C code:

```
static _inline int RG9ToY(uint8 r, uint8 g, uint8 b) {
    return (66 * r + 129 * g + 25 * b + 0x1080) >> 8;
}
static _inline int RGBToU(uint8 r, uint8 g, uint8 b) {
    return (112 * b - 74 * g - 38 * r + 0x8080) >> 8;
}
static _inline int 8G8ToV(uint8 r, uint8 g, uint8 b) {
    return (112 * r - 94 * g - 18 * b + 0x8080) >> 8;
}
```

There is a big difference between accuracy of the computations in libyuv using above formula. Ffmpeg in this respect is very accurate in computing Y, U and V values precisely. The worst case magnitude of error for libyuv can be computed as under (shown for Y value). If we consider a RGB as 0xFFFFFF (white):

Worst case Error introduced using R component=0.299*(219/255)*255−(33*255)>>7=0.48
Worst case Error introduced using G component=0.587*(219/255)*255−(65*255)>>7=0.94
Worst case Error introduced using B component=0.114*(219/255)*255−(13*255)>>7=0.1

The errors may add up. Worst case error in pixel values with libyuv may be off by −/+2 for 8 bit pixels, which is significant error. To fix this accuracy error, libyuv conversion native C and SIMD code may be modified to take the fractional part of the formula into calculation. For example:

```
The original Libyuv code implements the following formula for RGB to Y.
static _inline int RGBToY(uint8 r; uint8 g, uint8 b) {
    return (66 * r + 129 * g + 25 * b + 0x1080) >> 8;
}
Above code is modified to fix accuracy issue for c code as follows.
static _inline int RGBToY(uint8 r, uint8 g, uint8 b) {
    return ((65*r + 128 *g + 24*b + 0x1080 ) +((62 *r + 68*g + 124*b) >>7))>>8
}
To avoid the overflow in SIMD operation above formula is adjusted as follows.
((32*r + 64 *g + 12*b + 0x1080) + ((47 *r + 17*g + 31*b) >>8))>>7
Above both fixed point formula is a close map to original formula
Y = 16 + (65.481 R + 128.533 G + 24.966 B)
Same modification is done for U and V component.
```

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, the meaning of "in" includes "in" and "on" unless the context clearly dictates otherwise.

What is claimed is:

1. A system for efficient frame processing, the system comprising:
a computer system that comprises one or more processors programed with computer program instructions that, when executed, cause the computer system to:
obtain a frame of display data;
identify a first macroblock of the frame of display data as a low-spatial-frequency macroblock and a second macroblock of the frame of display data as a high-spatial-frequency macroblock; and
generate an encoded frame by encoding the first macroblock and the second macroblock of the frame of display data, the first macroblock being encoded based on the identification of the first macroblock as the low-spatial-frequency macroblock and the second macroblock being encoded based on the identification of the second macroblock as the high-spatial-frequency macroblock; wherein the first macroblock is encoded using a video encoder and the second macroblock is encoded using a zip encoder.

2. The system of claim 1, wherein the video encoder is a H.264 encoder.

3. The system of claim 1, wherein the computer system is caused to:
generate a converted frame by performing color space conversion on the frame of display data prior to generating the encoded frame.

4. The system of claim 1, wherein the identification of the first macroblock as the low-spatial-frequency macroblock and the second macroblock as the high-spatial-frequency macroblock are stored in metadata associated with the frame of display data.

5. The system of claim 1, wherein the computer system is caused to:
send the encoded frame of display data along with a header, the header identifying the high-frequency macroblock.

6. A method comprising:
obtaining a frame of display data;
identifying a first macroblock of the frame of display data as a first type of macroblock
and a second macroblock of the frame of display data as a second type of macroblock different from the first type of macroblock based on differences between a spatial frequency of the first macroblock and a spatial frequency of the second macroblock; and
generating an encoded frame by encoding the frame of display data, such that the first macroblock is encoded using a first type of encoder, the first type of encoder being selected based on the identification of the first macroblock as the first type of macroblock and being a video encoder; and
wherein the second macroblock is encoded using a second type of encoder, the second type of encoder being a zip encoder.

7. The method of claim 6, wherein the second type of encoder is selected based on the identification of the second macroblock as the second type of macroblock.

8. The method of claim 6, wherein the first type of encoder is a H.264 encoder.

9. The method of claim 6, wherein the identification of the first macroblock as the first type of macroblock and the second macroblock as the second type of macroblock are stored in metadata associated with the frame of display data.

10. One or more non-transitory, computer-readable media storing instructions that, when executed by one or more processors, effectuate operations comprising:
obtaining a frame of display data;
identifying a first macroblock of the frame of display data as a first type of macroblock and a second macroblock of the frame of display data as a second type of macroblock different from the first type of macroblock based on differences between a spatial frequency of the first macroblock and a spatial frequency of the second macroblock; and
generating an encoded frame by encoding the frame of display data, such that the first macroblock is encoded using a first type of encoder, the first type of encoder being selected based on the identification of the first macroblock as the first type of macroblock and being a video encoder; and wherein the second macroblock is encoded using a second type of encoder, the second type of encoder being a zip encoder.

11. The non-transitory, computer-readable media according to claim 10, wherein the second type of encoder is selected based on the identification of the second macroblock as the second type of macroblock.

12. The non-transitory, computer-readable media according to claim 10, wherein the first type of encoder is a H.264 encoder.

13. The non-transitory, computer-readable media according to claim 10, wherein the identification of the first macroblock as the first type of macroblock and the second macroblock as the second type of macroblock are stored in metadata associated with the frame of display data.

* * * * *